US010761888B2

(12) United States Patent
Ikkaku et al.

(10) Patent No.: US 10,761,888 B2
(45) Date of Patent: Sep. 1, 2020

(54) METHOD FOR DEPLOYING TASK TO NODE BASED ON EXECUTION COMPLETION POINT, TASK DEPLOYMENT APPARATUS AND STORAGE MEDIUM

(71) Applicant: FUJITSU LIMITED, Kawasaki-shi, Kanagawa (JP)

(72) Inventors: Kento Ikkaku, Kawasaki (JP); Kouichirou Amemiya, Kawasaki (JP); Jun Ogawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/109,844

(22) Filed: Aug. 23, 2018

(65) Prior Publication Data

US 2019/0065254 A1    Feb. 28, 2019

(30) Foreign Application Priority Data

Aug. 30, 2017 (JP) ................... 2017-165135

(51) Int. Cl.
*G06F 9/46* (2006.01)
*G06F 9/48* (2006.01)

(52) U.S. Cl.
CPC .......... *G06F 9/4887* (2013.01); *G06F 9/4843* (2013.01)

(58) Field of Classification Search
None
See application file for complete search history.

(56) References Cited

U.S. PATENT DOCUMENTS 6,466,980 B1    10/2002 Lumelsky et al.
2008/0021987 A1    1/2008 Bates et al.

FOREIGN PATENT DOCUMENTS

JP    2001-067377    3/2001
JP    2008-027442    2/2008

OTHER PUBLICATIONS

Benjamin Hindman et al., "Mesos: A Platform for Fine-Grained Resource Sharing in the Data Center", NSDI'11 Proceedings of the 8th USENIX conference on Networked systems design and implementation, pp. 1-14, Sep. 30, 2010 (14 pages).

*Primary Examiner* — Gregory A Kessler
(74) *Attorney, Agent, or Firm* — Fujitsu Patent Center

(57) ABSTRACT

A non-transitory computer-readable storage medium storing a program that causes a computer to execute a process, the process includes acquiring a number of processes in a queue storing a process executed by a node; generating information for specifying an execution completion point for a new process in a case where the node is to execute the new process based on the acquired number of processes in the node, information regarding a process execution rate in the node, and information regarding a communication delay between a management node generating the new process and the node; and transmitting the generated information for specifying the execution completion point generated for the node to the management node.

15 Claims, 60 Drawing Sheets

FIG. 15

| [M1] INPUT DATA ||
|---|---|
| TRANSMISSION SOURCE ADDRESS ||
| DESTINATION ADDRESS ||
| INPUT DATA | ANY FORMAT |

FIG. 16

| [M2] INPUT DATA | |
|---|---|
| TRANSMISSION SOURCE ADDRESS | |
| DESTINATION ADDRESS | |
| INPUT DATA | ANY FORMAT |

FIG. 17

| [M3] EXECUTION TASK ||
|---|---|
| TRANSMISSION SOURCE ADDRESS ||
| DESTINATION ADDRESS ||
| TASK ID | ID FOR SPECIFYING TASK |
| PROCESSING TARGET DATA | ANY FORMAT |

FIG. 18

| [M4] EXECUTION RESULT DATA ||
|---|---|
| TRANSMISSION SOURCE ADDRESS ||
| DESTINATION ADDRESS ||
| TASK ID | ID FOR SPECIFYING EXECUTION TASK |
| EXECUTION RESULT DATA | ANY FORMAT |

FIG. 19

| [M5] EXECUTION RESULT DATA ||
|---|---|
| TRANSMISSION SOURCE ADDRESS ||
| DESTINATION ADDRESS ||
| TASK ID | ID FOR SPECIFYING EXECUTION TASK |
| EXECUTION RESULT DATA | ANY FORMAT |

FIG. 20

| [M6] DISTRIBUTION DESTINATION USER MESSAGE ||
|---|---|
| TRANSMISSION SOURCE ADDRESS ||
| DESTINATION ADDRESS ||
| TASK ID | ID FOR SPECIFYING EXECUTION TASK |
| USER ADDRESS ||

FIG. 21

| [M7] EXECUTION RESULT DATA ||
|---|---|
| TRANSMISSION SOURCE ADDRESS ||
| DESTINATION ADDRESS ||
| TASK ID | ID FOR SPECIFYING EXECUTION TASK |
| EXECUTION RESULT DATA | ANY FORMAT |

FIG. 22

| [M8] TASK PROCESSING REQUEST MESSAGE || |
|---|---|---|
| TRANSMISSION SOURCE ADDRESS ||| 
| DESTINATION ADDRESS ||| 
| TASK ID | ID FOR SPECIFYING EXECUTION TASK || 
| CONSTRAINT CONDITION | | |
| | REQUEST ALGORITHM | DEADLINE SATISFACTION RATIO MAXIMIZATION/ RESPONSE DELAY MINIMIZATION |
| | REQUEST TIME | TIME LIMIT BY WHICH TASK EXECUTION RESULT IS TRANSMITTED |

FIG. 23

| [M9] TASK EXECUTION CONSTRAINT MESSAGE | | |
|---|---|---|
| TRANSMISSION SOURCE ADDRESS | | |
| DESTINATION ADDRESS | | |
| TASK ID | ID FOR SPECIFYING EXECUTION TASK | |
| CONSTRAINT CONDITION | | |
| | REQUEST ALGORITHM | DEADLINE SATISFACTION RATIO MAXIMIZATION/RESPONSE DELAY MINIMIZATION |
| | REQUEST TIME | TIME LIMIT BY WHICH TASK EXECUTION RESULT IS TRANSMITTED |

FIG. 24

| [M10] QUEUE STATE MESSAGE || |
|---|---|---|
| TRANSMISSION SOURCE ADDRESS || |
| DESTINATION ADDRESS || |
| QUEUE STATE | | |
| | TASK EXECUTION NODE ID | ID FOR SPECIFYING TASK EXECUTION NODE |
| | NUMBER OF EXISTING TASKS | NUMBER OF EXISTING TASKS FROM HEAD TO VACANCY OF TASK EXECUTION QUEUE |
| | AVERAGE PROCESS EXECUTION RATE | AVERAGE PROCESS EXECUTION RATE OF ALL TASKS EXECUTED IN PAST |

FIG. 25

| [M11] TASK EXECUTION ORDER SECURING REQUEST MESSAGE | | |
|---|---|---|
| TRANSMISSION SOURCE ADDRESS | | |
| DESTINATION ADDRESS | | |
| EXECUTION ORDER SECURING | | |
| | TASK EXECUTION NODE ID | ID FOR SPECIFYING TASK EXECUTION NODE |

FIG. 26

| [M12] OFFER REFUSAL MESSAGE | | |
|---|---|---|
| TRANSMISSION SOURCE ADDRESS | | |
| DESTINATION ADDRESS | | |
| EXECUTION ORDER RELEASE | | |
| | TASK EXECUTION NODE ID | ID FOR SPECIFYING TASK EXECUTION NODE |
| | TASK ID | ID FOR SPECIFYING IDLE TASK |

FIG. 27

| | |
|---|---|
| [M13] OFFER INFORMATION ||
| TRANSMISSION SOURCE ADDRESS ||
| DESTINATION ADDRESS ||
| MESSAGE ID | ID FOR SPECIFYING THAT MESSAGE IS OFFER |
| EDGE ID | ID FOR SPECIFYING TRANSMISSION SOURCE EDGE |
| TASK ID | ID FOR SPECIFYING SECURED EXECUTION TASK |
| TASK EXECUTION COMPLETION POINT | TASK EXECUTION COMPLETION POINT |

FIG. 28

| | |
|---|---|
| [M14] OFFER REFUSAL MESSAGE | |
| TRANSMISSION SOURCE ADDRESS | |
| DESTINATION ADDRESS | |
| MESSAGE ID | ID FOR SPECIFYING OFFER REFUSAL MESSAGE |
| EDGE ID | ID FOR SPECIFYING TRANSMISSION SOURCE EDGE |
| TASK ID | ID FOR SPECIFYING IDLE TASK TO BE DELETED |

FIG. 29

| [M15] EXECUTION TASK ||
|---|---|
| TRANSMISSION SOURCE ADDRESS ||
| DESTINATION ADDRESS ||
| MESSAGE ID | ID FOR SPECIFYING REPLACEMENT REQUEST |
| TASK ID | ID FOR SPECIFYING EXECUTION TASK |
| PROCESSING TARGET DATA | ANY FORMAT |

FIG. 30

| [M16] EXECUTION RESULT DATA ||
|---|---|
| TRANSMISSION SOURCE ADDRESS ||
| DESTINATION ADDRESS ||
| MESSAGE ID | ID FOR SPECIFYING THAT MESSAGE IS EXECUTION RESULT |
| EDGE ID | ID FOR SPECIFYING TRANSMISSION SOURCE EDGE |
| TASK ID | ID FOR SPECIFYING EXECUTED TASK |
| EXECUTION RESULT DATA | ANY FORMAT |

FIG. 55

| OFFER ID | TASK EXECUTION NODE ID | TASK ID | TASK EXECUTION COMPLETION POINT |
|---|---|---|---|
| ID FOR SPECIFYING EDGE HAVING TRANSMITTED OFFER | ID FOR SPECIFYING TASK EXECUTION NODE | ID FOR SPECIFYING EXECUTION TASK (HERE, IDLE TASK ID) | TIME AFTER TASK EXECUTION COMPLETION TIME PREDICTED BASED ON PRESENT TIME |

5500

METHOD FOR DEPLOYING TASK TO NODE BASED ON EXECUTION COMPLETION POINT, TASK DEPLOYMENT APPARATUS AND STORAGE MEDIUM

CROSS-REFERENCE TO RELATED APPLICATION

This application is based upon and claims the benefit of priority of the prior Japanese Patent Application No. 2017-165135, filed on Aug. 30, 2017, the entire contents of which are incorporated herein by reference.

FIELD

The embodiment discussed herein is related to a task deployment method, a task deployment apparatus and a storage medium.

BACKGROUND

In the related art, there is a cloud system which includes a plurality of nodes and in which any node executes a process on data obtained from Internet of Things (IoT) device and transmits an execution result to a terminal apparatus of a user. For example, a distributed processing technique such as Hadoop or a distributed resource management technique such as Mesos is applied to the cloud system.

As the related art, there is a technique in which a demand is dynamically predicted based on, for example, the past demand, an input area, and cost requirements, and the capacity of an object on a server is adjusted. For example, there is a technique in which a task is divided into one or more sub-tasks, and it is determined whether the task is executed in a local node or the task is distributed to one or more distributed nodes which can be accessed from the local node, based on an optimal number of nodes for executing one or more sub-tasks.

Japanese Laid-open Patent Publication No. 2001-67377 and Japanese Laid-open Patent Publication No. 2008-27442 are examples of the related art.

SUMMARY

According to an aspect of the invention, a non-transitory computer-readable storage medium storing a program that causes a computer to execute a process, the process includes acquiring a number of processes in a queue storing a process executed by a node; generating information for specifying an execution completion point for a new process in a case where the node is to execute the new process based on the acquired number of processes in the node, information regarding a process execution rate in the node, and information regarding a communication delay between a management node generating the new process and the node; and transmitting the generated information for specifying the execution completion point generated for the node to the management node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is an explanatory diagram illustrating an example of a first message;
FIG. 16 is an explanatory diagram illustrating an example of a second message;
FIG. 17 is an explanatory diagram illustrating an example of a third message;
FIG. 18 is an explanatory diagram illustrating an example of a fourth message;
FIG. 19 is an explanatory diagram illustrating an example of a fifth message;
FIG. 20 is an explanatory diagram illustrating an example of a sixth message;
FIG. 21 is an explanatory diagram illustrating an example of a seventh message;
FIG. 22 is an explanatory diagram illustrating an example of an eighth message;
FIG. 23 is an explanatory diagram illustrating an example of a ninth message;
FIG. 24 is an explanatory diagram illustrating an example of a tenth message;
FIG. 25 is an explanatory diagram illustrating an example of an eleventh message;
FIG. 26 is an explanatory diagram illustrating an example of a twelfth message;
FIG. 27 is an explanatory diagram illustrating an example of a thirteenth message;
FIG. 28 is an explanatory diagram illustrating an example of a fourteenth message;
FIG. 29 is an explanatory diagram illustrating an example of a fifteenth message;
FIG. 30 is an explanatory diagram illustrating an example of a sixteenth message.

FIG. 55 is an explanatory diagram (second) illustrating Example 2 of determining a deployment location;

DESCRIPTION OF EMBODIMENT

However, in the related art, if a certain node is to execute a process, it may not determine with high accuracy to determine whether or not execution of a process is completed by a predetermined time limit, and the execution of the process may not be completed by the predetermined time limit.

In one aspect, it is possible to deploy a process to a node which appears to complete execution of the process by a predetermined time limit.

Hereinafter, with reference to the drawings, an embodiment of a task deployment program, a task deployment method, and a task deployment apparatus will be described in detail.

One Example of Task Deployment Method According to Embodiment

Figure 1:
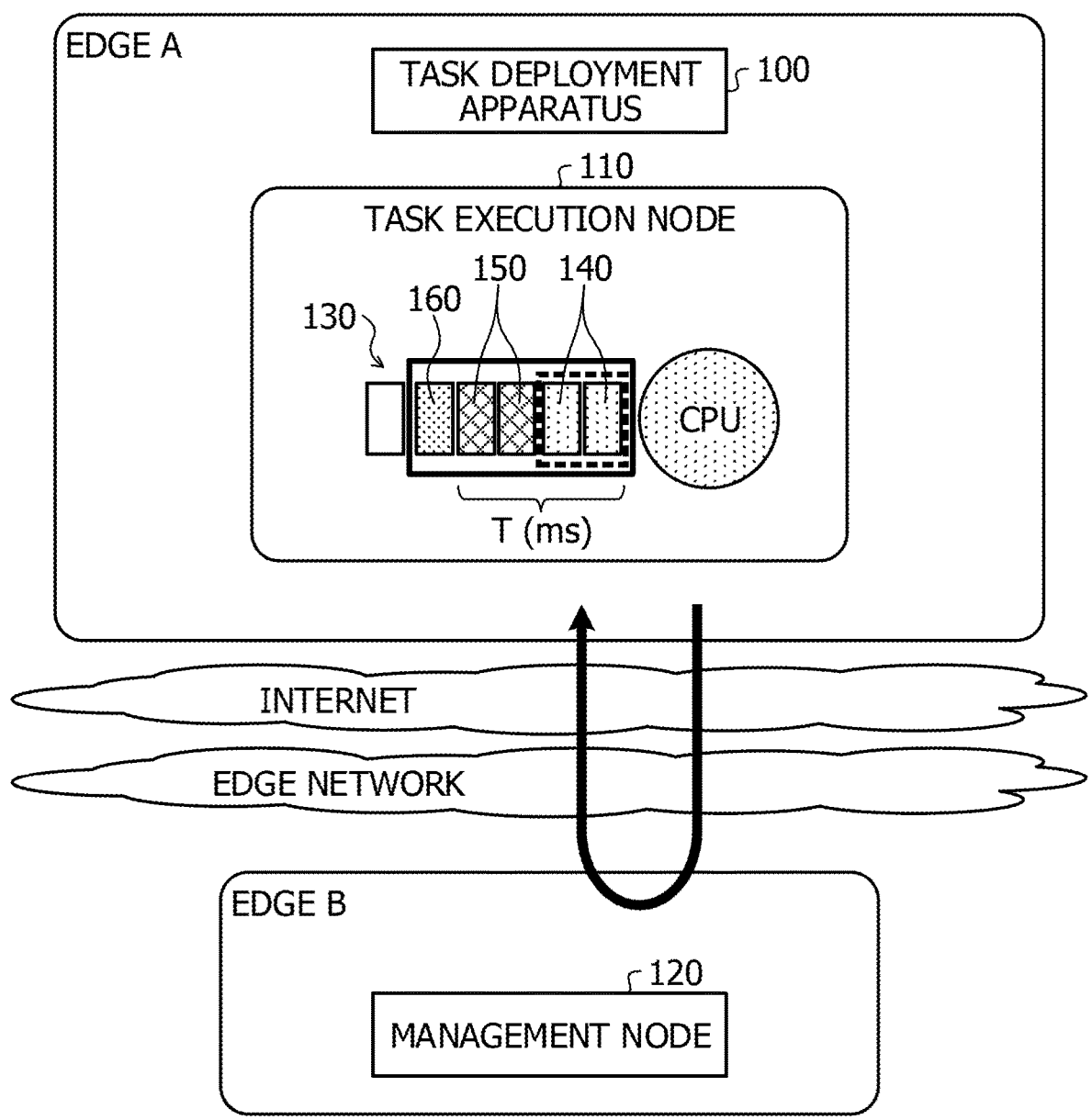
FIG. 1 is an explanatory diagram illustrating one Example of a task deployment method according to an embodiment.

FIG. 1 is an explanatory diagram illustrating one Example of a task deployment method according to an embodiment. In FIG. 1, a task deployment apparatus 100 is a computer which provided in a wide area distribution system.

The wide area distributed system includes a plurality of edges. Each of the edges is a part of the wide area distributed system including one or more nodes. Here, the edge may be present at a terminal end of the wide area distributed system, and may be present at the center of the wide area distributed system. The node includes a calculation device. The calculation device is, for example, a central processing unit (CPU).

If a new process occurs in any edge of the wide area distributed system, a deployment for the new process is determined, and the new process is executed. The process is, for example, a task. The deployment location is a node executing a task. A deployment location of a new process is determined to be a node included in an edge in which the new process occurs, or a node included in an edge which is different from the edge in which the new process occurs.

Here, in the wide area distributed system, when a deployment location of a new process is determined, there is a tendency to preferably determine a deployment location in which execution of the new process appears to be completed by a predetermined time limit. However, it is hard to determine a deployment location in which execution of a process is completed by a predetermined time limit.

For example, there may be a case where a process deployment location is controlled according to a distributed resource management technique such as Mesos. In this case, for example, a process deployment location may be determined without determining whether or not execution of a process is completed by a predetermined time limit if which node is to execute the process, and thus execution of the process may not be completed by the predetermined time limit.

In contrast, in a case where a node is to execute a new process based on the number of processes in the node and a process execution rate in the node, an execution completion point until execution of the new process is completed may be estimated, and it may be determined whether or not execution of the new process is completed by a predetermined time limit.

However, in a case where a node executes a plurality of processes, the node tends to execute the plurality of processes at predetermined time intervals. Thus, in a case where the number of processes in the node changes in real time, a process execution completion point also changes in real time. Therefore, it may not determine with high accuracy whether or not execution of a new process executed by the node is completed by a predetermined time limit.

In contrast, there may be a method in which a queue is provided in a node, processes executed by the node are managed by the queue, and an execution completion point for a process executed by the node is estimated based on the number of processes in the queue and a process execution rate in the node. Consequently, it is determined whether or not execution of a new process is completed by a predetermined time limit based on the estimated execution completion point.

However, the wide area distributed system tends to increase in a scale, and a communication delay between edges tends to increase. For example, the communication delay occurs in the unit of ms. Thus, in a case where a deployment location of a new process is determined to be a node included in an edge which is different from an edge in which the new process occurs, an estimated execution completion point may be different from an actual execution completion point for the new process due to a communication delay between the edges.

If an execution time for the new process is secured in the node based on the estimated execution completion point, the secured execution time may be wasted until a new process execution request reaches the node, and thus the node may idle. Since the execution time is secured in the node in a state in which the new process to be executed by the node does not arrive, the node may not execute other processes, and thus the node may not be efficiently used.

Therefore, in the present embodiment, a description will be made of a task deployment method in which a queue is provided in a node, processes executed by the node are managed by the queue, and the estimation accuracy of an execution completion point for a process executed by the node can be improved by taking into consideration a communication delay between nodes. According thereto, a process can be deployed to a node which appears to complete execution of the process by a predetermined time limit.

In FIG. 1, the task deployment apparatus 100 is provided in any edge. The task deployment apparatus 100 is provided in, for example, an edge A. The task deployment apparatus 100 can perform communication with a management node 120 included in an edge which is different from an edge including the task deployment apparatus 100. The management node 120 is a computer generating a new process. The management node 120 is provided in an edge which is different from an edge including the task deployment apparatus 100. The management node 120 is provided in, for example, an edge B.

The task deployment apparatus 100 can perform communication with a node included in the same edge as an edge including the task deployment apparatus 100. The node is provided in the edge A. The node has one or more calculation devices. The node has a queue storing a process. The node executes a process extracted from the queue one by one by using the calculation device. In the following description, the node will be referred to as a "task execution node 110" in some cases.

(1-1) The task deployment apparatus 100 acquires the number of processes in a queue storing a process executed by the task execution node 110. In the example illustrated in FIG. 1, the task deployment apparatus 100 acquires, for example, the number "2" of processes 140 stored in the queue. The task deployment apparatus 100 acquires information regarding a process execution rate in the task execution node 110.

The task deployment apparatus 100 acquires information regarding a communication delay between the management node 120 and the task execution node 110. The task deployment apparatus 100 acquires, for example, a round-trip delay T between the management node 120 and the task deployment apparatus 100 as the information regarding a communication delay between the management node 120 and the task execution node 110. The communication delay is a round-trip delay taken for round-trip communication between the management node 120 and the task deployment apparatus 100 via, for example, the Internet or an edge network.

The communication delay may be handled to be small enough to disregard the round-trip delay between the task execution node 110 and the task deployment apparatus 100, and thus may not include the round-trip delay between the task execution node 110 and the task deployment apparatus 100. The communication delay may include both of the round-trip delay taken for round-trip communication between the management node 120 and the task deployment apparatus 100 and the round-trip between the task execution node 110 and the task deployment apparatus 100.

(1-2) The task deployment apparatus 100 generates information for specifying an execution completion point for a new process 160 in a case where the task execution node 110 executes the new process 160. The execution completion point for the new process 160 is a time point at which execution of the new process 160 is completed in the task execution node 110. The task deployment apparatus 100 acquires, for example, the number of processes in the task execution node 110, information regarding a process execution rate in the task execution node 110, and information regarding a communication delay between the management node 120 and the task execution node 110. The task deployment apparatus 100 calculates an execution completion point for the new process 160 based on the acquired various pieces of information.

Here, there are a case where execution of processes 140 stored in the queue is not completed before the round-trip delay T elapses, and a case where execution of the processes 140 stored in the queue is completed before the round-trip delay T elapses. In a case where execution of the processes 140 stored in the queue is not completed, the task deployment apparatus 100 calculates an execution completion point for the new process 160 supposing that execution of the processes 140 stored in the queue is completed after the round-trip delay T elapses, and then the new process 160 is executed.

In a case where execution of the processes 140 stored in the queue is completed, the task deployment apparatus 100 calculates an execution completion point for the new process 160 supposing that the new process 160 is executed after the round-trip delay T elapses from completion of execution of the processes 140 stored in the queue. For example, the task execution node 110 may execute any process 150 until the round-trip delay T elapses.

(1-3) The task deployment apparatus 100 transmits information for specifying the execution completion point generated for the task execution node 110, to the management node 120. Consequently, the task deployment apparatus 100 can generate information for specifying the execution completion point for the new process 160 such that the execution completion point for the new process 160 can be specified with high accuracy.

(1-4) The management node 120 receives the information for specifying the execution completion point for the new process 160 from the task deployment apparatus 100. Consequently, the management node 120 can specify an execution completion point with high accuracy if the new process 160 is executed by the task execution node 110 in a case where the management node 120 generates the new process 160 in the future.

(1-5) In a case where the management node 120 generates the new process 160 based on predetermined data in response to reception of the predetermined data, the management node 120 determines whether or not the new process 160 is to be executed by the task execution node 110 based on the execution completion point indicated by the received information. Consequently, in a case where the task execution node 110 executes the new process 160, the management node 120 can determine whether or not execution of the new process is completed by a predetermined time limit with high accuracy, and can thus easily deploy the new process 160 such that execution thereof is completed by the predetermined time limit.

Here, in a case where the number of processes is acquired, the task deployment apparatus 100 may control the task execution node 110 to add a dummy process which can be replaced with the new process 160 to the queue. Consequently, the task deployment apparatus 100 enables an execution completion point for the new process 160 not to be deviated even if another process is added to the queue until the new process 160 is generated.

Herein, for simplification of description, a description has been made of a case where two edges are included in the wide area distributed system, there is a single task deployment apparatus 100, and there is a single management node 120, but this is only an example. For example, the wide area distributed system may include three or more edges. For example, two or more task deployment apparatuses 100 may be included in the wide area distributed system, and there may be two or more management nodes 120.

Herein, a description has been made of a case where the task execution node 110 includes a single CPU as a calculation device, but this is only an example. For example, the task execution node 110 may include a plurality of CPUs as a calculation device. The task execution node 110 may prepare for a queue for each calculation device, and may execute a process with each calculation device. In the task execution node 110, a process stored in the queue may be shared and executed by a plurality of calculation devices.

Herein, a description has been made of a case where a process execution rate is not variable regardless of the type of process, but this is only an example. For example, a process execution rate may differ depending on the type of process, and the task deployment apparatus 100 may store a process execution rate for each type of process.

Herein, a description has been made of a case where the edge includes the task deployment apparatus 100 and the task execution node 110, but this is only an example. For example, the task deployment apparatus 100 may be handled as a single edge, and a calculation device included in the task deployment apparatus 100 may be handled as the task execution node 110.

Herein, a description has been made of a case where a communication delay is a round-trip delay in the Internet or an edge network connecting the management node 120 to the task deployment apparatus 100, but this is only an example. For example, the communication delay may be a round-trip delay between the management node 120 and the task execution node 110 via the task deployment apparatus 100.

Herein, a description has been made of a case where an execution completion point for the new process 160 is a time point at which execution of the new process 160 is completed in the task execution node 110, but this is only an example. For example, an execution completion point for the new process 160 may be a time point at which it is detected that execution of the new process 160 is completed in the management node 120. Specifically, an execution completion point for the new process 160 may be a time point at which an execution result of the new process 160 is received in the management node 120 after execution of the new process 160 is completed in the task execution node 110.

Example of Wide Area Distributed System 200

Next, with reference to FIG. 2, a description will be made of the wide area distributed system 200 to which the task deployment apparatus 100 illustrated in FIG. 1 is applied.

Figure 2:
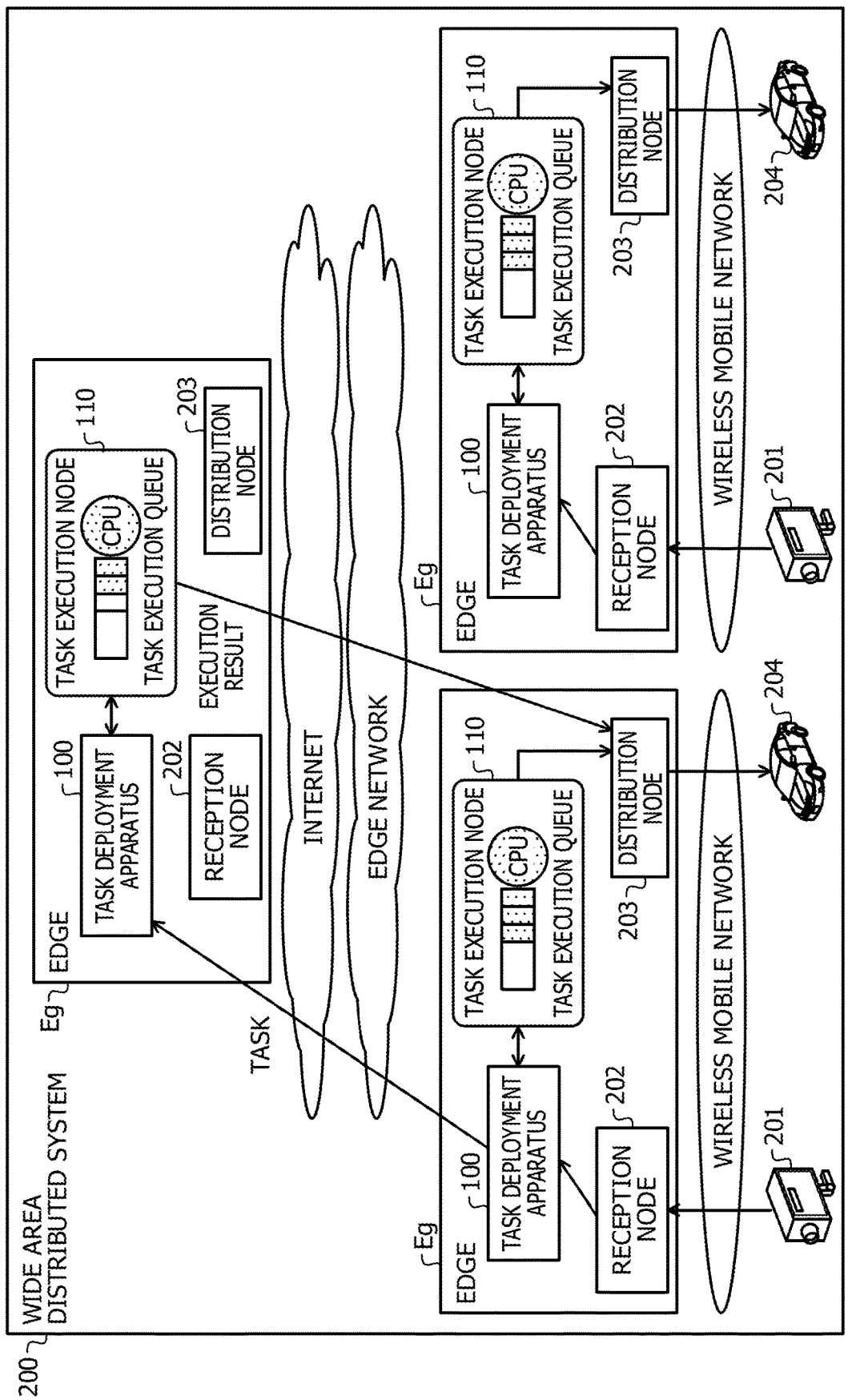
FIG. 2 is an explanatory diagram illustrating an example of a wide area distributed system.

FIG. 2 is an explanatory diagram illustrating an example of a wide area distributed system 200. In FIG. 2, the wide area distributed system 200 includes a plurality of edges Eg, data generation apparatuses 201, and terminal apparatuses 204. In the example illustrated in FIG. 2, the wide area distributed system 200 includes three edges Eg. Each of the edges Eg includes the reception node 202, the task deployment apparatus 100, one or more task execution nodes 110, and a distribution node 203.

In the wide area distributed system 200, the task deployment apparatuses 100 included in the respective edges Eg are connected to each other via wired or wireless network. A network connecting the task deployment apparatuses 100 included in the respective edges Eg to each other is, for example, the Internet or an edge network.

In the wide area distributed system 200, the data generation apparatus 201 and a reception node 202 are connected to each other via a wired or wireless network. A network connecting the data generation apparatus 201 and the reception node 202 to each other is, for example, a wireless mobile network. In the wide area distributed system 200, the distribution node 203 and the terminal apparatus 204 are connected to each other via a wired or wireless network. A network connecting the distribution node 203 and the terminal apparatus 204 to each other is, for example, a wireless mobile network.

In the edge Eg, the reception node 202 and the task deployment apparatus 100 are communicably connected to each other in a wired or wireless manner. In the edge Eg, the task deployment apparatus 100 and the task execution node 110 are communicably connected to each other in a wired or wireless manner. In the edge Eg, the task deployment apparatus 100 and the distribution node 203 are communicably connected to each other in a wired or wireless manner.

The data generation apparatus 201 is a computer which generates data used for execution of a task, and transmits the data to the task deployment apparatus 100 via the reception node 202. In the following description, data used for execution of a task will also be referred to as "processing target data" in some cases. The data generation apparatus 201 is, for example, a personal computer (PC), a tablet terminal, a smart phone, a wearable terminal, an imaging apparatus, or a sensor apparatus. The data generation apparatus 201 is, for example, an IoT device.

The reception node 202 is a computer which transmits the processing target data received from the data generation apparatus 201 to the task deployment apparatus 100. The reception node 202 is, for example, a server, a PC, a tablet terminal, a smart phone, or a wearable terminal.

The task deployment apparatus 100 receives the processing target data from the reception node 202. The task deployment apparatus 100 receives the number of tasks in a queue storing tasks executed by the task execution node 110, a process execution rate in the task execution node 110, and the like, from the task execution node 110. The queue of the task execution node 110 is a task execution queue which will be described in FIG. 10, for example.

The task deployment apparatus 100 generates a task using the received processing target data, and determines the task execution node 110 which is a deployment location of the task using the received processing target data. The task deployment apparatus 100 determines the task execution node 110 included in the edge Eg which is different from the edge including the task deployment apparatus 100 as a task deployment location. The task deployment apparatus 100 generates a task execution request for executing the task using the received processing target data, and transmits the task execution request to the task execution node 110 as determined as a deployment location. The task deployment apparatus 100 is, for example, a server or a PC.

The task execution node 110 is a computer having one or more CPUs. The task execution node 110 has a queue storing a task executed by the task execution node 110. The queue of the task execution node 110 is, for example, the task execution queue which will be described later in FIG. 10. The task execution node 110 transmits the number of tasks in the queue, a process execution rate in the task execution node 110, and the like to the task deployment apparatus 100 in response to an inquiry from the task deployment apparatus 100.

If a task execution request is received from the task deployment apparatus 100, the task execution node 110 executes a task corresponding to the task execution request by using the CPU. If the task is executed, the task execution node 110 transmits an execution result of the task to the task deployment apparatus 100 which is a transmission source of the task execution request. The task execution node 110 is, for example, a PC, a tablet terminal, a smart phone, or a wearable terminal.

The distribution node 203 is a computer which directly receives the task execution result from the task execution node 110 or receives the task execution result from the task execution node 110 via the task deployment apparatus 100, and transmits the received task execution result to the terminal apparatus 204. The distribution node 203 is, for example, a PC, a tablet terminal, a smart phone, or a wearable terminal.

The terminal apparatus 204 is a computer which outputs the task execution result received from the distribution node 203. The terminal apparatus 204 displays, for example, the task execution result on a display. The terminal apparatus 204 is, for example, a PC, a tablet terminal, a smart phone, a wearable terminal, or an on-vehicle apparatus.

Herein, a description has been made of a case where each of the edges Eg includes the reception node 202, one or more task execution nodes 110, and the distribution node 203, but this is only an example. For example, a certain edge Eg may not include at least one of the reception node 202, one or more task execution nodes 110, and the distribution node 203.

Herein, a description has been made of a case where the reception node 202, the task deployment apparatus 100, the task execution node 110, and the distribution node 203 are different apparatuses, but this is only an example. A combination of any two of the reception node 202, the task deployment apparatus 100, the task execution node 110, and the distribution node 203 are different apparatuses may be integrally configured. For example, the task deployment apparatus 100 may be integrally configured with the task execution node 110.

Hardware Configuration Example of Task Deployment Apparatus 100

Next, a description will be made of a hardware configuration example of the task deployment apparatus 100 with reference to FIG. 3.

Figure 3:
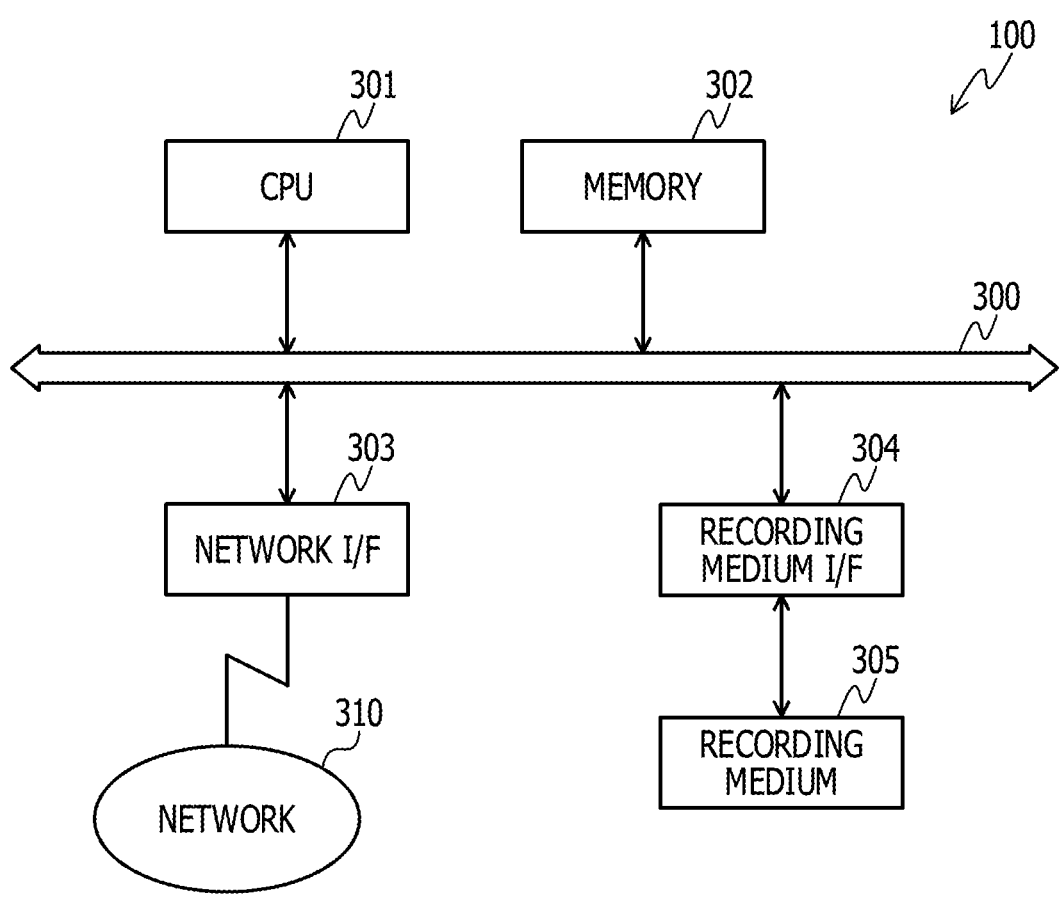
FIG. 3 is a block diagram illustrating a hardware configuration example of a task deployment apparatus.

FIG. 3 is a block diagram illustrating a hardware configuration example of the task deployment apparatus 100. In FIG. 3, the task deployment apparatus 100 includes a CPU 301, a memory 302, a network interface (I/F) 303, a recording medium I/F 304, and a recording medium 305. The respective constituent elements are connected to each other via a bus 300.

Here, the CPU 301 controls the entire task deployment apparatus 100. The memory 302 includes, for example, a read only memory (ROM), a random access memory (RAM), a flash ROM, and the like. Specifically, for example, various programs are stored in the flash ROM or the ROM, and the RAM is used as a work area of the CPU 301. The programs stored in the memory 302 are loaded to the CPU 301, and thus cause a process which is being coded to be executed by the CPU 301. The memory 302 stores various databases (DBs) which will be described later in FIGS. 4 to 7.

The network I/F 303 is connected to the network 310 via a communication line, and is connected to other computers via the network 310. The network 310 is, for example, a network connecting the respective apparatuses in the edge Eg to each other, the Internet illustrated in FIG. 2, or the edge network illustrated in FIG. 2. The network I/F 303 functions as an internal interface with the network 310, and controls input and output of data from and to other computers. For example, a modem or a local area network (LAN) adaptor may be employed in the network I/F 303.

The recording medium I/F 304 controls read/write of data for the recording medium 305 under the control of the CPU 301. The recording medium I/F 304 is, for example, a disk driver, a solid state drive (SSD), or a Universal Serial Bus (USB) port. The recording medium 305 is a nonvolatile memory storing written data under the control of the recording medium I/F 304. The recording medium 305 is, for example, a semiconductor memory or a USB memory. The recording medium 305 may be attachable to and detachable from the task deployment apparatus 100.

The task deployment apparatus 100 may include, for example, a keyboard, a mouse, a display, a printer, a scanner, a microphone, and a speaker in addition to the above-described constituent elements. The task deployment apparatus 100 may not include the recording medium I/F 304 or the recording medium 305.

Example of Storage Content of Edge Management DB 400

Next, with reference to FIG. 4, a description will be made of an example of the storage content of an edge management DB 400. The edge management DB 400 is realized by, for example, a storage region such as the memory 302 or the recording medium 305 of the task deployment apparatus 100 illustrated in FIG. 3.

Figure 4:
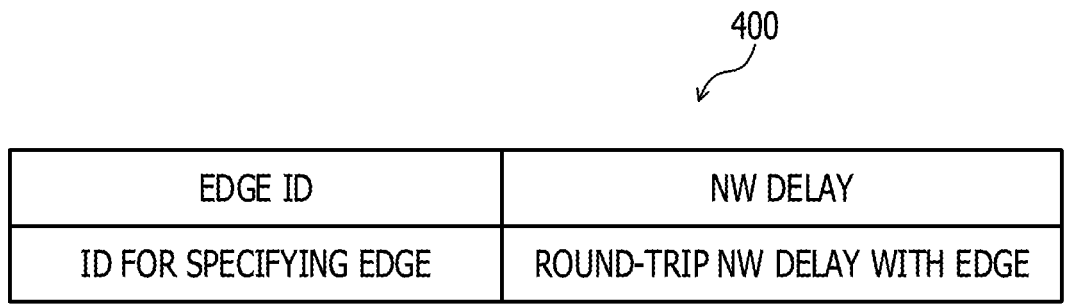
FIG. 4 is an explanatory diagram illustrating an example of the storage content of an edge management DB.

FIG. 4 is an explanatory diagram illustrating an example of the storage content of the edge management DB 400. As illustrated in FIG. 4, the edge management DB 400 has fields of an edge ID and a network (NW) delay. In the edge management DB 400, information is set in each field, and thus edge management information is stored as a record.

Among a plurality of edges Eg included in the wide area distributed system 200, an edge ID for the edge Eg which is different from the edge Eg including the task deployment apparatus 100 is set in the field of an edge ID. The edge ID is an ID for specifying the edge Eg. A round-trip NW delay from the task deployment apparatus 100 to the edge Eg specified by the edge ID is set in the field of an NW delay. The unit of the round-trip NW delay is, for example, ms.

Example of Storage Content of Offer Information DB 500

Next, with reference to FIG. 5, a description will be made of an example of the storage content of an offer information DB 500. The offer information DB 500 is realized by, for example, a storage region such as the memory 302 or the recording medium 305 of the task deployment apparatus 100 illustrated in FIG. 3.

Figure 5:
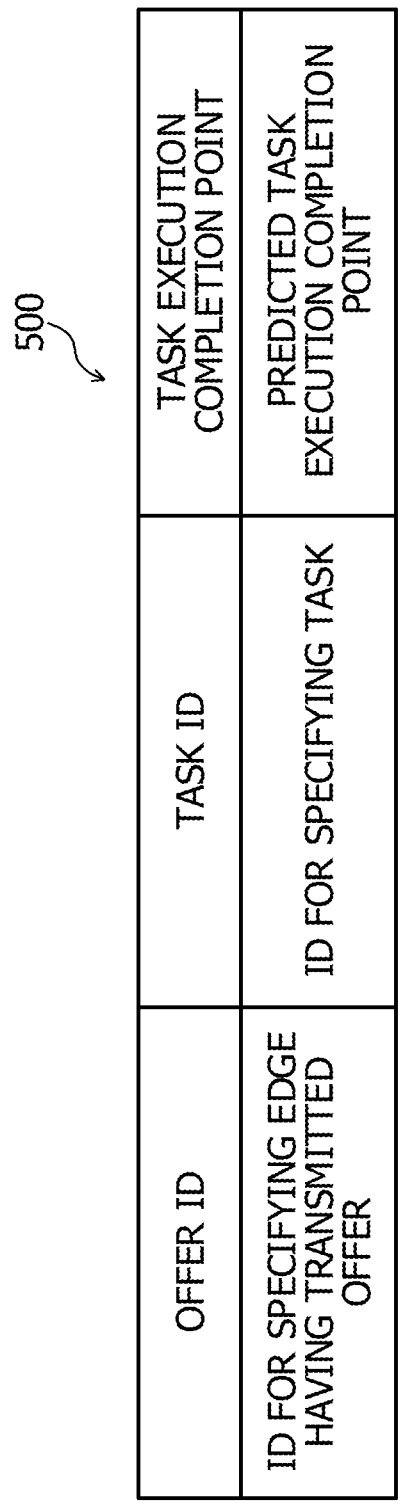
FIG. 5 is an explanatory diagram illustrating an example of the storage content of an offer information DB.

FIG. 5 is an explanatory diagram illustrating an example of the storage content of the offer information DB 500. As illustrated in FIG. 5, the offer information DB 500 has fields of an offer ID, a task ID, and a task execution completion point. In the offer information DB 500, information is set in each field, and thus offer information is stored as a record.

An offer ID is set in the field of an offer ID. The offer ID is an ID for specifying the edge Eg which has transmitted offer information. The offer information is a notification indicating that the task execution node 110 can execute a new task. A task ID is set in the field of a task ID. The task ID is an ID for specifying a task. The task ID is an ID for specifying, for example, an idle task which can be replaced with a generated new task. A task execution completion point in the task execution node 110 which is an offer information generation target is set in the field of a task execution completion point. The task execution completion point is an estimated task execution completion point.

Example of Storage Content of Task Management DB 600

Next, with reference to FIG. 6, a description will be made of an example of the storage content of a task management DB 600. The task management DB 600 is realized by, for example, a storage region such as the memory 302 or the recording medium 305 of the task deployment apparatus 100 illustrated in FIG. 3.

Figure 6:
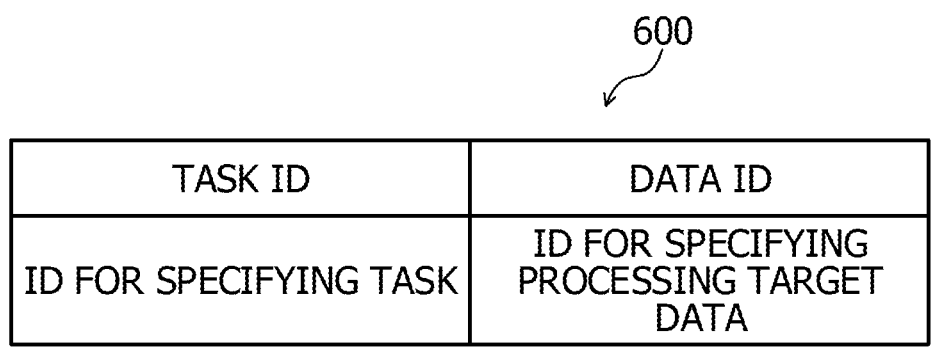
FIG. 6 is an explanatory diagram illustrating an example of the storage content of a task management DB.

FIG. 6 is an explanatory diagram illustrating an example of the storage content of the task management DB 600. As illustrated in FIG. 6, the task management DB 600 has fields of a task ID and a data ID. In the task management DB 600, information is set in each field, and thus task management information is stored as a record.

A task ID is set in the field of a task ID. The task ID is an ID for specifying a task. The task ID is, for example, an ID for specifying a task which waits for execution. A data ID is set in the field of a data ID. The data ID is an ID for specifying processing target data used for a task corresponding to the task ID.

Example of Storage Content of Data Management DB 700

Next, with reference to FIG. 7, a description will be made of an example of the storage content of a data management DB 700. The data management DB 700 is realized by, for example, a storage region such as the memory 302 or the recording medium 305 of the task deployment apparatus 100 illustrated in FIG. 3.

Figure 7:
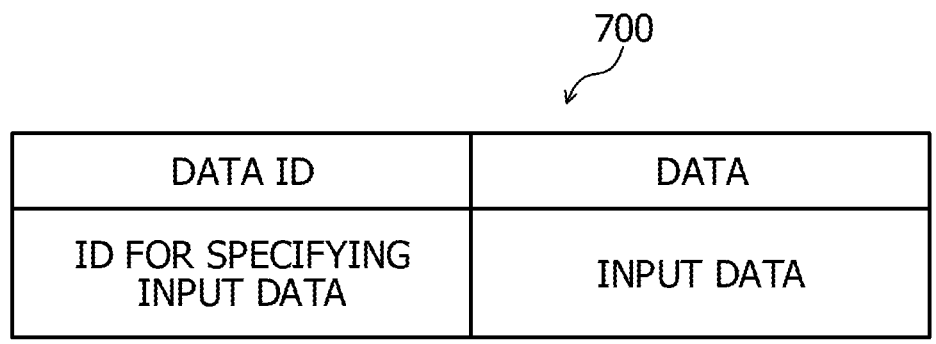
FIG. 7 is an explanatory diagram illustrating an example of the storage content of a data management DB.

FIG. 7 is an explanatory diagram illustrating an example of the storage content of the data management DB 700. As illustrated in FIG. 7, the data management DB 700 has fields of a data ID and data. In the data management DB 700, information is set in each field, and thus data is stored as a record.

A data ID is set in the field of a data ID. The data ID is an ID for specifying input data which is processing target data and is received from the data generation apparatus 201 via the data reception node 202. The input data indicated by the data ID is set in the field of data. For example, the input data which is received from the data generation apparatus 201 via the data reception node 202 is set in the field of data.

Hardware Configuration Example of Data Generation Apparatus 201

A hardware configuration example of the data generation apparatus 201 is the same as, for example, the hardware configuration example of the task deployment apparatus 100 illustrated in FIG. 3, and thus description thereof will be omitted. The data generation apparatus 201 may further include an imaging element, a sensor, or the like. The sensor is, for example, an acceleration sensor, an angular velocity sensor, a magnetic sensor, or a vibration sensor.

Hardware Configuration Example of Reception Node 202

A hardware configuration example of the reception node 202 is the same as, for example, the hardware configuration example of the task deployment apparatus 100 illustrated in FIG. 3, and thus description thereof will be omitted.

Hardware Configuration Example of Task Execution Node 110

Next, with reference to FIG. 8, a description will be made of a hardware configuration example of the task execution node 110.

Figure 8:
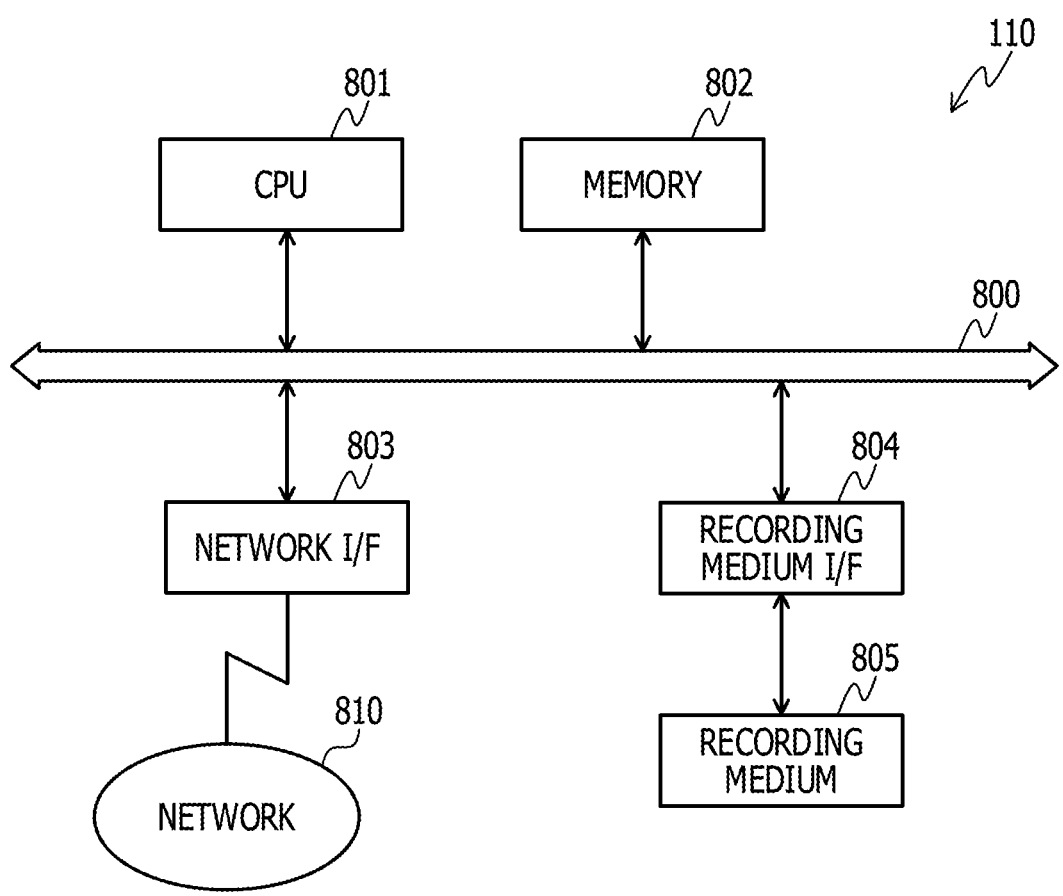
FIG. 8 is a block diagram illustrating a hardware configuration example of a task execution node.

FIG. 8 is a block diagram illustrating a hardware configuration example of the task execution node 110. In FIG. 8, the task execution node 110 includes one or more CPUs 801, a memory 802, a network I/F 803, a recording medium I/F 804, and a recording medium 805. The respective constituent elements are connected to each other via a bus 800.

Here, the CPUs 801 control the entire task execution node 110. The memory 802 includes, for example, a ROM, a RAM, and a flash ROM. Specifically, for example, various programs are stored in the flash ROM or the ROM, and the RAM is used as a work area of each of the CPUs 801. The programs stored in the memory 802 are loaded to the CPU 801, and thus cause a process which is being coded to be executed by the CPU 801. The memory 802 stores various DBs which will be described later in FIGS. 9 to 12.

The network I/F 803 is connected to a network 810 via a communication line, and is connected to other computers via the network 810. The network 810 is, for example, a network connecting the respective apparatuses in the edge Eg to each other. The network I/F 803 functions as an internal interface with the network 810, and controls input and output of data from and to other computers. For example, a modem or a LAN adaptor may be employed in the network I/F 803.

The recording medium I/F 804 controls read/write of data for the recording medium 805 under the control of the CPU 801. The recording medium I/F 804 is, for example, a disk driver, an SSD, or a USB port. The recording medium 805 is a nonvolatile memory storing written data under the control of the recording medium I/F 804. The recording medium 805 is, for example, a semiconductor memory or a USB memory. The recording medium 805 may be attachable to and detachable from the task execution node 110.

The task execution node 110 may include, for example, a keyboard, a mouse, a display, a printer, a scanner, a microphone, and a speaker in addition to the above-described constituent elements. The task execution node 110 may not include the recording medium I/F 804 or the recording medium 805.

Example of Storage Content of Queue State DB 900

Next, with reference to FIG. 9, a description will be made of an example of the storage content of a queue state DB 900. The queue state DB 900 is realized by, for example, a storage region such as the memory 802 or the recording medium 805 of the task execution node 110 illustrated in FIG. 8.

Figure 9:
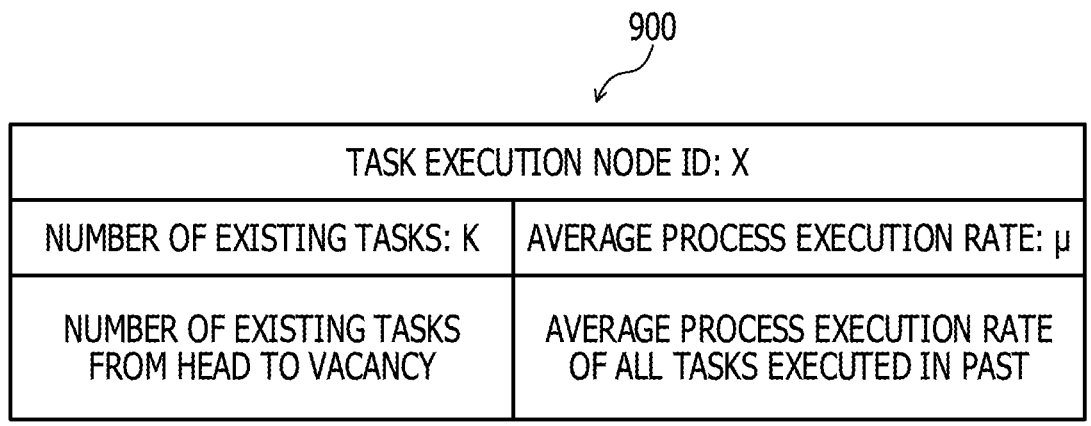
FIG. 9 is an explanatory diagram illustrating an example of the storage content of a queue state DB.

FIG. 9 is an explanatory diagram illustrating an example of the storage content of the queue state DB 900. As illustrated in FIG. 9, the queue state DB 900 has fields of a task execution node ID, the number of existing tasks, and an average process execution rate. In the queue state DB 900, information is set in each field, and thus a queue state is stored as a record.

A task execution node ID is set in the field of a task execution node ID. The task execution node ID is an ID for specifying the task execution node 110 storing the queue state DB 900. The task execution node ID is, for example, X. X is an integer of 1 to k. Here, k is the number of task execution nodes 110 in the wide area distributed system 200.

The number of existing tasks is set in the field of existing tasks. The number of existing tasks is the number of existing tasks from the head to a vacancy of a task execution queue which will be described in FIG. 10 and is included in the task execution node 110 indicated by the task execution node ID. An average process execution rate is set in the field of an average process execution rate. The average process execution rate is an average process execution rate of all tasks executed in the past by the task execution node 110 indicated by the task execution node ID.

For example, the queue state DB 900 is prepared for each CPU 801 of the task execution node 110. For example, the task execution node 110 stores the queue state DB 900 for managing the task execution queue storing an executed task for each CPU 801. The task execution node 110 may store a single queue state DB 900 for managing the task execution queue storing tasks which are shared and executed by one or more CPUs 801.

Example of Storage Content of Task Execution Queue 1000

Next, with reference to FIG. 10, a description will be made of an example of the storage content of the task execution queue 1000. The task execution queue 1000 is realized by, for example, a storage region such as the memory 802 or the recording medium 805 of the task execution node 110 illustrated in FIG. 8.

Figure 10:
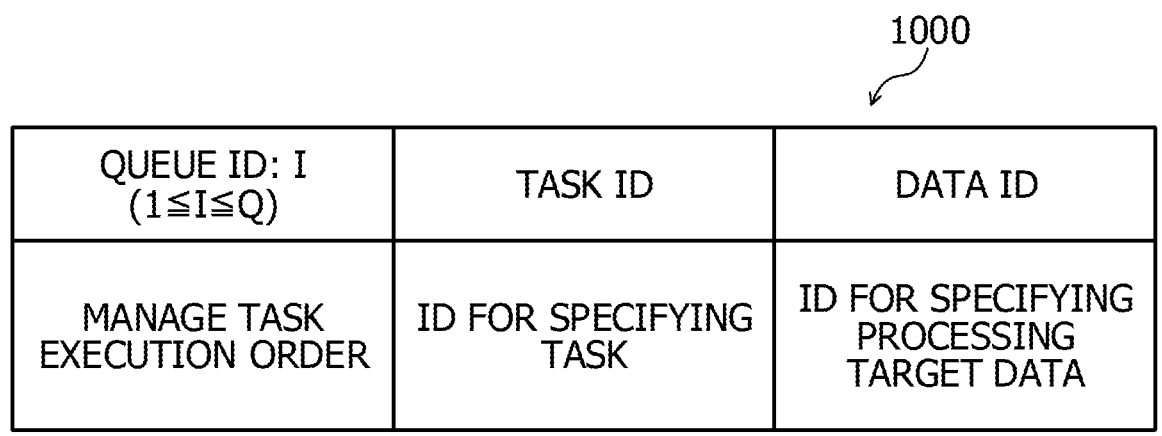
FIG. 10 is an explanatory diagram illustrating an example of the storage content of a task execution queue.

FIG. 10 is an explanatory diagram illustrating an example of the storage content of the task execution queue 1000. As illustrated in FIG. 10, the task execution queue 1000 has fields of a queue ID, a task ID, and a data ID. In the task execution queue 1000, information is set in each field, and thus task deployment information is stored as a record.

A queue ID is set in the field of a queue ID. The queue ID is an ID for managing an execution order of tasks stored in the task execution queue 1000. The queue ID is, for example, I. I is an integer of 1 to Q. Q is, for example, the number of tasks which can be stored in the task execution queue 1000.

A task ID is set in the field of a task ID. The task ID is an ID for specifying a task stored in the task execution queue 1000. The task ID is, for example, an ID for specifying the type of task. The type of task includes an idle task. A data ID for specifying processing target data used for a task corresponding to the task ID is set in the field of a data ID. The data ID is NULL in a case where the task ID indicates an idle task.

The task execution queue 1000 is based on, for example, first in first out (FIFO). For example, the task execution queue 1000 is prepared for each CPU 801 of the task execution node 110. For example, the task execution node 110 stores the task execution queue 1000 storing an executed task for each CPU 801. The task execution node 110 may store a single task execution queue 1000 storing tasks which are shared and executed by one or more CPUs 801.

Example of Storage Content of Data Management DB 1100

Next, with reference to FIG. 11, a description will be made of an example of the storage content of the data management DB 1100. The data management DB 1100 is realized by, for example, a storage region such as the memory 802 or the recording medium 805 of the task execution node 110 illustrated in FIG. 8.

Figure 11:
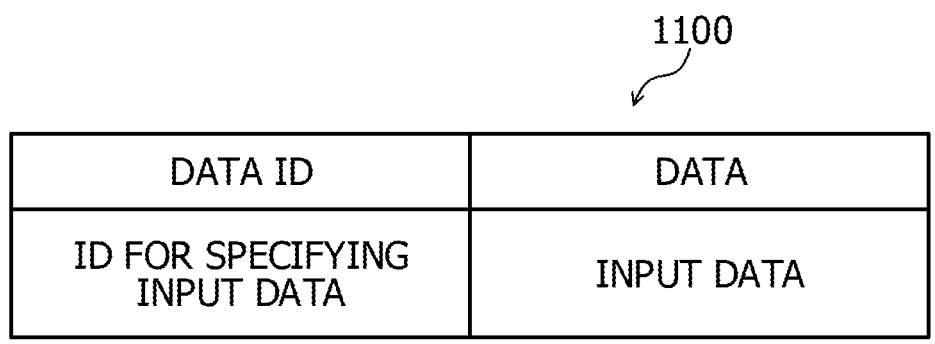
FIG. 11 is an explanatory diagram illustrating an example of the storage content of a data management DB.

FIG. 11 is an explanatory diagram illustrating an example of the storage content of the data management DB 1100. As illustrated in FIG. 11, the data management DB 1100 has fields of a data ID and data. In the data management DB 1100, information is set in each field, and thus data is stored as a record.

A data ID is set in the field of a data ID. The data ID is an ID for specifying input data which is processing target data and is received from the data generation apparatus 201 via the reception node 202. The input data indicated by the data ID is set in the field of data. For example, the input data which is received from the data generation apparatus 201 via the reception node 202 is set in the field of data.

Hardware Configuration Example of Distribution Node 203

A hardware configuration example of the distribution node 203 is the same as, for example, the hardware configuration example of the task deployment apparatus 100 illustrated in FIG. 3, and thus description thereof will be omitted.

Hardware Configuration Example of Terminal Apparatus 204

A hardware configuration example of the terminal apparatus 204 is the same as, for example, the hardware configuration example of the task deployment apparatus 100 illustrated in FIG. 3, and thus description thereof will be omitted. The terminal apparatus 204 may include a speaker or a display.

Example of Storage Content of User DB 1200

Next, with reference to FIG. 12, a description will be made of an example of the storage content of a user DB 1200. The user DB 1200 is realized by, for example, a storage region such as the memory 302 or the recording medium 305 of the task deployment apparatus 100 illustrated in FIG. 3, or a storage region such as the memory 802 or the recording medium 805 of the task execution node 110 illustrated in FIG. 8.

Figure 12:
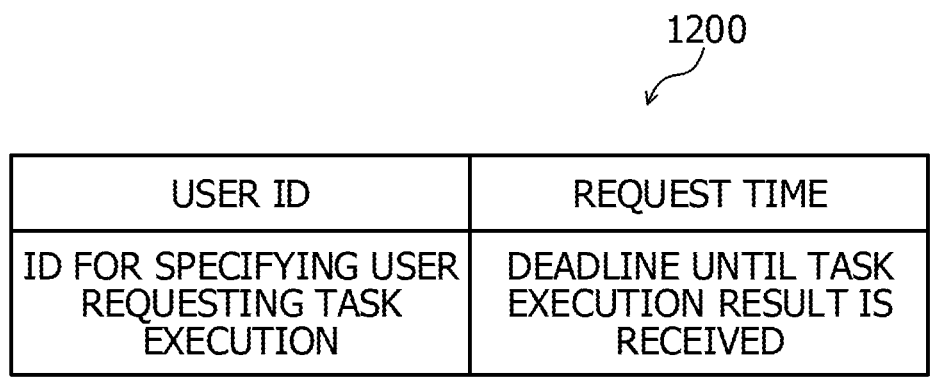
FIG. 12 is an explanatory diagram illustrating an example of the storage content of a user DB.

FIG. 12 is an explanatory diagram illustrating an example of the storage content of the user DB 1200. As illustrated in FIG. 12, the user DB 1200 has a field of request time in correlation with a field of a user ID. In the user DB 1200, information is set in each field, and thus user information is stored as a record.

A user ID is set in the field of a user ID. The user ID is an ID for specifying a user of the terminal apparatus 204 having transmitted a task execution request. Request time is set in the field of request time. The request time is a deadline indicating a time limit by which a task execution result is received. The user DB 1200 may be included in the distribution node 203 or the terminal apparatus 204.

Functional Configuration Example of Task Deployment Apparatus 100

Next, with reference to FIG. 13, a description will be made of a functional configuration example of the task deployment apparatus 100.

Figure 13:
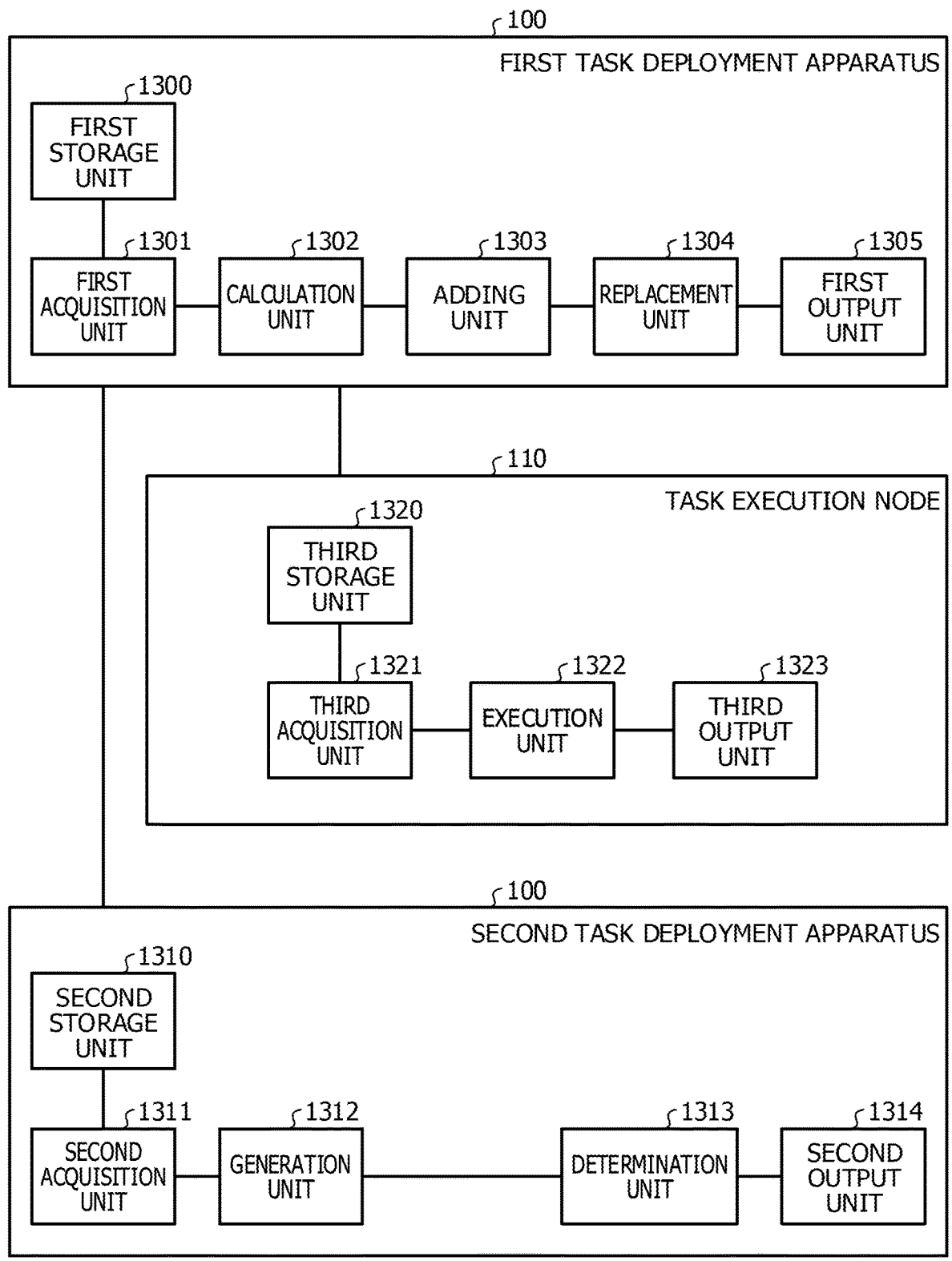
FIG. 13 is a block diagram illustrating a functional configuration example of the task deployment apparatus.

FIG. 13 is a block diagram illustrating a functional configuration example of the task deployment apparatus 100. The example in FIG. 13 illustrates a functional configuration example in a case where the task deployment apparatus 100 generates offer information and a functional configuration example in a case where the task deployment apparatus 100 determines a task deployment location based on the offer information.

In the following description, the task deployment apparatus 100 which generates offer information will be referred to as a "first task deployment apparatus 100", and task deployment apparatus 100 which determines a task deployment location will be referred to as a "second task deployment apparatus 100" for differentiation therebetween. The second task deployment apparatus 100 operates as, for example, the management node 120 illustrated in FIG. 1.

The first task deployment apparatus 100 includes a first storage unit 1300, a first acquisition unit 1301, a calculation unit 1302, an adding unit 1303, a replacement unit 1304, and a first output unit 1305. The first storage unit 1300 is realized by, for example, a storage region such as the memory 302 or the recording medium 305 illustrated in FIG. 3. Hereinafter, a description will be made of a case where the first storage unit 1300 is included in the task deployment apparatus 100, but this is only an example. For example, the first storage unit 1300 may be included in an apparatus which is different from the task deployment apparatus 100, and the storage content of the first storage unit 1300 may be referred to from the task deployment apparatus 100.

The first acquisition unit 1301 to the first output unit 1305 realize functions of a control unit. Specifically, for example, the functions of the first acquisition unit 1301 to the first output unit 1305 are realized by the CPU 301 executing the program stored in the storage region such as the memory 302 or the recording medium 305 illustrated in FIG. 3, or by the network I/F 303. A processing result in each functional unit is stored in, for example, the storage region such as the memory 302 or the recording medium 305 illustrated in FIG. 3.

The first storage unit 1300 stores information for managing one or more nodes. The node is, for example, the task execution node 110 illustrated in FIG. 8. The task execution node 110 includes one or more calculation devices. The task execution node 110 includes the task execution queue 1000 storing processes. The task execution node 110 executes processes extracted from the task execution queue 1000 one by one by using the calculation device. The first storage unit 1300 stores information for managing one or more edges Eg included in the wide area distributed system 200. The first storage unit 1300 stores, for example, the edge management DB 400 illustrated in FIG. 4.

The first storage unit 1300 stores an execution completion point for a process executed by the task execution node 110. The process is, for example, a task. The first storage unit 1300 stores, for example, the offer information DB 500 illustrated in FIG. 5. The first storage unit 1300 stores information for managing a task. The first storage unit 1300 stores, for example, the task management DB 600 illustrated in FIG. 6. The first storage unit 1300 stores information for managing processing target data used for a task. The first storage unit 1300 stores, for example, the data management DB 700 illustrated in FIG. 7. Consequently, the first storage unit 1300 can allow the storage content of the various DBs illustrated in FIGS. 4 to 7 to be referred to in a process of each functional unit.

The first acquisition unit 1301 acquires the number of tasks in the task execution queue 1000 storing a task executed by the task execution node 110 at a predetermined timing. The predetermined timing is, for example, a timing every predetermined time. The predetermined timing may be a preset predetermined time point. The predetermined timing may be a timing at which a predetermined event occurs. The predetermined event is generation of a task or an input operation of a user.

For example, in a case where there are a plurality of task execution nodes 110, the first acquisition unit 1301 acquires the number of tasks in the task execution queue 1000 storing a task executed by the task execution node 110 which is randomly selected. Specifically, the first acquisition unit 1301 acquires the storage content of the queue state DB 900 from the randomly selected task execution node 110, and acquires the number of tasks in the task execution queue 1000. Consequently, the first acquisition unit 1301 can specify the number of tasks in the randomly selected task execution node 110, and can thus acquire an index for calculating a task execution completion point in a case where the randomly selected task execution node 110 executes a new task.

For example, in a case where there are a plurality of task execution nodes 110, the first acquisition unit 1301 may acquire the number of tasks in the task execution queue 1000 storing a task executed by each of the task execution nodes 110. Specifically, the first acquisition unit 1301 acquires the storage content of the queue state DB 900 from each of a plurality of task execution nodes 110. The first acquisition unit 1301 acquires the number of tasks in the task execution queue 1000 based on the storage content of the queue state DB 900 of each task execution node 110. Consequently, the first acquisition unit 1301 can specify the number of tasks in each task execution node 110, and can thus acquire an index for calculating a task execution completion point in a case where each task execution node 110 executes a new task.

The first acquisition unit 1301 acquires information regarding a task execution rate in the task execution node 110 at a predetermined timing. The predetermined timing is, for example, a timing every predetermined time. The predetermined timing may be a preset predetermined time point. The predetermined timing may be a timing at which a predetermined event occurs. The predetermined event is generation of a task or an input operation of a user.

The first acquisition unit 1301 acquires the storage content of the queue state DB 900 of each task execution node 110 from each of one or more task execution nodes 110. The first acquisition unit 1301 acquires a task execution rate in the task execution node 110 based on the storage content of the queue state DB 900 of each task execution node 110. Consequently, the first acquisition unit 1301 can acquire an index for calculating a task execution completion point in a case where each task execution node 110 executes a new task.

The first acquisition unit 1301 acquires information regarding a communication delay between the second task deployment apparatus 100 and the task execution node 110. The communication delay may be handled to be small enough to disregard the round-trip delay between the task execution node 110 and the first task deployment apparatus 100. The communication delay is the round-trip delay T taken for round-trip communication between the first task deployment apparatus 100 and the second task deployment apparatus 100 via, for example, the Internet or an edge network.

The first acquisition unit 1301 acquires, for example, a communication delay between the first task deployment apparatus 100 and the second task deployment apparatus 100. Specifically, the first acquisition unit 1301 acquires the communication delay between the first task deployment apparatus 100 and the second task deployment apparatus 100 by referring to the edge management DB 400. Consequently, the first acquisition unit 1301 can specify at least how long it takes for a task execution request for a new task to be transmitted from the second task deployment apparatus 100. The first acquisition unit 1301 can acquire an index for calculating a task execution completion point in a case where each task execution node 110 executes a new task.

The calculation unit 1302 generates information for specifying an execution completion point for a new task in a case where each task execution node 110 executes the new task. The execution completion point for a new task is a time point at which execution of the new task is completed in the task execution node 110. The calculation unit 1302 generates the information for specifying the execution completion point for a new task based on, for example, the number of tasks in the task execution node 110, information regarding a task execution rate, and information regarding communication delay between the second task deployment apparatus 100 and the task execution node 110.

Here, there are a case where execution of a task stored in the task execution queue 1000 is not completed before the round-trip delay T elapses, and a case where execution of the task stored in the task execution queue 1000 is completed before the round-trip delay T elapses. Specifically, in a case where execution of a task stored in the task execution queue 1000 is not completed, the calculation unit 1302 determines that execution of the task stored in the task execution queue 1000 is completed after the round-trip delay T elapses, and then a new task is executed. The calculation unit 1302 calculates an execution completion point for the new task based on a determination result.

Specifically, in a case where execution of a task stored in the task execution queue 1000 is completed, the calculation unit 1302 determines that the round-trip delay T elapses after execution of the task stored in the task execution queue 1000 is completed, and then a new task is executed. The calculation unit 1302 calculates an execution completion point for the new task based on a determination result. For example, the task execution node 110 may execute any task until the round-trip delay T elapses. Consequently, the calculation unit 1302 can generate information for specifying an execution completion point for a new task such that the execution completion point for the new task can be specified with high accuracy in the second task deployment apparatus 100.

For example, in a case where there are a plurality of second task deployment apparatuses 100, the calculation unit 1302 may select the second task deployment apparatus 100 having a relatively small communication delay with the task execution node 110. The calculation unit 1302 generates information for specifying an execution completion point for a new task in a case where the new task is executed by the task execution node 110 based on information regarding a communication delay between the selected second task deployment apparatus 100 and the task execution node 110.

Consequently, the calculation unit 1302 can calculate a task execution completion point for the second task deployment apparatus 100 which has a relatively small communication delay, and is thus determined to have a relatively high probability of transmitting a task execution request for a new task. The calculation unit 1302 enables a task execution request for a new task to be easily received from the second task deployment apparatus 100 by using the calculated task execution completion point.

For example, in a case where there are a plurality of second task deployment apparatuses 100, the calculation unit 1302 may select the second task deployment apparatus 100 having a relatively large process load on the second task deployment apparatus 100. The process load on the second task deployment apparatus 100 is a process load taken for the second task deployment apparatus 100. The process load on the second task deployment apparatus 100 may be a process load taken for one or more task execution nodes 110 managed by the second task deployment apparatus 100. The calculation unit 1302 generates information for specifying an execution completion point for a new task in a case where the new task is executed by the task execution node 110 based on information regarding a communication delay between the selected second task deployment apparatus 100 and the task execution node 110.

Consequently, the calculation unit 1302 can calculate a task execution completion point for the second task deployment apparatus 100 which has a relatively large process load, and is thus determined to have a relatively high probability of transmitting an execution request for a new task. The calculation unit 1302 enables an execution request for a new process to be easily received from the second task deployment apparatus 100 by using the calculated task execution completion point.

The calculation unit 1302 selects the task execution node 110 having a relatively small number of tasks from among one or more task execution nodes 110. The calculation unit 1302 generates information for an execution completion point for a new task based on the number of tasks and information regarding a task execution rate in the selected task execution node 110, and information regarding a communication delay between the second task deployment apparatus 100 and the task execution node 110. Specifically, the execution completion point for the new task is an execution completion point in a case where the selected task execution node 110 executes the new task.

Consequently, the calculation unit 1302 can select the task execution node 110 which has a relatively high probability of executing a new task generated in the future and in which the time until execution of the new task is completed from generation of the new task generated in the future appears to be relatively short. Thus, the calculation unit 1302 enables a task execution request for a new task to be easily received from the second task deployment apparatus 100. Thus, the calculation unit 1302 can make it difficult for the task execution node 110 which wastefully uses a calculation resource or the like without executing a new task although an idle task is added to occur.

The adding unit 1303 causes the task execution node 110 to add a predetermined number of dummy tasks to the task execution queue 1000 based on a task time corresponding to a communication delay in a case where the number of tasks in the task execution queue 1000 is acquired. The dummy tasks are idle tasks.

For example, the adding unit 1303 causes the task execution node 110 to add a first idle task to the task execution queue 1000 until a task time corresponding to the task execution queue 1000 becomes a task time corresponding to a communication delay. The adding unit 1303 causes a second idle task which can be replaced with a new task to be added to the task execution queue 1000.

The adding unit 1303 transmits an execution order securing request for adding an idle to the task execution queue 1000 to the task execution node 110. Consequently, the adding unit 1303 can cause an idle task which can be replaced with a new task to be added to the task execution queue 1000 in a case where the new task is generated in the future.

In a case where an execution request for a new task is received from the second task deployment apparatus 100, the replacement unit 1304 causes the task execution node 110 to replace the idle task added to the task execution queue 1000 with the new task. Consequently, the replacement unit 1304 enables the task execution node 110 to complete execution of the new task from the second task deployment apparatus 100 by a calculated task execution completion point.

In a case where a new second task is generated based on predetermined data in response to reception of the predetermined data, the replacement unit 1304 causes the task execution node 110 to replace the first idle task added to the task execution queue 1000 with the generated second task. Consequently, the replacement unit 1304 enables the task execution node 110 to execute the second task until a new task from the second task deployment apparatus 100 starts to be executed, and can thus efficiently use the task execution node 110.

The first output unit 1305 transmits information for specifying an execution completion point generated for the task execution node 110, to the second task deployment apparatus 100. In a case where there are a plurality of second task deployment apparatuses 100, the first output unit 1305 transmits information for specifying an execution completion point generated for the task execution node 110, to the selected second task deployment apparatus 100. Consequently, the first output unit 1305 enables the second task deployment apparatus 100 to specify with high accuracy an execution completion point for a new task in a case where the task execution node 110 executes the new task generated in the second task deployment apparatus 100.

The first output unit 1305 outputs a processing result in each functional unit. An output form is, for example, display on a display, printing output to a printer, transmission to an external apparatus using the network I/F 303, or storage in the storage region such as the memory 302 or the recording medium 305. Consequently, the first output unit 1305 can notify a user of the processing result in each functional unit, and can thus improve the convenience of the first task deployment apparatus 100.

The second task deployment apparatus 100 includes a second storage unit 1310, a second acquisition unit 1311, a generation unit 1312, a determination unit 1313, and a second output unit 1314. The second storage unit 1310 is realized by, for example, a storage region such as the memory 302 or the recording medium 305 illustrated in FIG. 3. Hereinafter, a description will be made of a case where the second storage unit 1310 is included in the task deployment apparatus 100, but this is only an example. For example, the second storage unit 1310 may be included in an apparatus which is different from the task deployment apparatus 100, and the storage content of the second storage unit 1310 may be referred to from the task deployment apparatus 100.

The second acquisition unit 1311 to the second output unit 1314 realize functions of a control unit. Specifically, for example, the functions of the second acquisition unit 1311 to the second output unit 1314 are realized by the CPU 301 executing the program stored in the storage region such as the memory 302 or the recording medium 305 illustrated in FIG. 3, or by the network I/F 303. A processing result in each functional unit is stored in, for example, the storage region such as the memory 302 or the recording medium 305 illustrated in FIG. 3.

The second storage unit 1310 stores information for managing one or more nodes. The node is, for example, the task execution node 110 illustrated in FIG. 8. The second storage unit 1310 stores information for managing one or more edges Eg included in the wide area distributed system 200. The second storage unit 1310 stores, for example, the edge management DB 400 illustrated in FIG. 4. The second storage unit 1310 stores an execution completion point for a process executed by the task execution node 110. The process is, for example, a task. The second storage unit 1310 stores, for example, the offer information DB 500 illustrated in FIG. 5.

The second storage unit 1310 stores information for managing a task. The second storage unit 1310 stores, for example, the task management DB 600 illustrated in FIG. 6. The second storage unit 1310 stores information for managing task target data used for a task. The second storage unit 1310 stores, for example, the data management DB 700 illustrated in FIG. 7. Consequently, each functional unit can refer to the storage content of the various DBs illustrated in FIGS. 4 to 7 of the second storage unit 1310.

The second acquisition unit 1311 receives information for specifying an execution completion point for a new task, generated based on information regarding a communication delay between the second task deployment apparatus 100 and the task execution node 110, from the first task deployment apparatus 100. In a case where there are a plurality of first task deployment apparatuses 100, the second acquisition unit 1311 receives information for specifying an execution completion point for a new task from each of the first task deployment apparatuses 100.

Consequently, in a case where a new task is generated in the second task deployment apparatus 100 in the future, the second acquisition unit 1311 can specify with high accuracy an execution completion point for the new task in a case where the task execution node 110 executes the new task. In a case where there are a plurality of first task deployment apparatuses 100, the second acquisition unit 1311 can specify the first task deployment apparatus 100 managing the task execution node 110 which can complete execution of a new task relatively faster.

The second acquisition unit 1311 may acquire a transmission time limit of an execution result of a new task. The transmission time limit is a deadline. For example, in a case where a new task using processing target data in the data generation apparatus 201 is generated, the second acquisition unit 1311 receives an execution request including a deadline from the terminal apparatus 204 which is a transmission destination of an execution result of the new task.

In the same manner as the first acquisition unit 1301, the second acquisition unit 1311 may acquire the number of processes in the task execution node 110 managed by the second task deployment apparatus 100 and a process execution rate in the task execution node 110 managed by the second task deployment apparatus 100. The second acquisition unit 1311 may acquire information regarding a communication delay between the second task deployment apparatus 100 and the task execution node 110 managed by the second task deployment apparatus 100.

The generation unit 1312 generates a new task based on predetermined data in response to reception of the predetermined data. Consequently, the generation unit 1312 can generate the new task.

In a case where a new task is generated, the determination unit 1313 determines whether or not the new task is to be executed by the task execution node 110 based on an execution completion point indicated by received information. Consequently, in a case where the task execution node 110 executes the new process, the determination unit 1313 can determine whether or not execution of the new task is completed by a predetermined time limit with high accuracy, and can thus easily deploy the new task such that execution thereof is completed by the predetermined time limit.

The determination unit 1313 may determine the task execution node 110 in which an execution completion point specified by received information is earlier than an acquired transmission time limit as the task execution node 110 which is to execute a new task. Consequently, the determination unit 1313 can improve a probability of execution of the new task being completed by the transmission time limit.

The determination unit 1313 may determine the task execution node 110 in which an execution completion point specified by received information is closest to the present time as the task execution node 110 which is to execute a new task. Consequently, the determination unit 1313 can improve a probability of execution of the new task being completed by the transmission time limit.

The determination unit 1313 may generate information for specifying an execution completion point for a generated new second task in a case where the task execution node 110 managed by the second task deployment apparatus 100 executes the second task generated by the second task deployment apparatus 100. In a case where a new task is generated, the determination unit 1313 determines whether or not the task execution node 110 managed by the second task deployment apparatus 100 is to execute the generated new task based on information for specifying an execution completion point for the generated new task.

Consequently, in a case where there is no offer information from the first task deployment apparatus 100, the determination unit 1313 can cause the task execution node 110 managed by the second task deployment apparatus 100 to execute a new task. The determination unit 1313 may determine whether or not the task execution node 110 managed by the second task deployment apparatus 100 can execute a new task faster than the task execution node 110 managed by the first task deployment apparatus 100. In a case where the task execution node 110 managed by the second task deployment apparatus 100 can execute a new task at a high speed, the determination unit 1313 can cause the task execution node 110 managed by the second task deployment apparatus 100 to execute the new task.

The second output unit 1314 outputs a processing result in each functional unit. An output form is, for example, display on a display, printing output to a printer, transmission to an external apparatus using the network I/F 303, or storage in the storage region such as the memory 302 or the recording medium 305. Consequently, the second output unit 1314 can notify a user of the processing result in each functional unit, and can thus improve the convenience of the second task deployment apparatus 100.

The task execution node 110 includes a third storage unit 1320, a third acquisition unit 1321, an execution unit 1322, and a third output unit 1323. The third storage unit 1320 is realized by, for example, a storage region such as the memory 802 or the recording medium 805 illustrated in FIG. 8. Hereinafter, a description will be made of a case where the third storage unit 1320 is included in the task execution node 110, but this is only an example. For example, the third storage unit 1320 may be included in an apparatus which is different from the task execution node 110, and the storage content of the third storage unit 1320 may be referred to from the task deployment apparatus 100.

The third acquisition unit 1321 to the third output unit 1323 realize functions of a control unit. Specifically, for example, the functions of the third acquisition unit 1321 to the third output unit 1323 are realized by the CPU 801 executing the program stored in the storage region such as the memory 802 or the recording medium 805 illustrated in FIG. 8, or by the network I/F 803. A processing result in each functional unit is stored in, for example, the storage region such as the memory 802 or the recording medium 805 illustrated in FIG. 8.

The third storage unit 1320 stores information for managing an executed task. The third storage unit 1320 stores, for example, the queue state DB 900 illustrated in FIG. 9. The third storage unit 1320 stores an executed task. The third storage unit 1320 stores, for example, the task execution queue 1000 illustrated in FIG. 10. The third storage unit 1320 stores processing target data used for a task. The third storage unit 1320 stores, for example, the data management DB 1100 illustrated in FIG. 11. Consequently, each functional unit can refer to the storage content of the various DBs of the third storage unit 1320.

The third acquisition unit 1321 acquires an execution order securing request for adding an idle task to the task execution queue 1000. The third acquisition unit 1321 receives the execution order securing request from the first task deployment apparatus 100. Consequently, the third acquisition unit 1321 can secure an execution order of new tasks generated in the future for the task execution queue 1000.

The third acquisition unit 1321 acquires a replacement request for replacing an idle task in the task execution queue 1000 with a new task. The third acquisition unit 1321 receives the replacement request from the first task deployment apparatus 100, for example. Consequently, the third acquisition unit 1321 enables new tasks to be executed in the secured execution order.

The execution unit 1322 extracts and executes a task in the task execution queue 1000. The execution unit 1322 extracts a task in the task execution queue 1000, completes execution of the extracted task, and then extracts the next task from the task execution queue 1000. Consequently, the execution unit 1322 can secure a task execution order.

In a case where the third acquisition unit 1321 acquires the execution order securing request, the execution unit 1322 adds an idle task to the task execution queue 1000. Consequently, the execution unit 1322 can secure an execution order of new tasks generated in the future for the task execution queue 1000.

In a case where the third acquisition unit 1321 acquires a replacement request, the execution unit 1322 replaces an idle task in the task execution node 110 with a new task. Consequently, the third acquisition unit 1321 enables new tasks to be executed in the secured execution order.

The third output unit 1323 outputs the storage content of the queue state DB 900 in response to an inquiry from the first task deployment apparatus 100. An output form is, for example, display on a display, printing output to a printer, transmission to an external apparatus using the network I/F 803, or storage in the storage region such as the memory 802 or the recording medium 805. The third output unit 1323 may output an execution result in the execution unit 1322 in response to an execution request from the first task deployment apparatus 100. The third output unit 1323 may output a processing result in each functional unit.

Specific Functional Configuration Examples of First Task Deployment Apparatus 100, Second Task Deployment Apparatus 100, and Task Execution Node 110

Next, with reference to FIG. 14, a description will be made of specific functional configuration examples of the first task deployment apparatus 100, the second task deployment apparatus 100, and the task execution node 110.

Figure 14:
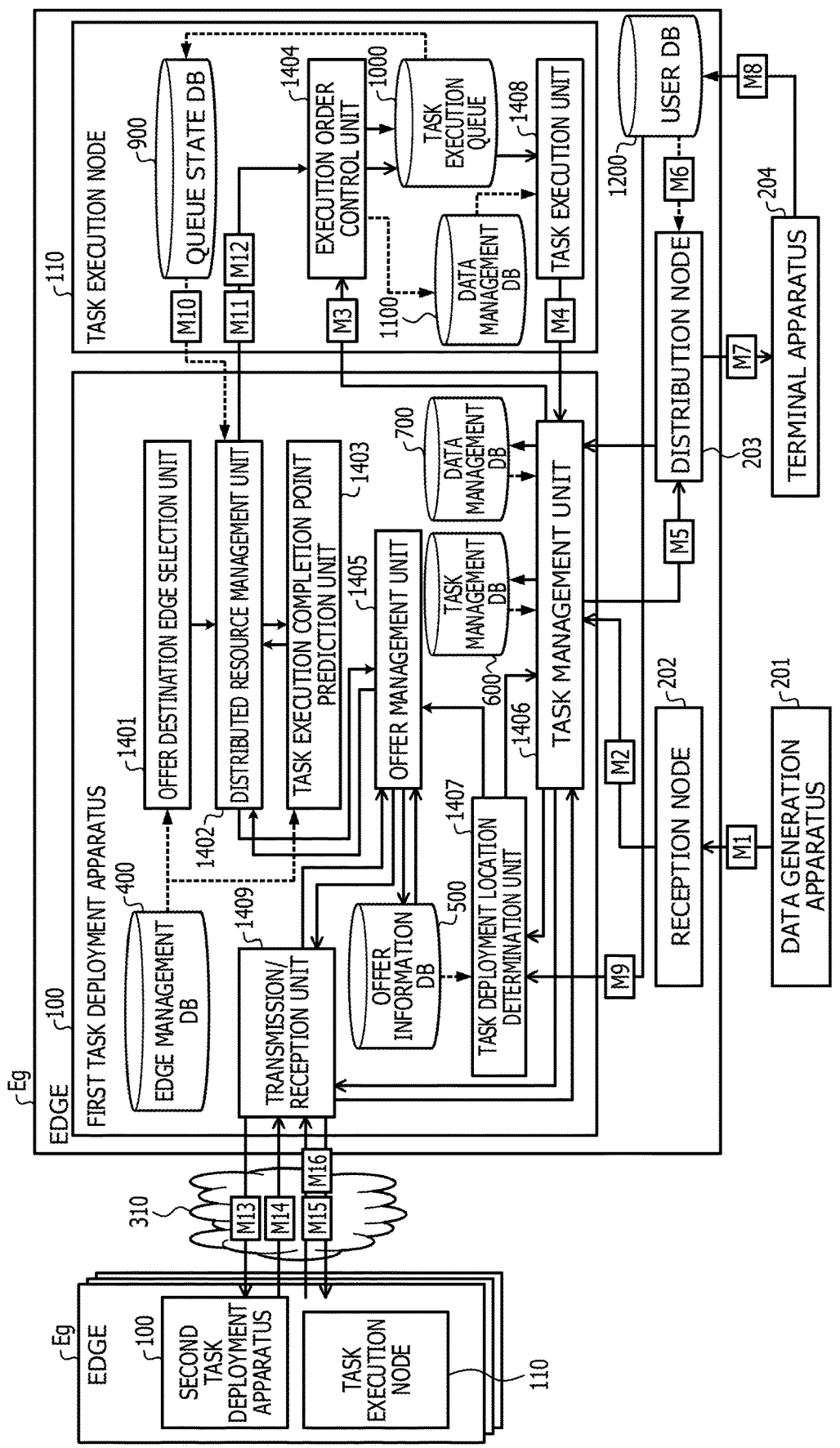
FIG. 14 is an explanatory diagram illustrating specific functional configuration examples of a first task deployment apparatus and a second task deployment apparatus.

FIG. 14 is an explanatory diagram illustrating specific functional configuration examples of the first task deployment apparatus 100, the second task deployment apparatus 100, and the task execution node 110. The first task deployment apparatus 100 has the edge management DB 400 illustrated in FIG. 4, the offer information DB 500 illustrated in FIG. 5, the task management DB 600 illustrated in FIG. 6, and the data management DB 700 illustrated in FIG. 7.

The first task deployment apparatus 100 includes an offer destination edge selection unit 1401, a distributed resource management unit 1402, a task execution completion point prediction unit 1403, and an offer management unit 1405. The first task deployment apparatus 100 includes a task management unit 1406, a task deployment location determination unit 1407, and a transmission/reception unit 1409.

On the other hand, the task execution node 110 has the queue state DB 900 illustrated in FIG. 9, the task execution queue 1000 illustrated in FIG. 10, and the data management DB 1100 illustrated in FIG. 11. The task execution node 110 includes an execution order control unit 1404 and a task execution unit 1408.

The offer destination edge selection unit 1401 selects an offer destination edge to which offer information is transmitted by referring to the edge management DB 400. The offer destination edge selection unit 1401 outputs the selected offer destination edge to the distributed resource management unit 1402.

The distributed resource management unit 1402 selects the task execution node 110, and transmits an inquiry about the number of tasks in the task execution queue 1000 corresponding to the task execution node 110, to the selected task execution node 110. The distributed resource management unit 1402 receives a tenth message M10 indicating the storage content of the queue state DB 900. An example of the tenth message M10 will be described later in, for example, FIG. 24.

The distributed resource management unit 1402 causes the task execution completion point prediction unit 1403 to calculate a task execution completion point in a case where the selected task execution node 110 executes a new task. The distributed resource management unit 1402 receives the task execution completion point from the task execution completion point prediction unit 1403, and outputs the task execution completion point to the offer management unit 1405.

The distributed resource management unit 1402 transmits an eleventh message M11 for an execution order securing request to the execution order control unit 1404 of the task execution node 110 based on the task execution completion point. The execution order securing request is a request for adding an idle task to the task execution queue 1000 storing a task executed by the task execution node 110. An example of the eleventh message M11 will be described later in, for example, FIG. 25.

The distributed resource management unit 1402 transmits a twelfth message M12 for a deletion request for deleting an idle task. An example of the twelfth message M12 will be described later in, for example, FIG. 26. Consequently, the distributed resource management unit 1402 can secure an execution order of new tasks. The distributed resource management unit 1402 may delete an idle task which is not replaced with a new task from the task execution queue 1000.

The task execution completion point prediction unit 1403 acquires a round-trip NW delay between the first task deployment apparatus 100 and the second task deployment apparatus 100 based on the edge management DB 400. The task execution completion point prediction unit 1403 calculates a task execution completion time in a case where the task execution node 110 executes a new task based on the round-trip NW delay, and calculates a task execution completion point at which the task execution completion time elapses from the present time. The task execution completion point prediction unit 1403 outputs the task execution completion point to the distributed resource management unit 1402.

The offer management unit 1405 generates offer information including the task execution completion point, and outputs the offer information to the transmission/reception unit 1409. The offer management unit 1405 may generate offer information including the task execution completion point, and may store the offer information by using the offer information DB 500. Consequently, the offer management unit 1405 can manage the task execution node 110 which can execute a new task, and can manage a task execution completion point in a case where the task execution node 110 executes the new task.

The transmission/reception unit 1409 transmits the generated offer information to the second task deployment apparatus 100 included in the offer destination edge as a thirteenth message M13. An example of the thirteenth message M13 will be described later in, for example, FIG. 27.

In a case where a fourteenth message M14 is received as an offer refusal message as a result of transmitting the thirteenth message M13, the transmission/reception unit 1409 outputs the fourteenth message M14 to the distributed resource management unit 1402 via the offer management unit 1405. An example of the fourteenth message M14 will be described later in, for example, FIG. 28. On the other hand, in a case where the offer refusal message is received, the distributed resource management unit 1402 transmits the twelfth message M12 for a deletion request for deleting an idle task.

The transmission/reception unit 1409 receives a fifteenth message M15 for replacing an idle task in the task execution queue 1000 with a new task as a result of transmitting the thirteenth message M13, and outputs the fifteenth message M15 to the task management unit 1406. An example of the fifteenth message M15 will be described later in, for example, FIG. 29.

The task management unit 1406 receives the fifteenth message M15 for a replacement request, and stores processing target data by using the data management DB 700. The task management unit 1406 stores task management information for a new task by using the task management DB 600. The task management unit 1406 transmits a third message M3 for a replacement request for replacing an idle task in the task execution queue 1000 with a new task to the execution order control unit 1404. In a case where the replacement request for replacing an idle task in the task execution queue 1000 with a new task is received, the execution order control unit 1404 replaces an idle task in the task execution queue 1000 with a new task.

The transmission/reception unit 1409 receives a sixteenth message M16 as a task execution result from the second task deployment apparatus 100. The transmission/reception unit 1409 transmits the received sixteenth message M16 to the task management unit 1406. An example of the sixteenth message M16 will be described later in, for example, FIG. 30.

The transmission/reception unit 1409 may receive offer information from the second task deployment apparatus 100. In this case, the transmission/reception unit 1409 stores the offer information by using the offer information DB 500 via the offer management unit 1405. Consequently, the offer management unit 1405 can manage the task execution nodes 110, included in other edges Eg, which can executes a new task, and can manage a task execution completion point in a case where a new task is executed by the task execution node 110.

The data generation apparatus 201 transmits a first message M1 as input data to the reception node 202. The first message M1 will be described later in, for example, FIG. 15. The reception node 202 transmits the first message M1 to the task management unit 1406 as a second message M2. The second message M2 will be described later in, for example, FIG. 16.

If the eleventh message M11 for an execution order securing request is received, the execution order control unit 1404 adds an idle task to the task execution queue 1000. If the twelfth message M12 for a deletion request is received, the execution order control unit 1404 deletes an idle task from the task execution queue 1000. If the third message M3 for a replacement request for replacing an idle task in the task execution queue 1000 with a new task is received, the execution order control unit 1404 replaces an idle task in the task execution queue 1000 with a new task. An example of the third message M3 will be described later in, for example, FIG. 17.

The task management unit 1406 receives input data from the reception node 202. The task management unit 1406 stores the input data by using the data management DB 700. The task management unit 1406 generates a new task based on the input data. The task management unit 1406 stores task management information for the new task by using the task management DB 600. In a case where the new task is generated, the task management unit 1406 transmits a request for determining a deployment location of the new task to the task deployment location determination unit 1407.

The task deployment location determination unit 1407 determines a deployment location of the new task by referring to the offer information DB 500. The task deployment location determination unit 1407 determines the task execution node 110 in which the task execution completion point is closest to the present time as a deployment location according to, for example, a response delay minimization algorithm. For example, the task deployment location determination unit 1407 may refer to the user DB 1200 so as to determine the task execution node 110 in which the task execution completion point is earlier than a deadline as a deployment location according to a deadline satisfaction ratio maximization algorithm. The task deployment location determination unit 1407 may separately use the response delay minimization algorithm and the deadline satisfaction ratio maximization algorithm by referring to the user DB 1200.

The task execution unit 1408 sequentially extracts task management information from the task execution queue 1000, and executes a task by referring to the data management DB 1100. The task execution unit 1408 transmits a fourth message M4 to the task management unit 1406 as an execution result of the task by using the task execution node 110. An example of the fourth message M4 will be described later in, for example, FIG. 18.

The distribution node 203 transmits the fourth message M4 or the sixteenth message M16 from the task execution unit 1408 via the task management unit 1406 as a fifth message M5. An example of the fifth message M5 will be described later in, for example, FIG. 19. The distribution node 203 acquires a sixth message M6 as user information from the user DB 1200, and transmits the sixth message M6 to the task management unit 1406. An example of the sixth message M6 will be described later in, for example, FIG. 20. The distribution node 203 transmits the fifth message M5 received from the task management unit 1406 to the terminal apparatus 204 as a seventh message M7. An example of the seventh message M7 will be described later in, for example, FIG. 21.

The terminal apparatus 204 receives a seventh message M7 as a task execution result. The terminal apparatus 204 receives a deadline for a task according to an input operation of a user. The terminal apparatus 204 inputs an eighth message M8 indicating the deadline to the user DB 1200. The eighth message M8 will be described later in, for example, FIG. 22. The user information in the user DB 1200 is input to the task deployment location determination unit 1407 as a ninth message M9. The ninth message M9 will be described later in, for example, FIG. 23.

Example of First Message M1

Here, with reference to FIGS. 15 to 26, a description will be made of examples of various messages which are transmitted and received between each unit of the first task deployment apparatus 100 and the second task deployment apparatus 100 and each unit of the task execution node 110 illustrated in FIG. 14. First, with reference to FIG. 15, a description will be made of an example of the first message M1.

FIG. 15 is an explanatory diagram illustrating an example of the first message M1. As illustrated in FIG. 15, the first message M1 includes, for example, a transmission source address, a destination address, and input data. The input data is data having any format. The first message M1 is transmitted from the data generation apparatus 201 to the reception node 202.

Example of Second Message M2

Next, with reference to FIG. 16, a description will be made of an example of the second message M2.

FIG. 16 is an explanatory diagram illustrating an example of the second message M2. As illustrated in FIG. 16, the second message M2 includes, for example, a transmission source address, a destination address, and input data. The input data is data having any format. The second message M2 is transmitted from the reception node 202 to the first task deployment apparatus 100.

Example of Third Message M3

Next, with reference to FIG. 17, a description will be made of an example of the third message M3.

FIG. 17 is an explanatory diagram illustrating an example of the third message M3. As illustrated in FIG. 17, the third message M3 includes, for example, a transmission source address, a destination address, a task ID, and processing target data. The task ID is an ID for specifying a task which is to be executed by the task execution node 110. The processing target data is data having any format. The third message M3 is transmitted from the first task deployment apparatus 100 to the task execution node 110.

Example of Fourth Message M4

Next, with reference to FIG. 18, a description will be made of an example of the fourth message M4.

FIG. 18 is an explanatory diagram illustrating an example of the fourth message M4. As illustrated in FIG. 18, the fourth message M4 includes, for example, a transmission source address, a destination address, a task ID, and execution result data. The task ID is an ID for specifying a task which is to be executed by the task execution node 110. The execution result data is data having any format. The fourth message M4 is transmitted from the task execution node 110 to the first task deployment apparatus 100.

Example of Fifth Message M5

Next, with reference to FIG. 19, a description will be made of an example of the fifth message M5.

FIG. 19 is an explanatory diagram illustrating an example of the fifth message M5. As illustrated in FIG. 19, the fifth message M5 includes, for example, a transmission source address, a destination address, a task ID, and execution result data. The task ID is an ID for specifying a task which is to be executed by the task execution node 110. The execution result data is data having any format. The fifth message M5 is transmitted from task management unit 1406 to the distribution node 203.

Example of Sixth Message M6

Next, with reference to FIG. 20, a description will be made of an example of the sixth message M6.

FIG. 20 is an explanatory diagram illustrating an example of the sixth message M6. As illustrated in FIG. 20, the sixth message M6 includes, for example, a transmission source address, a destination address, a task ID, and a user address. The task ID is an ID for specifying a task which is to be executed by the task execution node 110. The user address is an address indicating the terminal apparatus 204 to which a task execution result is transmitted. The sixth message M6 is transmitted to the distribution node 203 from the user DB 1200.

Example of Seventh Message M7

Next, with reference to FIG. 21, a description will be made of an example of the seventh message M7.

FIG. 21 is an explanatory diagram illustrating an example of the seventh message M7. As illustrated in FIG. 21, the seventh message M7 includes, for example, a transmission source address, a destination address, a task ID, and execution result data. The task ID is an ID for specifying a task which is to be executed by the task execution node 110. The execution result data is data having any format. The seventh message M7 is transmitted from the distribution node 203 to the terminal apparatus 204.

Example of Eighth Message M8

Next, with reference to FIG. 22, a description will be made of an example of the eighth message M8.

FIG. 22 is an explanatory diagram illustrating an example of the eighth message M8. As illustrated in FIG. 22, the eighth message M8 includes, for example, a transmission source address, a destination address, a task ID, and a constraint condition. The task ID is an ID for specifying a task which is to be executed by the task execution node 110.

The constraint condition includes, for example, a request algorithm and a request time. The request algorithm or a deadline satisfaction ratio maximization algorithm or a response delay minimization algorithm. The deadline satisfaction ratio maximization algorithm is an algorithm for allocating a task to the task execution node 110 which can complete a task by the deadline. The response delay minimization algorithm is an algorithm for allocating a task to the task execution node 110 in which a task execution completion point is closest to the present time or a task execution completion point is the minimum. The request time is a deadline indicating a time limit by which a task execution result is to be transmitted. The eighth message M8 is input to the user DB 1200 from the terminal apparatus 204.

Example of Ninth Message M9

Next, with reference to FIG. 23, a description will be made of an example of the ninth message M9.

FIG. 23 is an explanatory diagram illustrating an example of the ninth message M9. As illustrated in FIG. 23, the ninth message M9 includes, for example, a transmission source address, a destination address, a task ID, and a constraint condition. The task ID is an ID for specifying a task which is to be executed by the task execution node 110.

The constraint condition includes, for example, a request algorithm and a request time. The request algorithm or a deadline satisfaction ratio maximization algorithm or a response delay minimization algorithm. The deadline satisfaction ratio maximization algorithm is an algorithm for allocating a task to the task execution node 110 which can complete a task by the deadline. The response delay minimization algorithm is an algorithm for allocating a task to the task execution node 110 in which a task execution completion point is closest to the present time or a task execution completion point is the minimum. The request time is a deadline indicating a time limit by which a task execution result is to be transmitted. The ninth message M9 is input to the first task deployment apparatus 100 from the user DB 1200.

Example of Tenth Message M10

Next, with reference to FIG. 24, a description will be made of an example of the tenth message M10.

FIG. 24 is an explanatory diagram illustrating an example of the tenth message M10. As illustrated in FIG. 24, the tenth message M10 includes, for example, a transmission source address, a destination address, and a queue state. The queue state includes, for example, a task execution node ID, the number of existing tasks, and an average process execution rate. The task execution node ID is an ID for specifying the task execution node 110. The number of existing tasks is the number of existing tasks from the head to a vacancy of the task execution queue 1000 included in the task execution node 110 indicated by the task execution node ID. The average process execution rate is an average process execution rate of all tasks executed in the past by the task execution node 110 indicated by the task execution node ID. The tenth message M10 is transmitted from the task execution node 110 to the first task deployment apparatus 100.

Example of Eleventh Message M11

Next, with reference to FIG. 25, a description will be made of an example of the eleventh message M11.

FIG. 25 is an explanatory diagram illustrating an example of the eleventh message M11. As illustrated in FIG. 25, the eleventh message M11 includes, for example, a transmission source address, a destination address, and execution order securing. The execution order securing includes, for example, a task execution node ID. The task execution node ID is an ID for specifying the task execution node 110 in which an idle task is added to the task execution queue 1000, and an execution order of new tasks generated in the future. The eleventh message M11 is transmitted from the first task deployment apparatus 100 to the task execution node 110.

Example of Twelfth Message M12

Next, with reference to FIG. 26, a description will be made of an example of the twelfth message M12.

FIG. 26 is an explanatory diagram illustrating an example of the twelfth message M12. As illustrated in FIG. 26, the twelfth message M12 includes, for example, a transmission source address, a destination address, and execution order release. The execution order release includes, for example, a task execution node ID and a task ID. The task execution node ID is an ID for specifying the task execution node 110 in which an idle task is added to the task execution queue 1000. The task ID is an ID for specifying an idle task deleted from the task execution queue 1000. The twelfth message M12 is transmitted from the first task deployment apparatus 100 to the task execution node 110.

Example of Thirteenth Message M13

Next, with reference to FIG. 27, a description will be made of an example of the thirteenth message M13.

FIG. 27 is an explanatory diagram illustrating an example of the thirteenth message M13. As illustrated in FIG. 27, the thirteenth message M13 includes a transmission source address, a destination address, a message ID, an edge ID, a task ID, and a task execution completion point. The message ID is an ID for specifying offer information. The edge ID is an ID for specifying the edge Eg which is a transmission source. The task ID is an ID for specifying an idle task added to the task execution queue 1000. The task execution completion point is a task execution completion point for a task replaced with an idle task. The thirteenth message M13 is transmitted from the first task deployment apparatus 100 to the second task deployment apparatus 100.

Example of Fourteenth Message M14

Next, with reference to FIG. 28, a description will be made of an example of the fourteenth message M14.

FIG. 28 is an explanatory diagram illustrating an example of the fourteenth message M14. As illustrated in FIG. 28, the fourteenth message M14 includes a transmission source address, a destination address, a message ID, an edge ID, and a task ID. The message ID is an ID for specifying an offer refusal message. The edge ID is an ID for specifying the edge Eg which is a transmission source. The task ID is an ID for specifying an idle task deleted from the task execution queue 1000. The fourteenth message M14 is transmitted from the second task deployment apparatus 100 to the first task deployment apparatus 100.

Example of Fifteenth Message M15

Next, with reference to FIG. 29, a description will be made of an example of the fifteenth message M15.

FIG. 29 is an explanatory diagram illustrating an example of the fifteenth message M15. As illustrated in FIG. 29, the fifteenth message M15 includes a transmission source address, a destination address, a message ID, a task ID, and processing target data. The message ID is an ID for specifying a replacement request. The task ID is an ID for specifying a task which is to be executed by the task execution node 110. The processing target data is data having any format. The fifteenth message M15 is transmitted from the second task deployment apparatus 100 to the first task deployment apparatus 100.

Example of Sixteenth Message M16

Next, with reference to FIG. 30, a description will be made of an example of the sixteenth message M16.

FIG. 30 is an explanatory diagram illustrating an example of the sixteenth message M16. As illustrated in FIG. 30, the sixteenth message M16 includes a transmission source address, a destination address, a message ID, an edge ID, a task ID, and execution result data. The message ID is an ID for specifying an execution result. The edge ID is an ID for specifying the edge Eg which is a transmission source. The task ID is an ID for specifying a task executed by the task execution node 110. The execution result data is data having any format. The sixteenth message M16 is transmitted from the second task deployment apparatus 100 to the first task deployment apparatus 100.

Example 1 of Determining Deployment Location

Next, a description will be made of Example 1 of determining a deployment location with reference to FIGS. 31 to 38.

Figure 31:
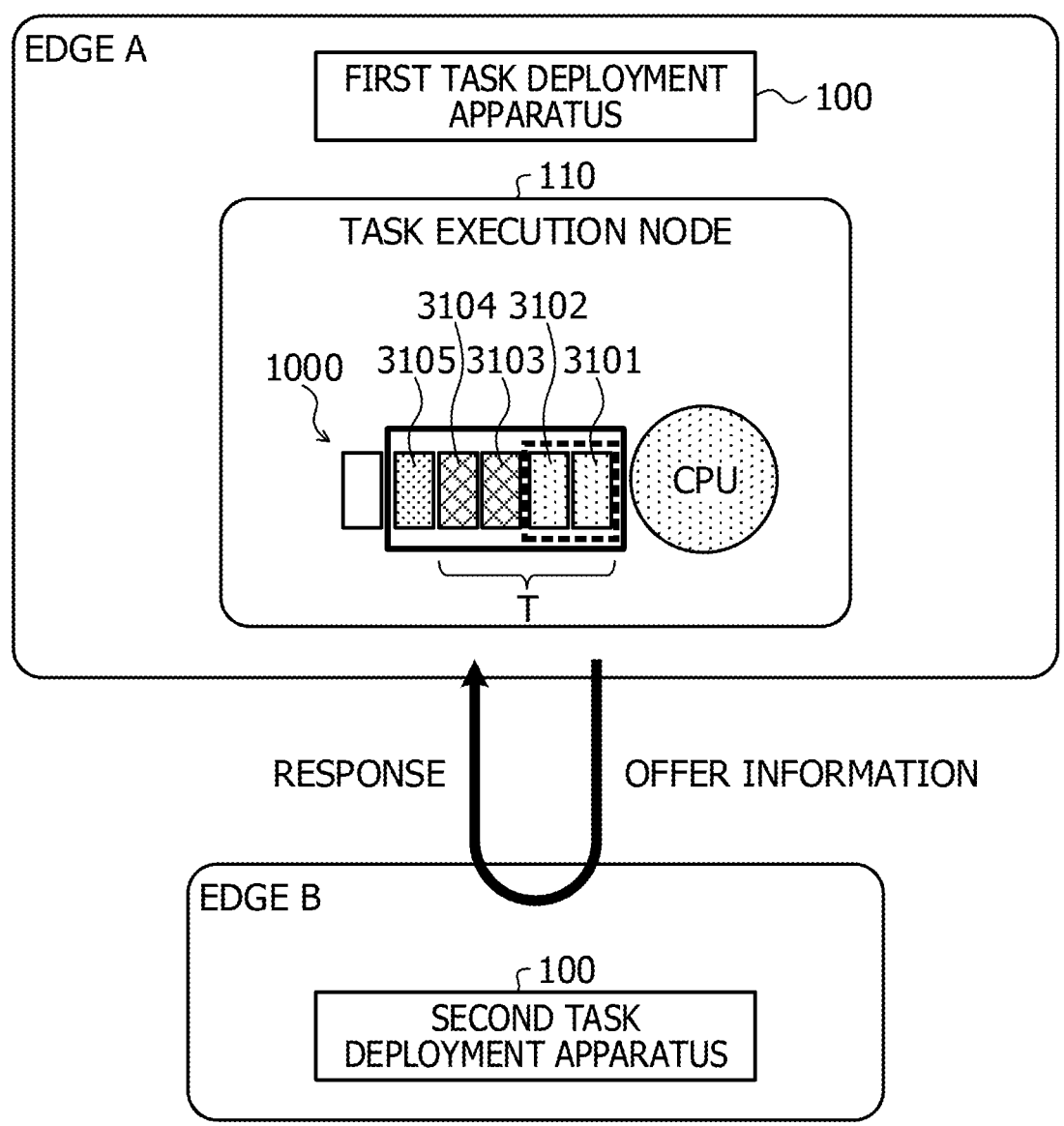
FIG. 31 is an explanatory diagram (first) illustrating Example 1 of determining a deployment location.

FIGS. 31 to 38 are explanatory diagrams illustrating Example 1 of determining a deployment location. In FIG. 31, the edge A includes the first task deployment apparatus 100 and the task execution node 110. On the other hand, the edge B includes the second task deployment apparatus 100. It is assumed that the offer destination edge selection unit 1401 selects the edge B as an offer destination edge by referring to the edge management DB 400.

Here, the distributed resource management unit 1402 receives a notification of the number K=2 of existing tasks as the number of tasks 3101 and 3102 stored in the task execution queue 1000 from the execution order control unit 1404 of the task execution node 110, and stores the number of existing tasks in the queue state DB 900. The distributed resource management unit 1402 controls the task execution completion point prediction unit 1403 to calculate a task execution completion point Ex for a new task which may be received from the second task deployment apparatus 100, by referring to the edge management DB 400 and the queue state DB 900.

The task execution completion point prediction unit 1403 acquires the number K=2 of existing tasks and an average process execution rate μ from the distributed resource management unit 1402. The task execution completion point prediction unit 1403 calculates a task execution completion time E=K/μ for the tasks 3101 and 3102 currently stored in the task execution queue 1000 based on the number K of tasks and the average process execution rate μ. The task execution completion point prediction unit 1403 acquires the round-trip NW delay T with the edge B which is an offer destination edge from the distributed resource management unit 1402. Here, the round-trip NW delay T will be described with reference to FIG. 32.

Figure 32:
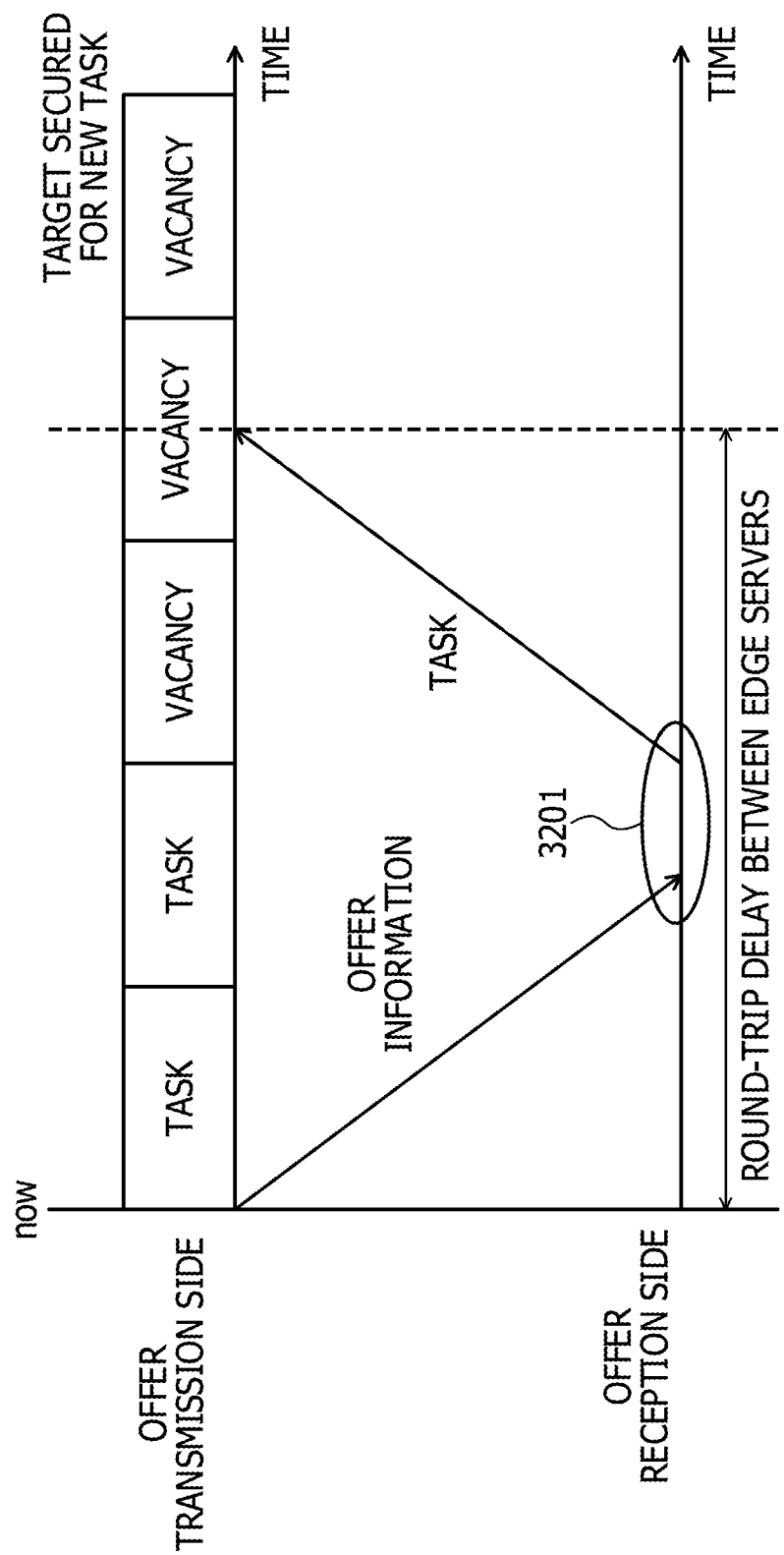
FIG. 32 is an explanatory diagram (second) illustrating Example 1 of determining a deployment location.

As illustrated in FIG. 32, the round-trip NW delay T includes the time taken for offer information to be transmitted from the first task deployment apparatus 100 which is an offer transmission side transmitting the offer information to the second task deployment apparatus 100 which is an offer reception side receiving the offer information. The round-trip NW delay T includes the time taken for a task of which execution is requested to be transmitted from the second task deployment apparatus 100 which is an offer reception side receiving the offer information to the first task deployment apparatus 100 which is an offer transmission side transmitting the offer information.

Here, the round-trip NW delay T may include a processing time 3201 taken to determine a task deployment location in response to reception of offer information in the second task deployment apparatus 100. Consequently, the first task deployment apparatus 100 can specify a time taken for a task to be transmitted from the second task deployment apparatus 100 with high accuracy.

For example, the first task deployment apparatus 100 calculates an average time from transmission of offer information to the second task deployment apparatus 100 in the past until a task or an offer refusal message is sent from the second task deployment apparatus 100, and uses the average time as the round-trip NW delay T. Consequently, the first task deployment apparatus 100 can store the round-trip NW delay T including the processing time 3201. Here, FIG. 31 is referred to again.

In FIG. 31, the task execution completion point prediction unit 1403 determines that the round-trip NW delay T is more than the task execution completion time E. Next, the task execution completion point prediction unit 1403 determines that execution of any tasks 3103 and 3104 is allowed to be started until the round-trip delay T elapses after execution of the tasks 3101 and 3102 stored in the task execution queue 1000 is completed. The task execution completion point prediction unit 1403 determines that execution of a task 3105 which may be received from the second task deployment apparatus 100 in the future is started after execution of any tasks 3103 and 3104 is started.

Thus, the task execution completion point prediction unit 1403 calculates the number of any tasks 3103 and 3104 as a number=2 of temporary tasks which are allowed to be started until execution of the task 3105 which may be received from the second task deployment apparatus 100 is started. The task execution completion point prediction unit 1403 adds the number=2 of temporary tasks to the number K=2 of tasks.

The task execution completion point prediction unit 1403 adds 1 to the number K=4 of existing tasks, so as to calculate the number K=5 of existing tasks including a new task 3105 which may be received from the second task deployment apparatus 100 and may be added to the task execution queue 1000. The task execution completion point prediction unit 1403 calculates the task execution completion time E=K/μ based on the number K=5 of tasks and the average process execution rate μ in the CPU 801 by referring to the queue state DB 900. The task execution completion point prediction unit 1403 calculates the task execution completion point Ex after the task execution completion time E elapses from the present time. Here, the description will be continued with reference to FIG. 33.

Figure 33:
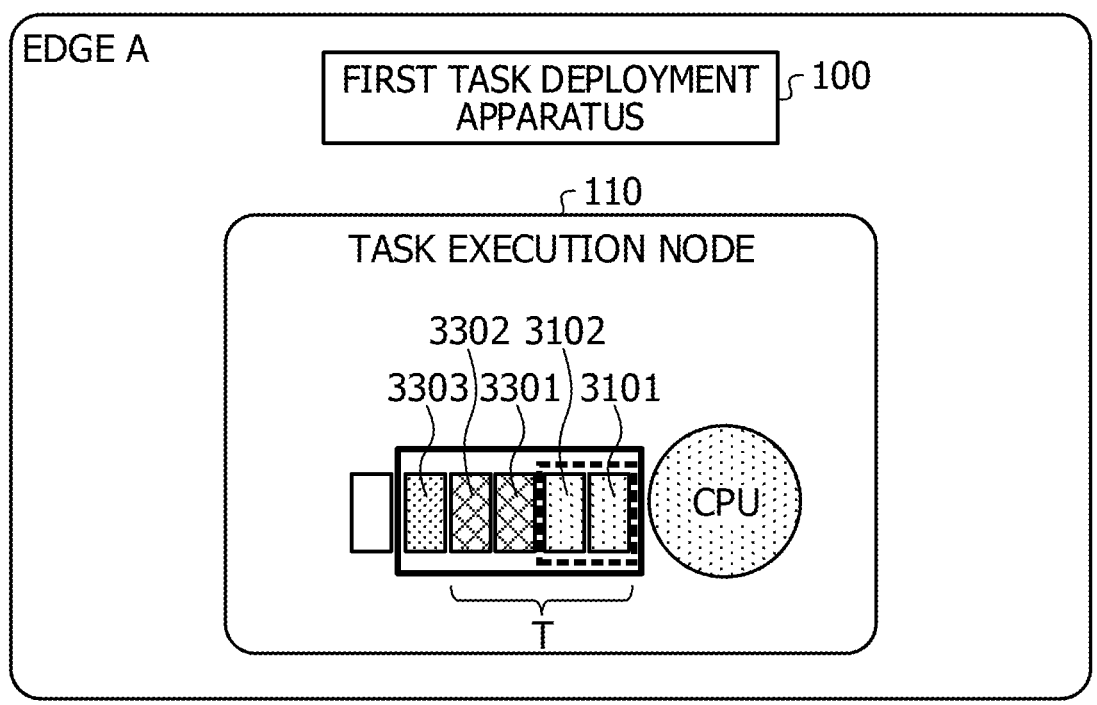
FIG. 33 is an explanatory diagram (third) illustrating Example 1 of determining a deployment location.

In FIG. 33, the distributed resource management unit 1402 acquires the task execution completion point Ex from the task execution completion point prediction unit 1403, generates an execution order securing request, and transmits the execution order securing request to the execution order control unit 1404 of the task execution node 110.

In a case where the execution order securing request is received, the execution order control unit 1404 adds idle tasks 3301 and 3302 corresponding to the number of temporary tasks to the task execution queue 1000. The execution order control unit 1404 adds, for example, a record in which IDs for specifying the idle tasks 3301 and 3302 and NULL as processing target data are set, to the task execution queue 1000.

The execution order control unit 1404 adds an idle task 3303 for the task 3105 which may be received from the second task deployment apparatus 100 in the future, to the task execution queue 1000. The execution order control unit 1404 adds, for example, a record in which an ID for specifying the idle task 3303 and NULL as processing target data are set, to the task execution queue 1000. Here, the description will be continued with reference to FIG. 34.

Figure 34:
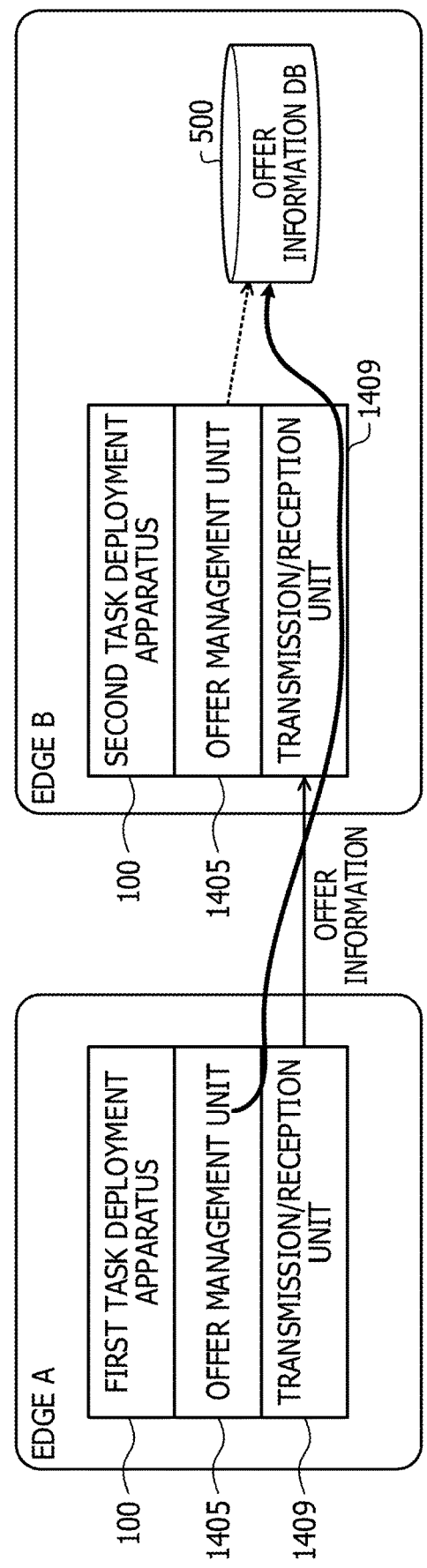
FIG. 34 is an explanatory diagram (fourth) illustrating Example 1 of determining a deployment location.

In FIG. 34, the distributed resource management unit 1402 of the first task deployment apparatus 100 transmits the task execution completion point Ex acquired from the task execution completion point prediction unit 1403 of the first task deployment apparatus 100 to the offer management unit 1405 of the first task deployment apparatus 100. The offer management unit 1405 of the first task deployment apparatus 100 receives the task execution completion point Ex.

The offer management unit 1405 of the first task deployment apparatus 100 generates offer information including the task execution completion point Ex, and outputs the offer information to the transmission/reception unit 1409 of the first task deployment apparatus 100. The transmission/reception unit 1409 of the first task deployment apparatus 100 transmits the offer information to the transmission/reception unit 1409 of the second task deployment apparatus 100.

The transmission/reception unit 1409 of the second task deployment apparatus 100 receives the offer information, and transmits the offer information to the offer management unit 1405 of the second task deployment apparatus 100. The offer management unit 1405 of the second task deployment apparatus 100 accumulates the offer information in the offer information DB 500. Consequently, the second task deployment apparatus 100 can store the fact that a new task can be executed by the task execution node 110 included in the edge Eg which is different from the edge including the second task deployment apparatus 100. Here, the description will be continued with reference to FIGS. 35 to 38.

In the example illustrated in FIGS. 35 to 38, a description will be made of a case where the first task deployment apparatus 100 and the second task deployment apparatus 100 transmit offer information to each other, and a new task is generated in the first task deployment apparatus 100. First, the description will be continued with reference to FIG. 35.

Figure 35:
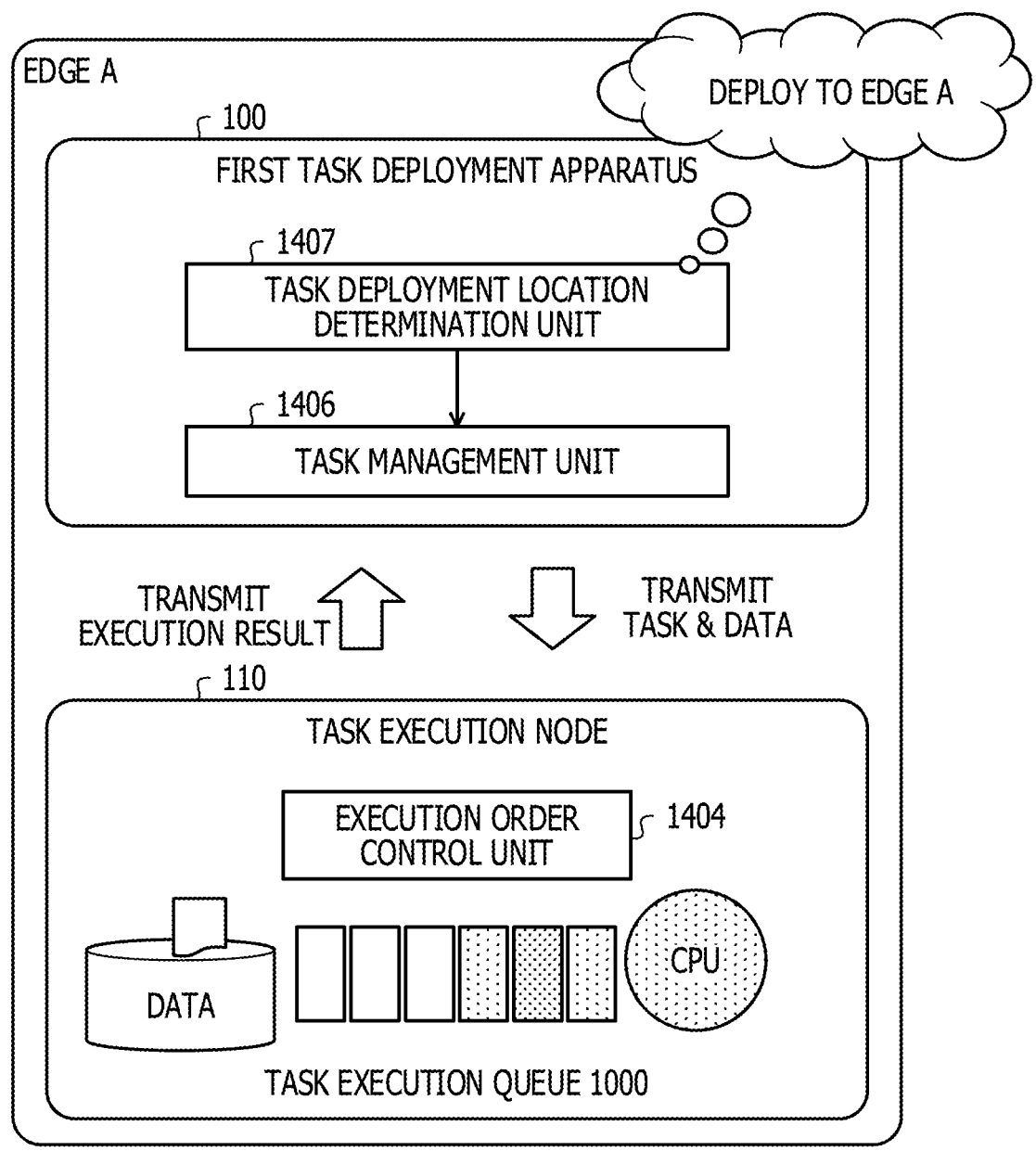
FIG. 35 is an explanatory diagram (fifth) illustrating Example 1 of determining a deployment location.

In FIG. 35, the task deployment location determination unit 1407 of the first task deployment apparatus 100 determines, as a deployment location, the task execution node 110 included in the same edge A as that of the first task deployment apparatus 100 by referring to the offer information DB 500. The task deployment location determination unit 1407 of the first task deployment apparatus 100 determines a deployment location according to, for example, the response delay minimization algorithm or the deadline satisfaction ratio maximization algorithm.

The task deployment location determination unit 1407 of the first task deployment apparatus 100 notifies the task management unit 1406 of the first task deployment apparatus 100 of the deployment location. The task management unit 1406 of the first task deployment apparatus 100 transmits a generated new task and processing target data correlated with each other to the task execution node 110 determined as the deployment location.

In a case where the new task and the processing target data are received, the task execution node 110 replaces an idle task in the task execution queue 1000 with the new task. The task execution node 110 sequentially extracts tasks from the task execution queue 1000, and transmits execution results to the first task deployment apparatus 100. Consequently, an execution result of the new task is delivered to the terminal apparatus 204 via the first task deployment apparatus 100. Here, the description will be continued with reference to FIG. 36.

Figure 36:
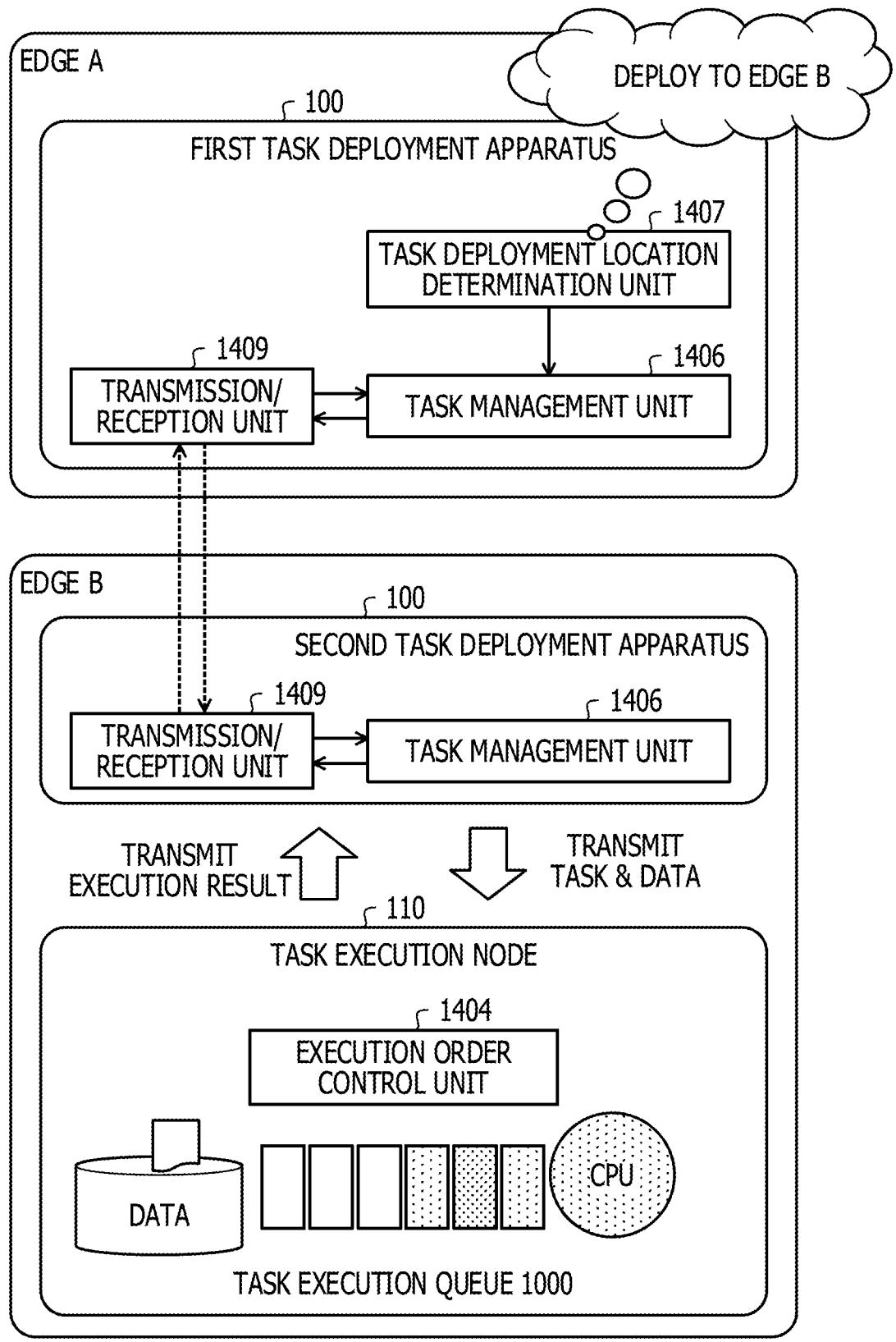
FIG. 36 is an explanatory diagram (sixth) illustrating Example 1 of determining a deployment location.

In FIG. 36, the task deployment location determination unit 1407 of the first task deployment apparatus 100 determines, as a deployment location, the task execution node 110 included in the edge B which is different from the edge including the first task deployment apparatus 100, by referring to the offer information DB 500. The task deployment location determination unit 1407 of the first task deployment apparatus 100 determines a deployment location according to, for example, the response delay minimization algorithm or the deadline satisfaction ratio maximization algorithm.

The task deployment location determination unit 1407 of the first task deployment apparatus 100 notifies the task management unit 1406 of the first task deployment apparatus 100 of the deployment location. The task management unit 1406 of the first task deployment apparatus 100 transmits a generated new task and processing target data correlated with each other to the transmission/reception unit 1409 of the second task deployment apparatus 100 via the transmission/reception unit 1409 of the first task deployment apparatus 100.

The transmission/reception unit 1409 of the second task deployment apparatus 100 receives the new task and the processing target data correlated with each other from the transmission/reception unit 1409 of the first task deployment apparatus 100, and transmits the new task and the processing target data to the task management unit 1406 of the second task deployment apparatus 100. The task management unit 1406 of the second task deployment apparatus 100 transmits the generated new task and processing target data correlated with each other to the task execution node 110 determined as the deployment location.

In a case where the new task and the processing target data are received, the task execution node 110 replaces an idle task in the task execution queue 1000 with the new task. The task execution node 110 sequentially extracts tasks from the task execution queue 1000, and transmits execution results to the second task deployment apparatus 100. Consequently, an execution result of the new task is delivered to the terminal apparatus 204 via the second task deployment apparatus 100. Here, the description will be continued with reference to FIG. 37.

Figure 37:
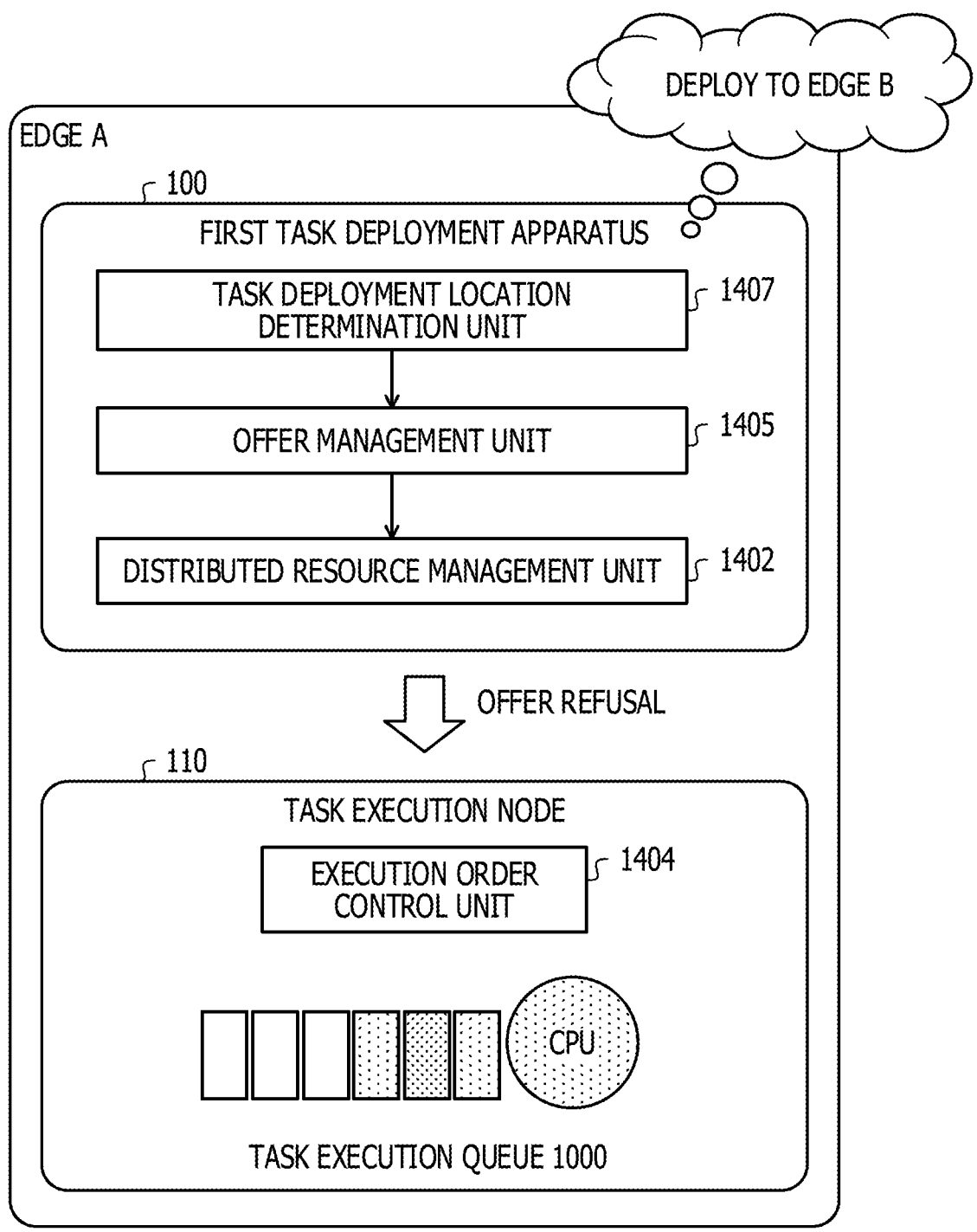
FIG. 37 is an explanatory diagram (seventh) illustrating Example 1 of determining a deployment location.

In FIG. 37, in the same manner as in FIG. 36, it is assumed that the task deployment location determination unit 1407 of the first task deployment apparatus 100 determines, as a deployment location, the task execution node 110 included in the edge B which is different from the edge including the first task deployment apparatus 100.

In this case, the task deployment location determination unit 1407 of the first task deployment apparatus 100 transmits the deployment location to the distributed resource management unit 1402 of the first task deployment apparatus 100 via the offer management unit 1405 of the first task deployment apparatus 100. Since the task execution node 110 of the edge A is not a deployment location, the distributed resource management unit 1402 of the first task deployment apparatus 100 generates an offer refusal message, and transmits the offer refusal message to the task execution node 110 of the edge A.

Here, in a case where the offer refusal message is received, the task execution node 110 deletes an idle task in the task execution queue 1000. Consequently, the task execution node 110 can suppress a calculation resource or power consumption from being wasted due to execution of the idle task.

In FIG. 37, in the same manner as in FIG. 36, it is assumed that the task deployment location determination unit 1407 of the first task deployment apparatus 100 determines, as a deployment location, the task execution node 110 included in the edge B which is different from the edge including the first task deployment apparatus 100.

In this case, the task deployment location determination unit 1407 of the first task deployment apparatus 100 transmits the deployment location to the distributed resource management unit 1402 of the first task deployment apparatus 100 via the offer management unit 1405 of the first task deployment apparatus 100. Since the task execution node 110 of the edge A is not a deployment location, the distributed resource management unit 1402 of the first task deployment apparatus 100 generates an offer refusal message, and transmits the offer refusal message to the task execution node 110 of the edge A.

Here, in a case where the offer refusal message is received, the task execution node 110 deletes an idle task in the task execution queue 1000. Consequently, the task execution node 110 can suppress a calculation resource or power consumption from being wasted due to execution of the idle task. Next, the description will be continued with reference to FIG. 38.

Figure 38:
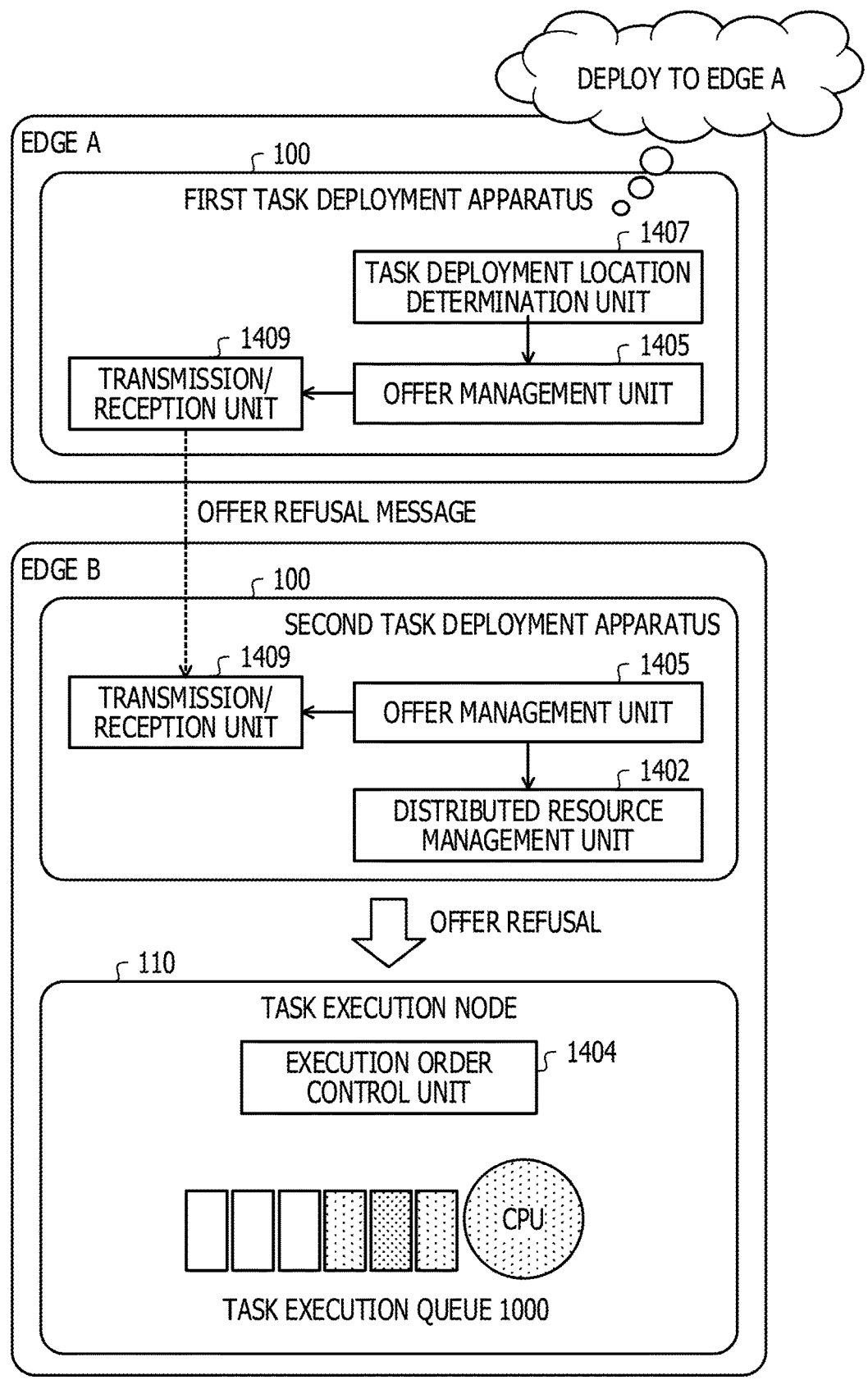
FIG. 38 is an explanatory diagram (eighth) illustrating Example 1 of determining a deployment location.

In FIG. 38, in the same manner as in FIG. 35, it is assumed that the task deployment location determination unit 1407 of the first task deployment apparatus 100 determines, as a deployment location, the task execution node 110 included in the same edge A as that of the first task deployment apparatus 100.

In this case, the task deployment location determination unit 1407 of the first task deployment apparatus 100 transmits the deployment location to the offer management unit 1405 of the first task deployment apparatus 100. Since the task execution node 110 of the edge A is a deployment location, the offer management unit 1405 of the first task deployment apparatus 100 transmits an offer refusal message to the transmission/reception unit 1409 of the first task deployment apparatus 100 so as to send the offer refusal message to the task execution node 110 of the edge B. The transmission/reception unit 1409 of the first task deployment apparatus 100 transmits the offer refusal message to the transmission/reception unit 1409 of the second task deployment apparatus 100.

The transmission/reception unit 1409 of the second task deployment apparatus 100 transmits the offer refusal message to the distributed resource management unit 1402 of the second task deployment apparatus 100 via the offer management unit 1405 of the second task deployment apparatus 100. Since the task execution node 110 of the edge B is not a deployment location, the distributed resource management unit 1402 of the second task deployment apparatus 100 transmits the offer refusal message to the task execution node 110 of the edge B.

Here, in a case where the offer refusal message is received, the task execution node 110 deletes an idle task in the task execution queue 1000. Consequently, the task execution node 110 can suppress a calculation resource or power consumption from being wasted due to execution of the idle task.

Example of Distributed Resource Management Process Procedure in Example 1

Next, with reference to FIG. 39, a description will be made of an example of a distributed resource management process procedure in Example 1, executed by the first task deployment apparatus 100.

Figure 39:
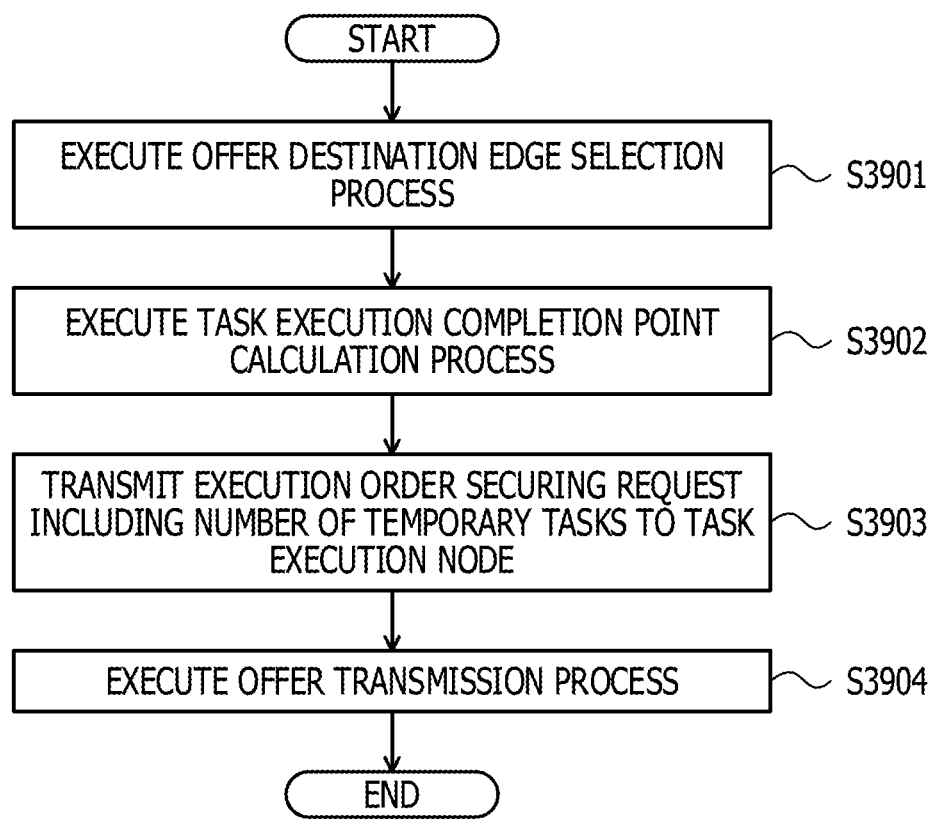
FIG. 39 is a flowchart illustrating an example of a distributed resource management process procedure in Example 1.

FIG. 39 is a flowchart illustrating an example of a distributed resource management process procedure in Example 1. In FIG. 39, the first task deployment apparatus 100 refers to the edge management DB 400, and executes a process of selecting an offer destination edge which will be described later in FIG. 40 (step S3901).

Next, the first task deployment apparatus 100 refers to the edge management DB 400 and the queue state DB 900, and executes a process of calculating a task execution completion point which will be described later in FIG. 41 (step S3902). The first task deployment apparatus 100 transmits an execution order securing request including the number of temporary tasks to the task execution node 110, and causes the task execution node 110 to execute an execution order securing process which will be described later in FIG. 42 (step S3903).

Next, the first task deployment apparatus 100 executes an offer transmission process which will be described later in FIG. 44 on the offer destination edge selected in step S3901 (step S3904). The first task deployment apparatus 100 finishes the distributed resource management process procedure. Consequently, the first task deployment apparatus 100 can notify other edges Eg that a task can be executed in the task execution node 110 included in the same edge Eg as the edge including the first task deployment apparatus 100.

Example of Offer Destination Edge Selection Process Procedure in Example 1

Next, with reference to FIG. 40, a description will be made of an example of an offer destination edge selection process procedure in Example 1, executed by using the offer destination edge selection unit in the first task deployment apparatus 100 in step S3901.

Figure 40:
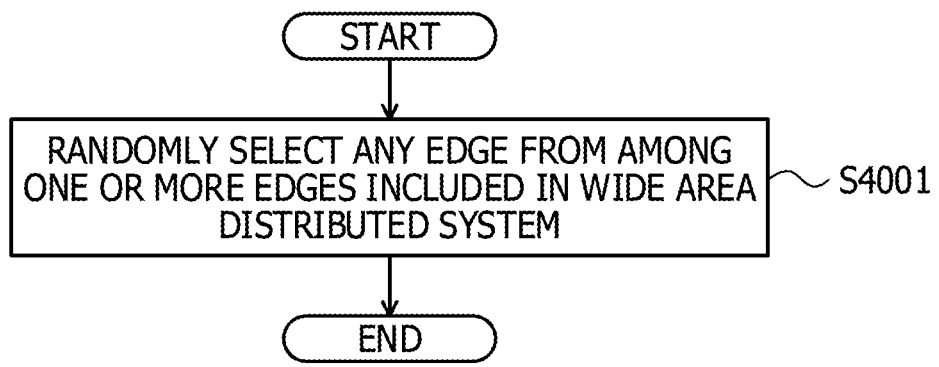
FIG. 40 is a flowchart illustrating an example of an offer destination edge selection process procedure in Example 1.

FIG. 40 is a flowchart illustrating an example of an offer destination edge selection process procedure in Example 1. In FIG. 40, the first task deployment apparatus 100 randomly selects any edge Eg from among one or more edges Eg included in the wide area distributed system 200 as an offer destination edge by referring to the edge management DB 400 (step S4001). The first task deployment apparatus 100 finishes the offer destination edge selection process.

Example of Task Execution Completion Point Calculation Process procedure in Example 1

Next, with reference to FIG. 41, a description will be made of an example of a task execution completion point calculation process procedure in Example 1, executed by using the task execution completion point prediction unit in the first task deployment apparatus 100 in step S3902.

Figure 41:
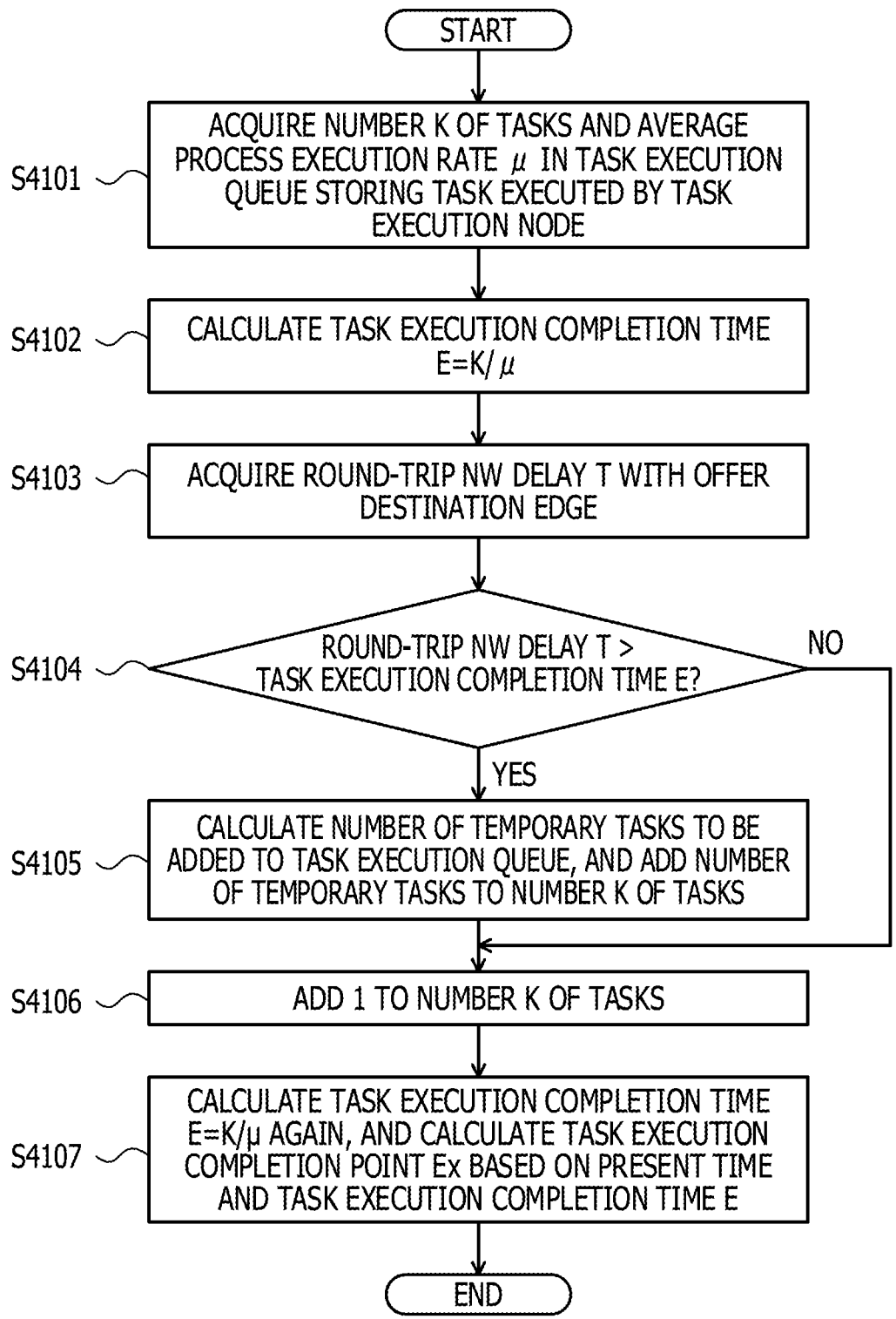
FIG. 41 is a flowchart illustrating an example of a task execution completion point calculation process procedure in Example 1.

FIG. 41 is a flowchart illustrating a task execution completion point calculation process procedure in Example 1. In FIG. 41, the first task deployment apparatus 100 refers to the queue state DB 900, and acquires the number K of tasks and the average process execution rate $\mu$ in the task execution queue 1000 of the task execution node 110 included in the same edge Eg as the edge including the first task deployment apparatus 100 (step S4101).

Next, the first task deployment apparatus 100 calculates the task execution completion time $E=K/\mu$ based on the number K of tasks and the average process execution rate $\mu$ (step S4102). The first task deployment apparatus 100 acquires the round-trip NW delay T with the selected offer destination edge by referring to the edge management DB 400 (step S4103).

Next, the first task deployment apparatus 100 determines whether or not the round-trip NW delay T is more than the task execution completion time E (step S4104). Here, in a case where the round-trip NW delay T is more than the task execution completion time E (Yes in step S4104), the first task deployment apparatus 100 transitions to a process in step S4105. In a case where the round-trip NW delay T is not more than the task execution completion time E (No in step S4104), the first task deployment apparatus 100 transitions to a process in step S4106.

In step S4105, the first task deployment apparatus 100 calculates the number of temporary tasks to be added to the task execution queue 1000 such that the task execution completion time E exceeds the round-trip NW delay T, and adds the number of temporary tasks to the number K of tasks (step S4105). The first task deployment apparatus 100 transitions to the process in step S4106.

In step S4106, the first task deployment apparatus 100 adds 1 to the number K of tasks (step S4106). Next, the first task deployment apparatus 100 calculates the task execution completion time $E=K/\mu$ again, and calculates the task execution completion point Ex based on the present time and the task execution completion time E (step S4107). The first task deployment apparatus 100 finishes the task execution completion point calculation process.

Example of Execution Order Securing Process Procedure in Example 1

Next, with reference to FIG. 42, a description will be made of an example of an execution order securing process procedure in Example 1, executed by using the execution order control unit in the task execution node 110 in step S3903.

Figure 42:
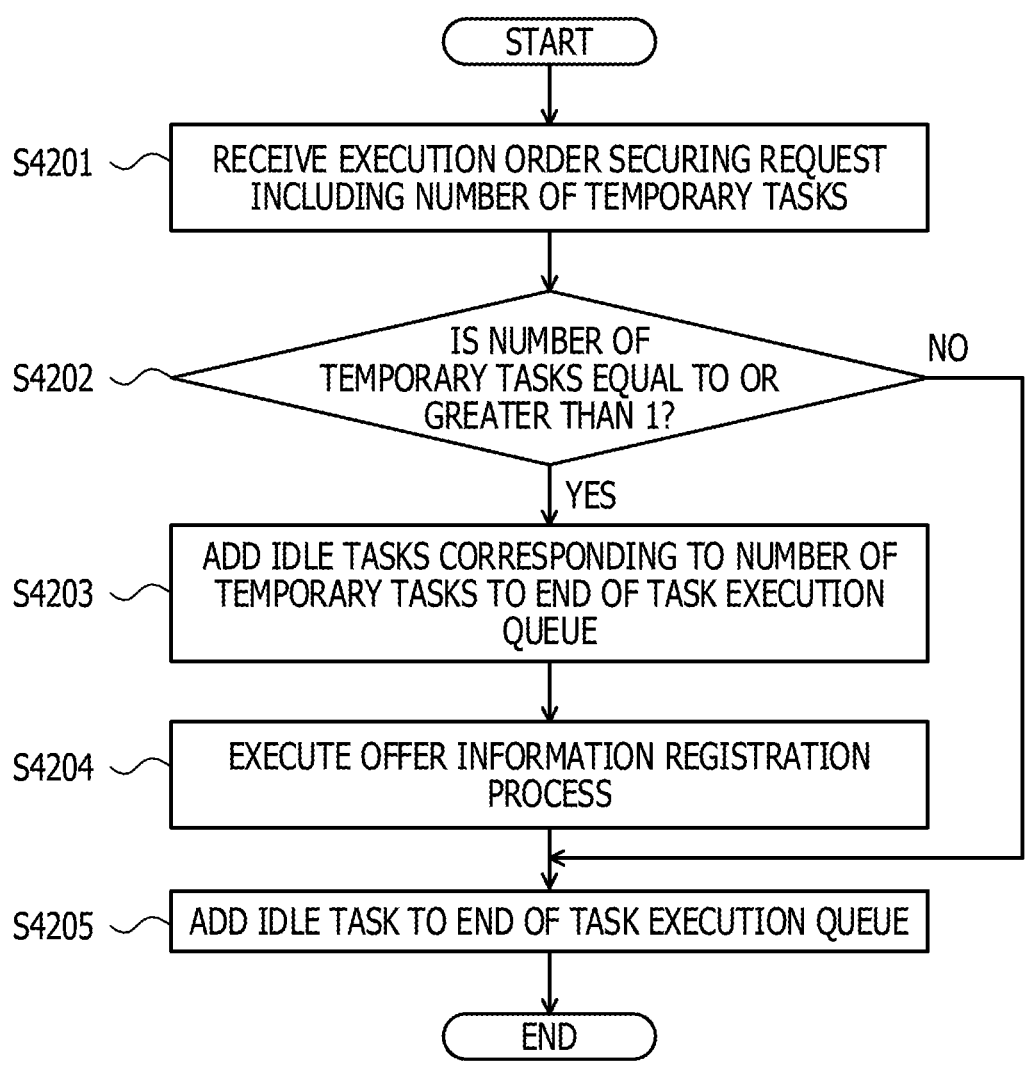
FIG. 42 is a flowchart illustrating an example of an execution order securing process procedure in Example 1.

FIG. 42 is a flowchart illustrating an example of an execution order securing process procedure in Example 1. In FIG. 42, the task execution node 110 receives an execution order securing request including the number of temporary tasks (step S4201).

Next, the task execution node 110 determines whether or not the number of temporary tasks is equal to or greater than 1 (step S4202). Here, in a case where the number of temporary tasks is 0 (No in step S4202), the task execution node 110 transitions to a process in step S4205.

On the other hand, in a case where the number of temporary tasks is equal to or greater than 1 (Yes in step S4202), the task execution node 110 adds idle tasks corresponding to the number of temporary tasks to the end of the task execution queue 1000 (step S4203).

Next, the task execution node 110 causes the first task deployment apparatus 100 to execute an offer information registration process which will be described later in FIG. 43 on each of the idle tasks corresponding to the number of temporary tasks (step S4204). The task execution node 110 transitions to a process in step S4205.

In step S4205, the task execution node 110 adds an idle task to the end of the task execution queue 1000 (step S4205). The task execution node 110 finishes the execution order securing process.

Example of Offer Information Registration Process Procedure in Example 1

Next, with reference to FIG. 43, a description will be made of an example of an offer information registration process procedure in Example 1, executed by using the task execution completion point prediction unit in the first task deployment apparatus 100 in step S4204.

Figure 43:
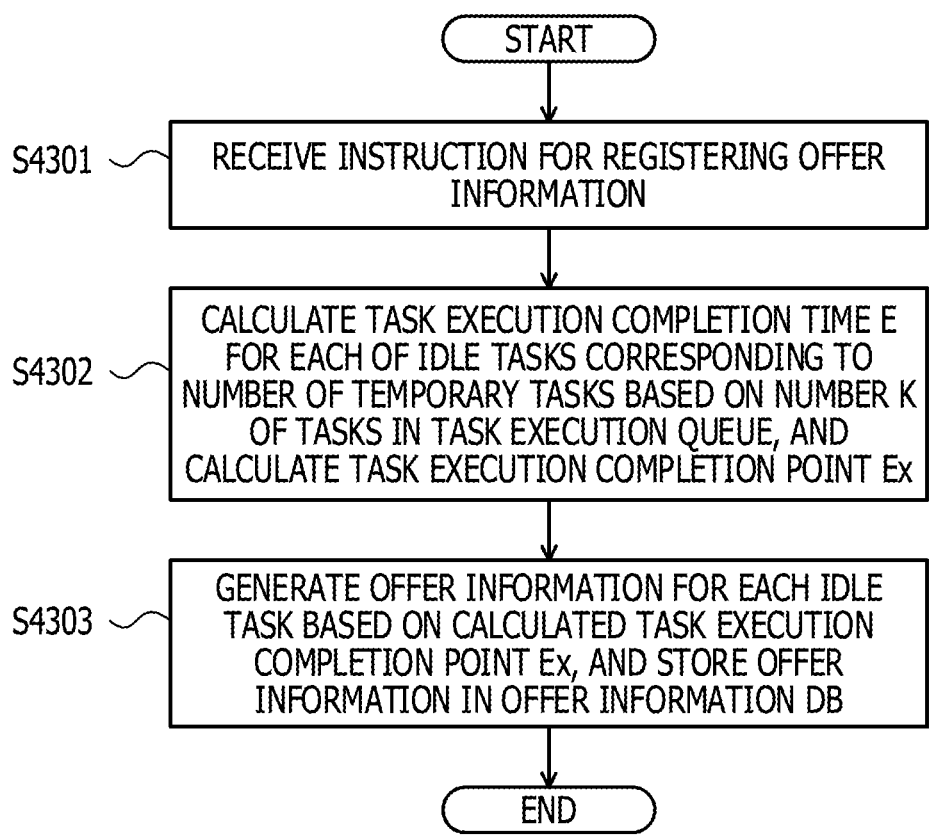
FIG. 43 is an explanatory diagram illustrating an example of offer information registration process procedure in Example 1.

FIG. 43 is a flowchart illustrating an example of an offer information registration process procedure in Example 1. In FIG. 43, the first task deployment apparatus 100 receives an instruction for registering offer information for each of the idle tasks corresponding to the number of temporary tasks from the task execution node 110 (step S4301).

Next, the first task deployment apparatus 100 calculates the task execution completion time E for each of the idle tasks corresponding to the number of temporary tasks based on the number K of tasks in the task execution queue 1000, and calculates the task execution completion point Ex (step S4302).

The first task deployment apparatus 100 generates offer information for each idle task based on the calculated task execution completion point Ex, and stores the offer information in the offer information DB 500 (step S4303). Thereafter, the first task deployment apparatus 100 finishes the offer information registration process.

Example of Offer Transmission Process Procedure in Example 1

Next, with reference to FIG. 44, a description will be made of an example of an offer transmission process procedure in Example 1, executed by using the offer management unit and the transmission/reception unit in the first task deployment apparatus 100 in step S3904.

Figure 44:
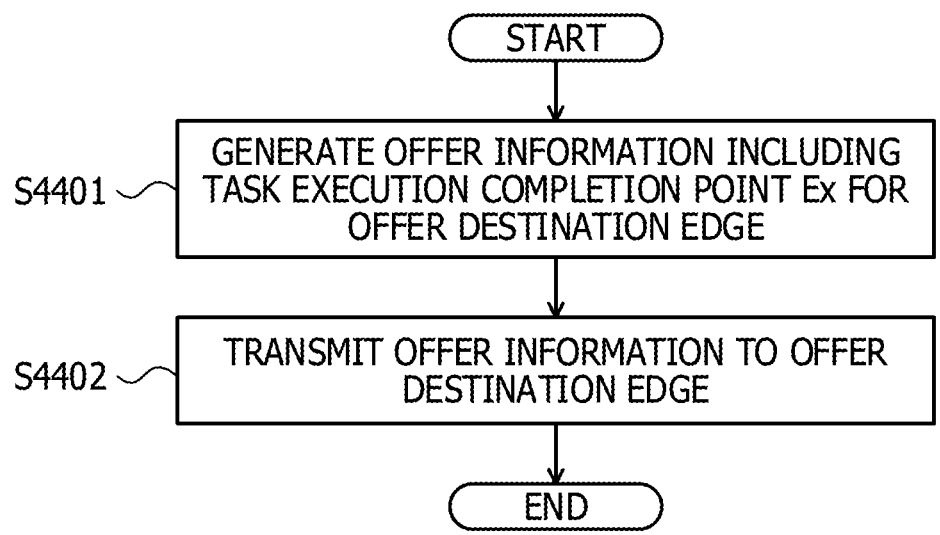
FIG. 44 is a flowchart illustrating an example of an offer transmission process procedure in Example 1.

FIG. 44 is a flowchart illustrating an example of an offer transmission process procedure in Example 1. In FIG. 44, the first task deployment apparatus 100 generates offer information including the calculated task execution completion point Ex for the selected offer destination edge (step S4401).

Next, the first task deployment apparatus 100 transmits the generated offer information to the selected offer destination edge (step S4402). On the other hand, the second task deployment apparatus 100 included in the offer destination edge executes an offer reception process. The first task deployment apparatus 100 finishes the offer transmission process.

Example of Offer Reception Process Procedure in Example 1

Next, with reference to FIG. 45, a description will be made of an example of an offer reception process procedure in Example 1, executed by using the offer management unit and the transmission/reception unit in the second task deployment apparatus 100 included in the offer destination edge in step S4402.

Figure 45:
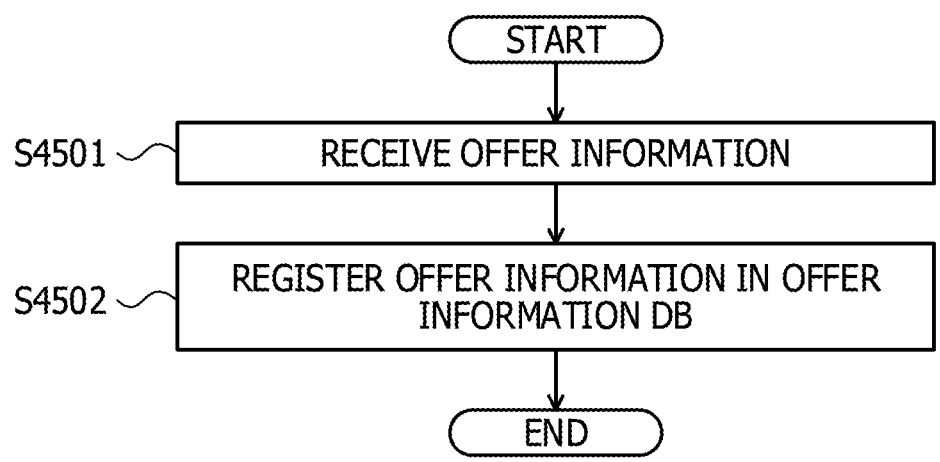
FIG. 45 is a flowchart illustrating an example of an offer reception process procedure in Example 1.

FIG. 45 is a flowchart illustrating an example of an offer reception process procedure in Example 1. In FIG. 45, the second task deployment apparatus 100 receives the offer information (step S4501). Next, the second task deployment apparatus 100 registers the offer information in the offer information DB 500 (step S4502). The second task deployment apparatus 100 finishes the offer reception process.

Example of Task Deployment Location Determination Process Procedure in Example 1

Next, with reference to FIG. 46, a description will be made of an example of a deployment location determination process procedure in Example 1, executed by the second task deployment apparatus 100 included in the offer destination edge.

Figure 46:
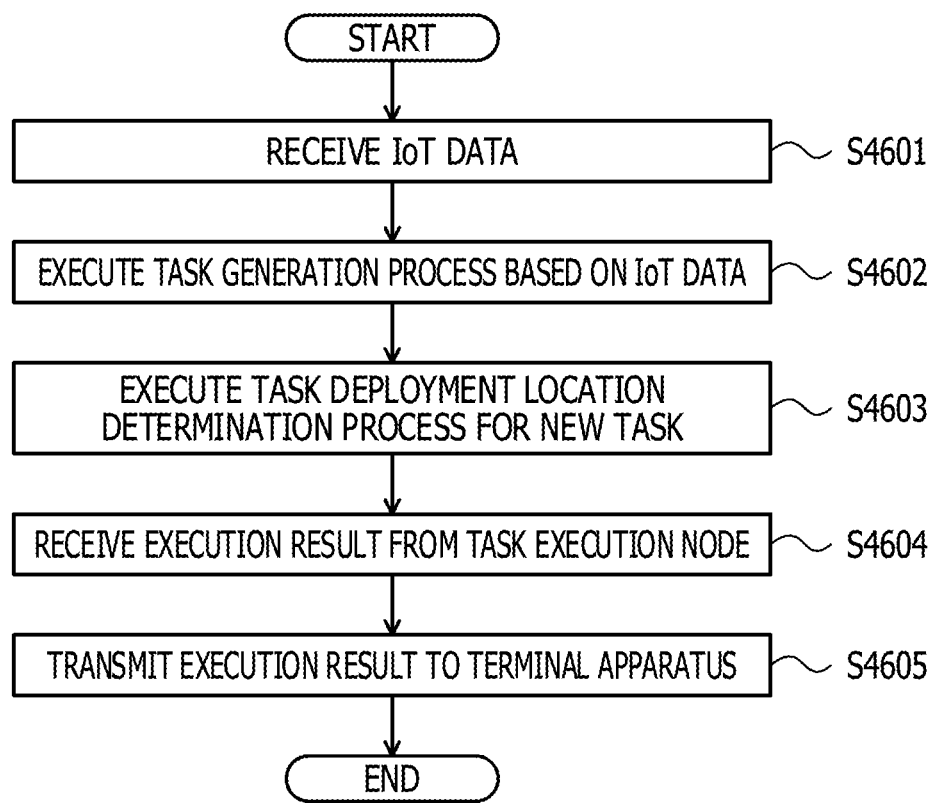
FIG. 46 is a flowchart illustrating an example of a deployment location determination process procedure in Example 1.

FIG. 46 is a flowchart illustrating an example of a deployment location determination process procedure in Example 1. In FIG. 46, the second task deployment apparatus 100 receives IoT data (step S4601).

Next, the second task deployment apparatus 100 executes a task generation process which will be described later in FIG. 47 based on the received IoT data, so as to generate a new task (step S4602). The second task deployment apparatus 100 refers to the offer information DB 500, and executes a task deployment location determination process which will be described later in FIG. 48 or 49 on the generated new task (step S4603).

Next, the second task deployment apparatus 100 receives an execution result from the task execution node 110 (step S4604). The second task deployment apparatus 100 transmits the execution result to the terminal apparatus (step S4605). Thereafter, the second task deployment apparatus 100 finishes the deployment location determination process. Consequently, the second task deployment apparatus 100 can cause the task execution node 110 to execute a task.

Example of Task Generation Process Procedure in Example 1

Next, with reference to FIG. 47, a description will be made of an example of a task generation process procedure in Example 1, executed by using the offer management unit in the second task deployment apparatus 100 included in the offer destination edge in step S3904.

Figure 47:
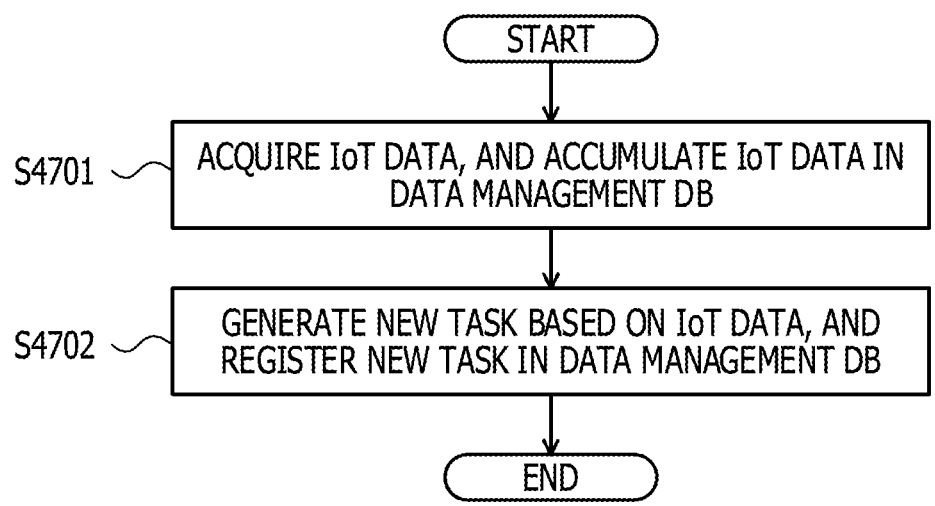
FIG. 47 is a flowchart illustrating an example of a task generation process procedure in Example 1.

FIG. 47 is a flowchart illustrating an example of a task generation process procedure in Example 1. In FIG. 47, the second task deployment apparatus 100 acquires IoT data, and accumulates the IoT data in the data management DB 700 (step S4701). Next, the second task deployment apparatus 100 generates a new task based on the IoT data, and registers the new task in the task management DB 600 (step S4702). The second task deployment apparatus 100 finishes the task generation process.

Example of Task Deployment Location Determination Process Procedure in Example 1

Next, with reference to FIG. 48, a description will be made of an example of a task deployment location determination process procedure in Example 1, executed by using the task deployment location determination unit in the second task deployment apparatus 100 included in the offer destination edge in step S4603.

Figure 48:
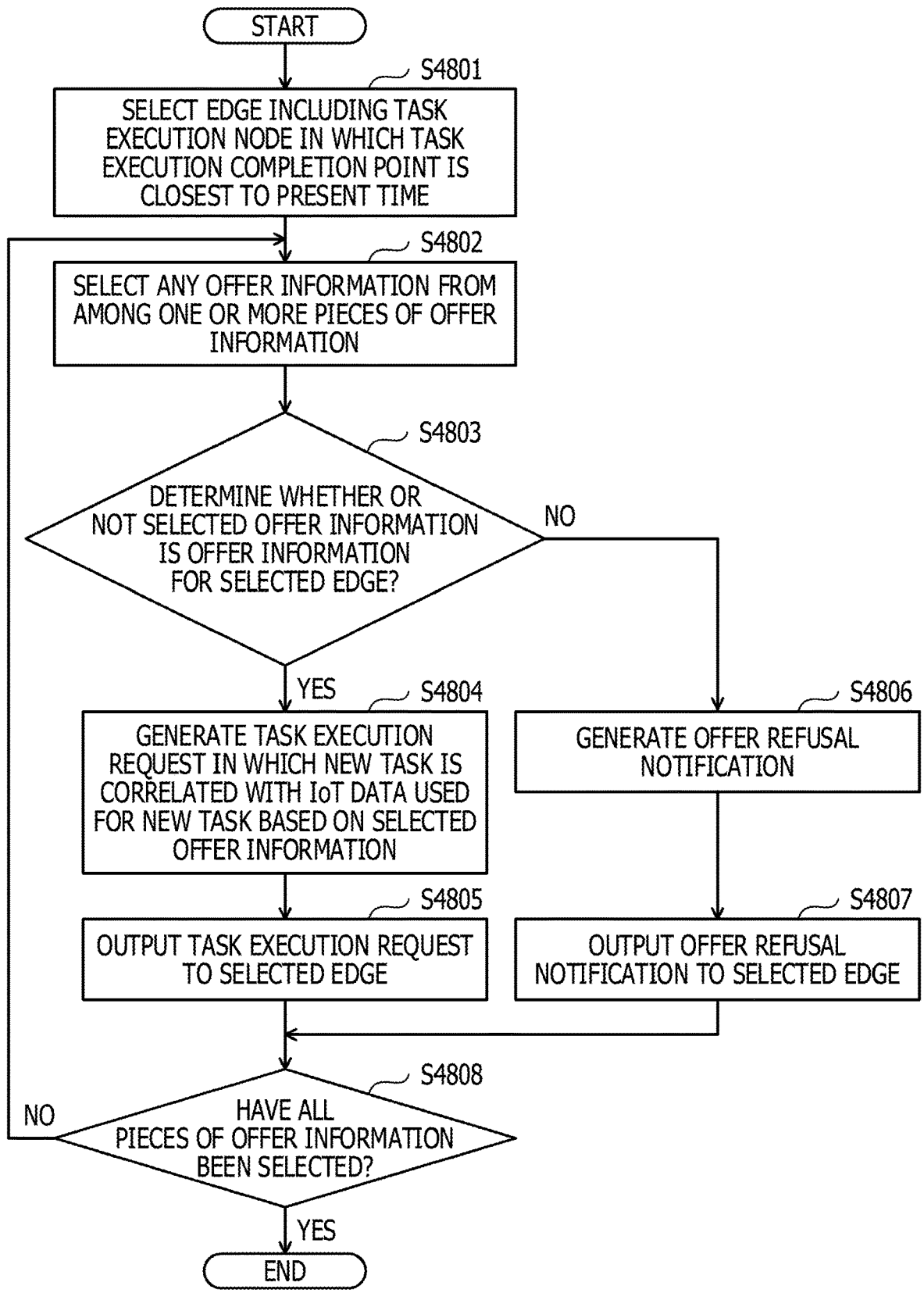
FIG. 48 is a flowchart illustrating an example of a task deployment location determination process procedure in Example 1.

FIG. 48 is a flowchart illustrating an example of a task deployment location determination process procedure in Example 1. In FIG. 48, the second task deployment apparatus 100 refers to the offer information DB 500, and selects the edge Eg including the task execution node 110 in which the task execution completion point is closest to the present time (step S4801).

Next, the second task deployment apparatus 100 selects any offer information from among one or more pieces of offer information registered in the offer information DB 500 (step S4802). The second task deployment apparatus 100 determines whether or not the selected offer information is offer information for the selected edge Eg (step S4803). Here, in a case where the selected offer information is offer information for the selected edge Eg (Yes in step S4803), the second task deployment apparatus 100 transitions to a process in step S4804.

In step S4804, the second task deployment apparatus 100 generates a task execution request in which a new task is correlated with IoT data used for the new task based on the selected offer information (step S4804). Next, the second task deployment apparatus 100 outputs the generated task execution request to the selected edge Eg, and causes the selected edge Eg to execute an offer success process which will be described later in FIG. 50 or 51 (step S4805). The second task deployment apparatus 100 transitions to a process in step S4808.

On the other hand, in a case where the selected offer information is not offer information for the selected edge Eg (No in step S4803), the second task deployment apparatus 100 transitions to a process in step S4806.

In step S4806, the second task deployment apparatus 100 generates an offer refusal notification (step S4806). Next, the second task deployment apparatus 100 outputs the generated offer refusal notification to the selected edge Eg, and causes the selected edge Eg to execute an offer failure process which will be described later in FIG. 52 or 53 (step S4807). The second task deployment apparatus 100 transitions to a process in step S4808.

In step S4808, the second task deployment apparatus 100 determines whether or not all pieces of offer information have been selected (step S4808). Here, in a case where there is any offer information which is not selected (No in step S4808), the second task deployment apparatus 100 returns to the process in step S4802. On the other hand, in a case where all pieces of offer information have been selected (Yes in step S4808), the second task deployment apparatus 100 finishes the task deployment location determination process.

Another Example of Task Deployment Location Determination Process Procedure in Example 1

Next, with reference to FIG. 49, a description will be made of another example of a task deployment location determination process procedure in Example 1, executed by using the task deployment location determination unit in the second task deployment apparatus 100 included in the offer destination edge in step S4603.

Figure 49:
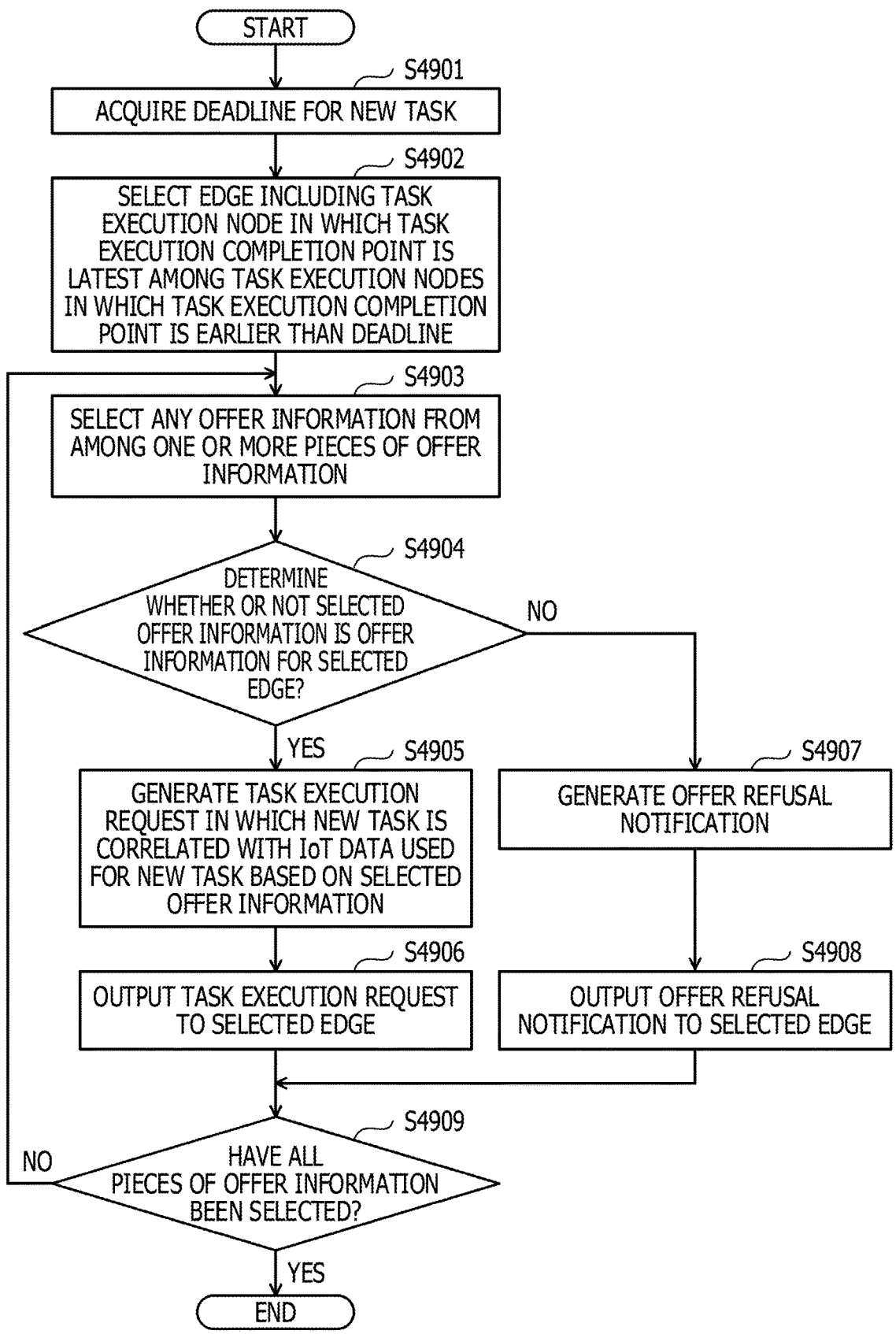
FIG. 49 is a flowchart illustrating another example of a task deployment location determination process procedure in Example 1.

FIG. 49 is a flowchart illustrating another example of a task deployment location determination process procedure in Example 1. In FIG. 49, the second task deployment apparatus 100 refers to the user DB 1200, and acquires a deadline of the generated new task (step S4901).

Next, the second task deployment apparatus 100 refers to the offer information DB 500, and selects the edge Eg including the task execution node 110 in which the task execution completion point is latest among the task execution nodes 110 in which the task execution completion point is earlier than the deadline (step S4902).

Next, the second task deployment apparatus 100 selects any offer information from among one or more pieces of offer information registered in the offer information DB 500 (step S4903). The second task deployment apparatus 100 determines whether or not the selected offer information is offer information for the selected edge Eg (step S4904). Here, in a case where the selected offer information is offer information for the selected edge Eg (Yes in step S4904), the second task deployment apparatus 100 transitions to a process in step S4905.

In step S4905, the second task deployment apparatus 100 generates a task execution request in which a new task is correlated with IoT data used for the new task based on the selected offer information (step S4905).

Next, the second task deployment apparatus 100 outputs the generated task execution request to the selected edge Eg, and causes the selected edge Eg to execute an offer success process which will be described later in FIG. 50 or 51 (step S4906). The second task deployment apparatus 100 transitions to a process in step S4909.

On the other hand, in a case where the selected offer information is not offer information for the selected edge Eg (No in step S4904), the second task deployment apparatus 100 transitions to a process in step S4907.

In step S4907, the second task deployment apparatus 100 generates an offer refusal notification (step S4907). Next, the second task deployment apparatus 100 outputs the generated offer refusal notification to the selected edge Eg, and causes the selected edge Eg to execute an offer failure process which will be described later in FIG. 52 or 53 (step S4908). The second task deployment apparatus 100 transitions to a process in step S4909.

In step S4909, the second task deployment apparatus 100 determines whether or not all pieces of offer information have been selected (step S4909). Here, in a case where there is any offer information which is not selected (No in step S4909), the second task deployment apparatus 100 returns to the process in step S4903. On the other hand, in a case where all pieces of offer information have been selected (Yes in step S4909), the second task deployment apparatus 100 finishes the task deployment location determination process.

The task deployment apparatus 100 may separately use the task deployment location determination process illustrated in FIG. 48 and the task deployment location determination process illustrated in FIG. 49 by referring to the user DB 1200. Consequently, the task deployment apparatus 100 can control a task execution completion point according to a criterion desired by a user.

Example of Offer Success Process Procedure in Example 1

Next, with reference to FIG. 50, a description will be made of an example of an offer success process procedure in Example 1, executed by the task execution node 110 included in the same edge Eg as the edge including the second task deployment apparatus 100 in a case where a task execution request output destination is the second task deployment apparatus 100.

Figure 50:
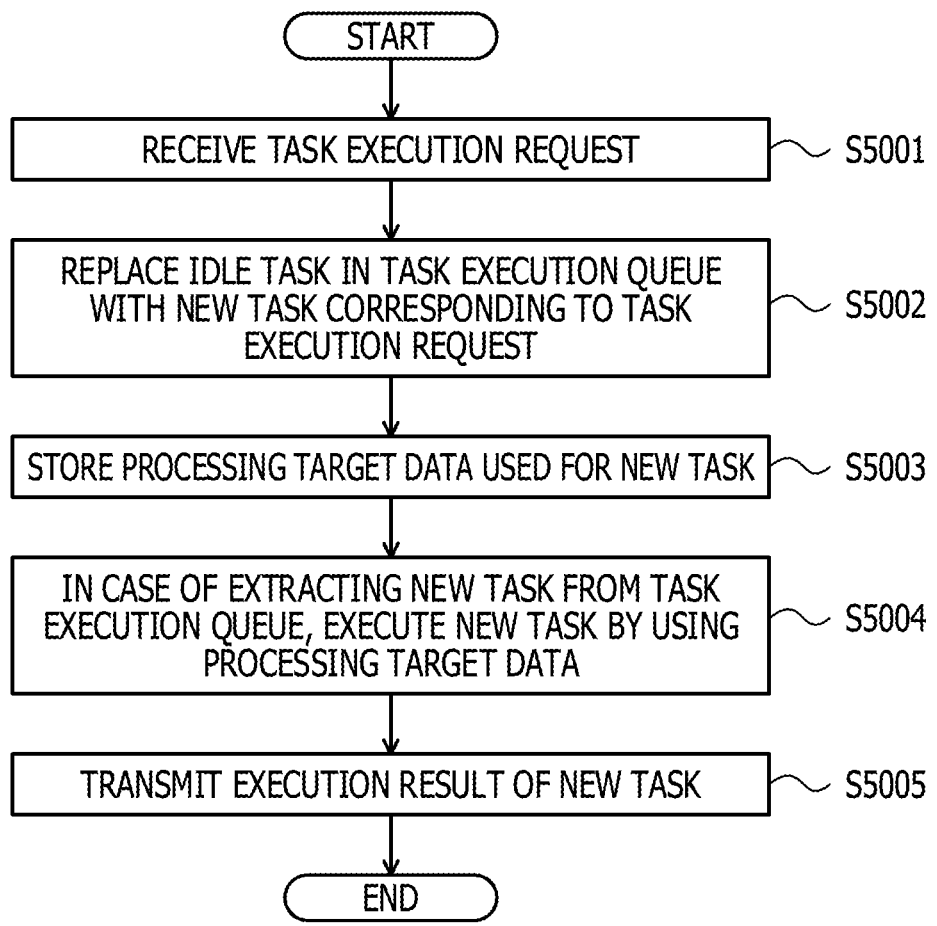
FIG. 50 is a flowchart illustrating an example of an offer success process procedure in Example 1.

FIG. 50 is a flowchart illustrating an example of an offer success process procedure in Example 1. In FIG. 50, the task execution node 110 receives a task execution request from the second task deployment apparatus 100 (step S5001).

Next, the task execution node 110 replaces an idle task in the task execution queue 1000 with a new task corresponding to the task execution request (step S5002). The task execution node 110 stores processing target data used for the new task by using the data management DB 1100 (step S5003).

Thereafter, in a case where the new task is extracted from the task execution queue 1000, the task execution node 110 executes the new task by using the processing target data (step S5004). Next, the task execution node 110 transmits an execution result of the new task to the second task deployment apparatus 100 (step S5005). The task execution node 110 finishes the offer success process.

Another Example of Offer Success Process Procedure in Example 1

Next, with reference to FIG. 51, a description will be made of another example of an offer success process procedure in Example 1, executed by the second task deployment apparatus 100 in a case where a task execution request output destination is the first task deployment apparatus 100.

Figure 51:
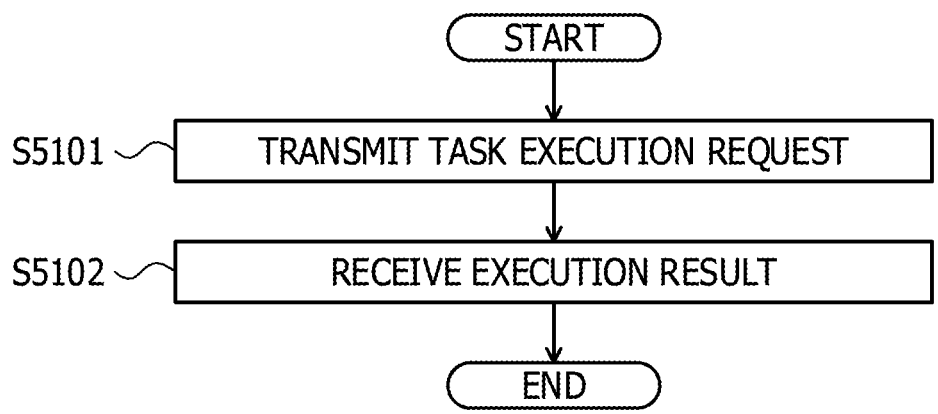
FIG. 51 is a flowchart illustrating another example of an offer success process procedure in Example 1.

FIG. 51 is a flowchart illustrating another example of an offer success process procedure in Example 1. In FIG. 51, the second task deployment apparatus 100 transmits a task execution request to the first task deployment apparatus 100 (step S5101).

Consequently, the first task deployment apparatus 100 gives a response about an execution result of a new task to the second task deployment apparatus 100 by causing the task execution node 110 included in the same edge Eg as the edge including the first task deployment apparatus 100 to execute the offer success process illustrated in FIG. 50. The second task deployment apparatus 100 receives the execution result (step S5102). The second task deployment apparatus 100 finishes the offer success process.

Example of Offer Failure Process Procedure in Example 1

Next, with reference to FIG. 52, a description will be made of an example of an offer failure process procedure in Example 1, executed by the task execution node 110 included in the same edge Eg as the edge including the second task deployment apparatus 100 in a case where an offer refusal notification output destination is the second task deployment apparatus 100.

Figure 52:
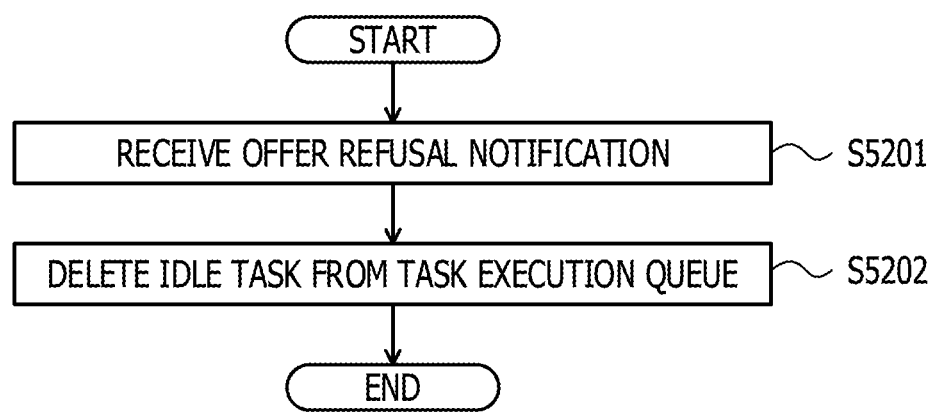
FIG. 52 is a flowchart illustrating an example of an offer failure process procedure in Example 1.

FIG. 52 is a flowchart illustrating an example of an offer failure process procedure in Example 1. In FIG. 52, the task execution node 110 receives an offer refusal notification from the second task deployment apparatus 100 (step S5201). Next, the task execution node 110 deletes an idle task in the task execution queue 1000 (step S5202). The task execution node 110 finishes the offer failure process.

Example of Offer Failure Process Procedure in Example 1

Next, with reference to FIG. 53, a description will be made of an example of an offer failure process procedure in Example 1, executed by the second task deployment apparatus 100 in a case where an offer refusal notification output destination is the first task deployment apparatus 100.

Figure 53:
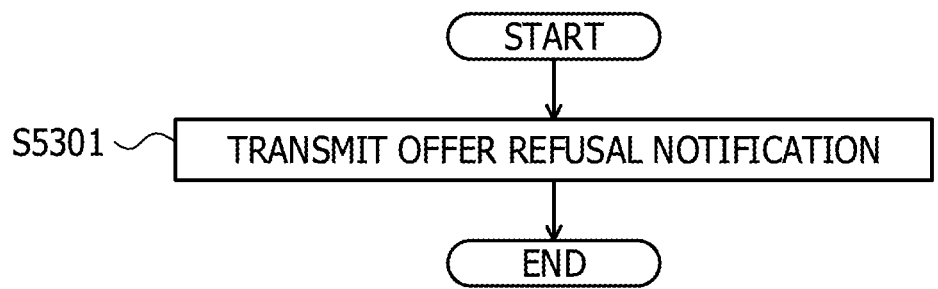
FIG. 53 is a flowchart illustrating an example of an offer failure process procedure in Example 1.

FIG. 53 is a flowchart illustrating another example of an offer failure process procedure in Example 1. In FIG. 53, the second task deployment apparatus 100 transmits an offer refusal notification to the first task deployment apparatus 100 (step S5301). The second task deployment apparatus 100 finishes the offer failure process. Consequently, the first task deployment apparatus 100 causes the task execution node 110 included in the same edge Eg as the edge including the first task deployment apparatus 100 to execute the offer failure process illustrated in FIG. 52.

Example 2 of Determining Deployment Location

Next, with reference to FIGS. 54 and 55, a description will be made of Example 2 of determining a deployment location. In Example 1, as described above, a description has been made of a case where a single task execution node 110 is included in the edge Eg, and a task execution completion point for a new task is calculated for the task execution node 110 included in the same edge Eg as the edge including the task deployment apparatus 100.

In contrast, in Example 2, there are a plurality of task execution nodes 110 included in the edge Eg, and the task deployment apparatus 100 selects any one of the task execution nodes 110, and calculates a task execution completion point for a new task.

Figure 54:
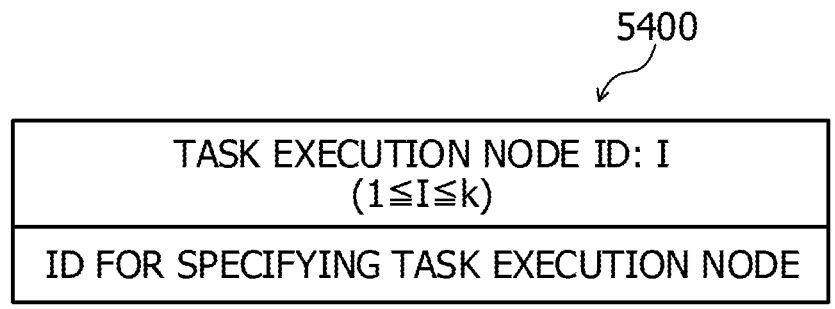
FIG. 54 is an explanatory diagram (first) illustrating Example 2 of determining a deployment location.

FIGS. 54 and 55 are explanatory diagrams illustrating Example 2 of determining a deployment location. As illustrated in FIG. 54, the task deployment apparatus 100 further stores a task execution node management DB 5400 in Example 2. The task execution node management DB 5400 is realized by, for example, a storage region such as the memory 302 or the recording medium 305 of the task deployment apparatus 100 illustrated in FIG. 3.

As illustrated in FIG. 54, the task execution node management DB 5400 has a field of a task execution node ID. In the task execution node management DB 5400, information is set in each field, and thus task execution node management information is stored as a record.

A task execution node ID is set in the field of a task execution node ID. The task execution node ID is an ID for specifying the task execution node 110. The task execution node ID is, for example, I. I is an integer of 1 to k. Here, k is the number of task execution nodes 110 in the edge Eg. Next, the description will be continued with reference to FIG. 55.

As illustrated in FIG. 55, the task deployment apparatus 100 stores an offer information DB 5500 instead of the offer information DB 500 in Example 2. The offer information DB 5500 is realized by, for example, a storage region such as the memory 302 or the recording medium 305 of the task deployment apparatus 100 illustrated in FIG. 3.

As illustrated in FIG. 55, the offer information DB 5500 has fields of an offer ID, a task execution node ID, a task ID, and a task execution completion point. In the offer information DB 5500, information is set in each field, and thus offer information is stored as a record.

An offer ID is set in the field of an offer ID. The offer ID is an ID for specifying the edge Eg which has transmitted offer information. A task execution node ID is set in the field of a task execution node ID. The task execution node ID is an ID for specifying the task execution node 110 which can execute a new task. A task ID is set in the field of a task ID. The task ID is an ID for specifying a task. The task ID is an ID for specifying, for example, an idle task which can be replaced with a generated new task. A task execution completion point in the task execution node 110 which is an offer information generation target is set in the field of a task execution completion point. The task execution completion point is an estimated task execution completion point.

In Example 2, the task deployment apparatus 100 randomly selects the task execution node 110 by referring to the task execution node management DB 5400. The task deployment apparatus 100 manages offer information for each task execution node 110 by using the offer information DB 5500.

The task deployment apparatus 100 may select the task execution node 110 having a relatively small number of tasks from among one or more task execution nodes 110 by referring to the task execution node management DB 5400. Consequently, the task deployment apparatus 100 can select the task execution node 110 which has a relatively high probability of executing a new task generated in the future and in which the time until execution of the new task is completed from generation of the new task generated in the future appears to be relatively short. Thus, the task deployment apparatus 100 enables a task execution request for a new task to be easily received.

Example of Distributed Resource Management Process Procedure in Example 2

An example of a distributed resource management process procedure in Example 2, executed by the task deployment apparatus 100 is the same as a case where a new process procedure is added to the distributed resource management process procedure in Example 1 illustrated in FIG. 39. In Example 2, a process of selecting the task execution node 110 in Example 2 which will be described later in FIG. 56 or 57 is added before the process in step S3901 in FIG. 39 is executed.

Example of Selection Process Procedure for Task Execution Node 110 in Example 2

Next, with reference to FIG. 56, a description will be made of an example of a selection process procedure for the task execution node 110 in Example 2.

Figure 56:
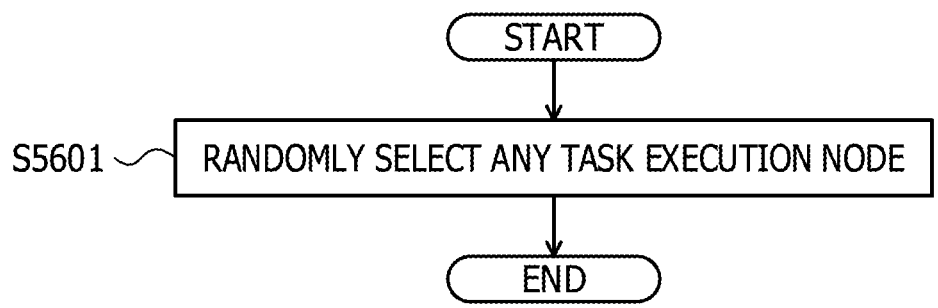
FIG. 56 is a flowchart illustrating an example of a task execution node selection process procedure in Example 2.
Figure 57:
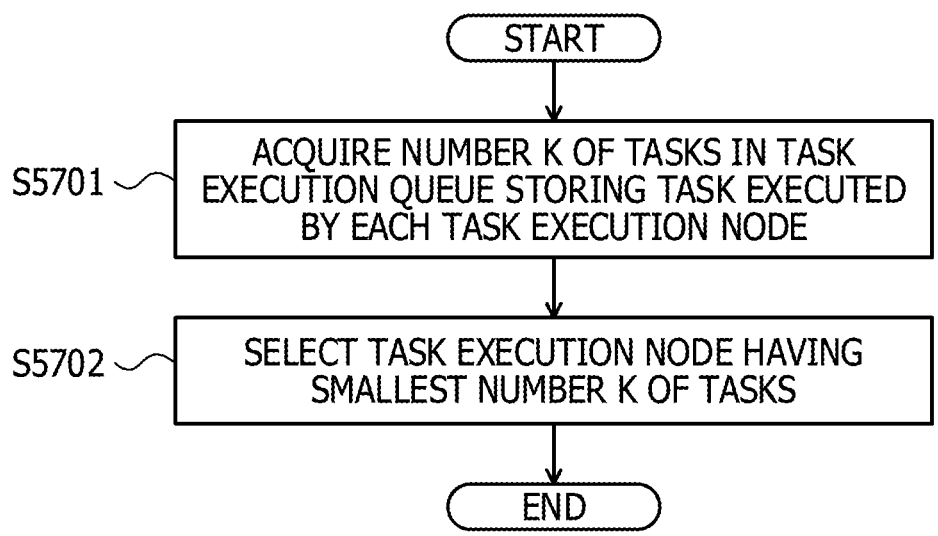
FIG. 57 is a flowchart illustrating another example of a task execution node selection process procedure in Example 2.

FIG. 56 is a flowchart illustrating an example of a selection process procedure for the task execution node 110 in Example 2. In FIG. 56, the task deployment apparatus 100 randomly selects any task execution node 110 from among one or more task execution nodes 110 included in the same edge Eg as the edge including the task deployment apparatus 100 by referring to the task execution node management DB 5400 (step S5601). The task deployment apparatus 100 finishes the selection process for the task execution node 110.

Another Example of Selection Process Procedure for Task Execution Node 110 in Example 2

Next, with reference to FIG. 57, a description will be made of another example of a selection process procedure for the task execution node 110 in Example 2.

FIG. 57 is a flowchart illustrating another example of a selection process procedure for the task execution node 110 in Example 2. In FIG. 57, the task deployment apparatus 100 acquires the number K of tasks in the task execution queue 1000 storing a task executed by each of a plurality of task execution nodes 110 (step S5701).

Next, the task deployment apparatus 100 selects the task execution node 110 in which the number K of tasks is smallest (step S5702). The task deployment apparatus 100 finishes the selection process for the task execution node 110. Consequently, the task deployment apparatus 100 can select the task execution node 110 in which a probability of executing a task is relatively high.

Example 3 of Determining Deployment Location

Next, with reference to FIG. 58, a description will be made of Example 3 of determining a deployment location.

In Example 1, a description has been made of a case where the task deployment apparatus 100 randomly selects an offer destination edge.

In contrast, in Example 3, the task deployment apparatus 100 selects, as an offer destination edge, an edge including the second task deployment apparatus 100 in which a probability of transmitting an execution request for a new task is determined as being relatively high.

Figure 58:
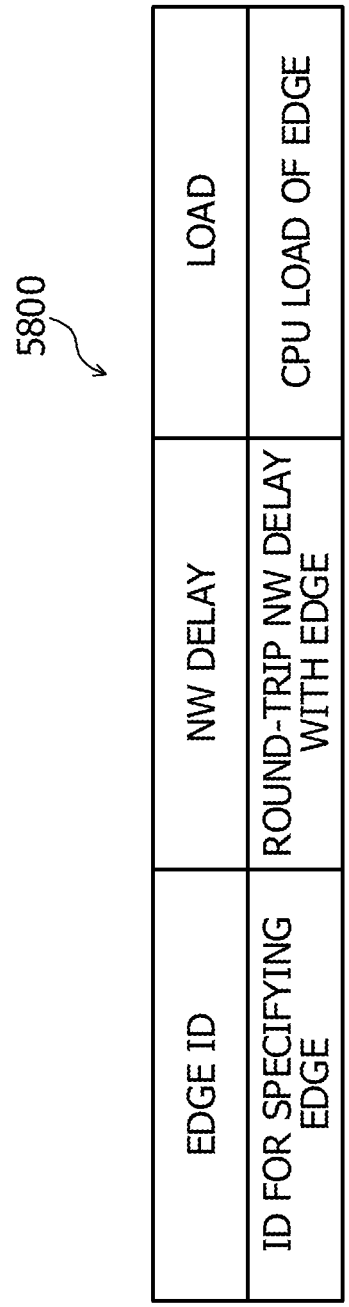
FIG. 58 is an explanatory diagram illustrating Example 3 of determining a deployment location.

FIG. 58 is an explanatory diagram illustrating Example 3 of determining a deployment location. As illustrated in FIG. 58, the task deployment apparatus 100 stores an edge management DB 5800 in Example 3 instead of the edge management DB 400. The edge management DB 5800 is realized by, for example, a storage region such as the memory 302 or the recording medium 305 of the task deployment apparatus 100 illustrated in FIG. 3.

As illustrated in FIG. 58, the edge management DB 5800 has fields of an edge ID, a network (NW) delay, and a load. In the edge management DB 5800, information is set in each field, and thus edge management information is stored as a record.

Among a plurality of edges Eg included in the wide area distributed system 200, an edge ID for the edge Eg which is different from the edge Eg including the task deployment apparatus 100 is set in the field of an edge ID. The edge ID is an ID for specifying the edge Eg. A round-trip NW delay from the task deployment apparatus 100 to the edge Eg specified by the edge ID is set in the field of an NW delay. The unit of the round-trip NW delay is, for example, ms. A process load on the edge Eg is set in the field of a load. The load is, for example, a representative value of CPU loads of the task execution nodes 110 included in the edge Eg. The representative value is, for example, an average value, a most frequent value, a maximum value, a minimum value, or a total value.

In Example 3, in a case where there are one more other edges Eg, the task deployment apparatus 100 selects the edge Eg having a relatively small communication delay with the edge Eg, and calculates an execution completion point for a new task. The task deployment apparatus 100 may select the edge Eg having a relatively large process load on the edge Eg, and may calculate an execution completion point for a new task.

Consequently, the task deployment apparatus 100 can calculate a task execution completion point for an edge Eg in which a probability of transmitting an execution request for a new task is determined as being relatively high. The task deployment apparatus 100 enables an execution request for a new task to be easily received by using the calculated task execution completion point.

Example of Distributed Resource Management Process Procedure in Example 3

An example of a distributed resource management process procedure in Example 3, executed by the task deployment apparatus 100 is the same as the example of the distributed resource management process procedure in Example 1 illustrated in FIG. 39. In Example 3, the offer destination edge selection process in FIG. 40 executed in step S3901 in FIG. 39 is replaced with an offer destination edge selection process in Example 3 which will be described later in FIG. 59 or 60.

Example of Offer Destination Edge Selection Process Procedure in Example 3

Next, with reference to FIG. 59, a description will be made of an example of an offer destination edge selection process procedure in Example 3, executed by using the offer destination edge selection unit in the first task deployment apparatus 100 in step S3901.

Figure 59:
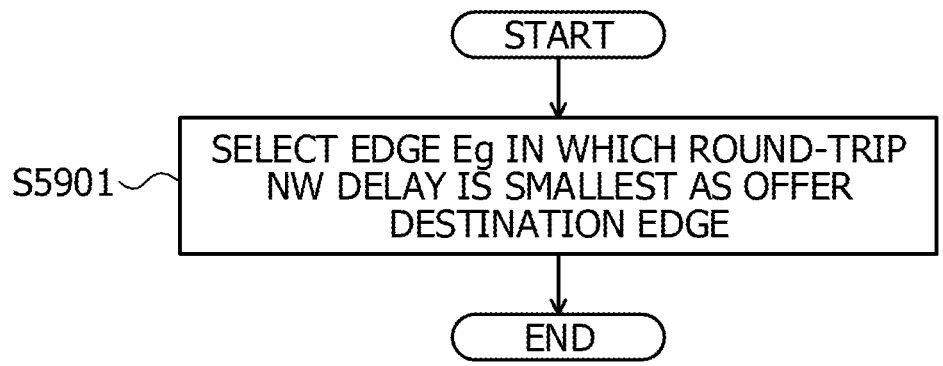
FIG. 59 is a flowchart illustrating an example of an offer destination edge selection process procedure in Example 3.

FIG. 59 is a flowchart illustrating an example of an offer destination edge selection process procedure in Example 3. In FIG. 59, the task deployment apparatus 100 selects, as an offer destination edge, the edge Eg having the smallest round-trip NW delay by referring to the edge management DB 5800 (step S5901). The task deployment apparatus 100 finishes the offer destination edge selection process.

Another Example of Offer Destination Edge Selection Process Procedure in Example 3

Next, with reference to FIG. 60, a description will be made of another example of an offer destination edge selection process procedure in Example 3, executed by using the offer destination edge selection unit in the first task deployment apparatus 100 in step S3901.

Figure 60:
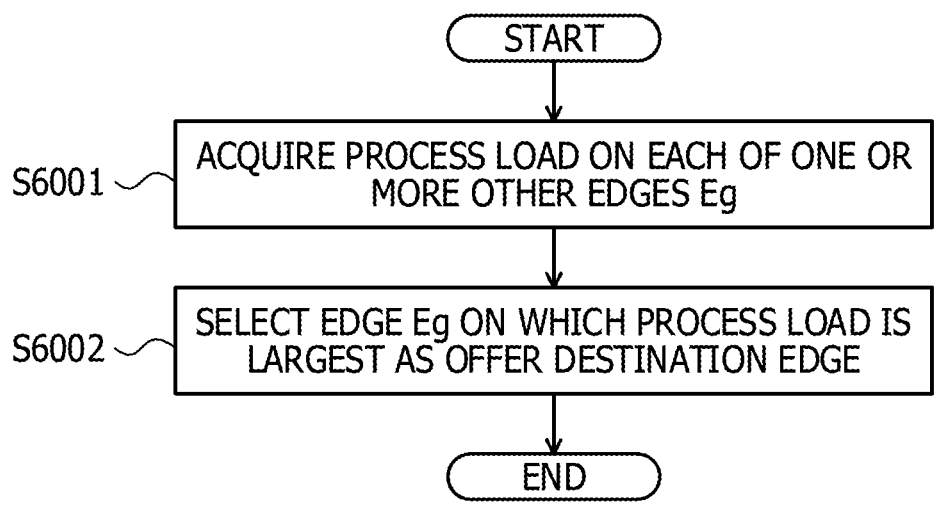
FIG. 60 is a flowchart illustrating another example of an offer destination edge selection process procedure in Example 3.

FIG. 60 is a flowchart illustrating another example of an offer destination edge selection process procedure in Example 3. In FIG. 60, the task deployment apparatus 100 acquires a process load on each of one or more other edges Eg by referring to the edge management DB 5800 (step S6001). Next, the task deployment apparatus 100 selects the edge Eg on which a process load is largest as an offer destination edge (step S6002). The task deployment apparatus 100 finishes the offer destination edge selection process.

Example 4 of Determining Deployment Location

Next, a description will be made of Example 4 of determining a deployment location. In Example 1, as described above, a description has been made of a case where the offer management unit 1405 and the task management unit 1406 have a function of receiving an offer refusal message.

In contrast, the execution order control unit 1404 may have the function of the offer management unit 1405 receiving a new task or processing target data and the function of the task management unit 1406 receiving an offer refusal message.

In Example 4, in a case where offer information is generated, the task deployment apparatus 100 notifies the execution order control unit 1404 of the task execution node 110 corresponding to the offer information of an edge ID and a task ID corresponding to the offer information, and the execution order control unit 1404 accumulates the edge ID and the task ID.

Consequently, even if a new task or processing target data is directly received, the execution order control unit 1404 of the task execution node 110 can register the new task in the task execution queue 1000 by referring to the accumulated edge ID and the task ID. The execution order control unit 1404 of the task execution node 110 can accumulate the processing target data until the new task is executed.

Consequently, even if an offer refusal message is directly received, the execution order control unit 1404 of the task execution node 110 can delete an idle task from the task execution queue 1000 by referring to the acquired edge ID and task ID.

The distribution node 203 may have the function of task management unit 1406 receiving an execution result.

In Example 4, in a case where a new task is transmitted, the task deployment apparatus 100 notifies the distribution node 203 of an edge ID and a task ID corresponding to a transmission destination of the new task, and the distribution node 203 accumulates the edge ID and the task ID. In a case where an execution result is received, the distribution node 203 transmits the execution result to a terminal apparatus by referring to the accumulated edge ID and task ID. Consequently, in Example 4, it is possible to reduce a process load on the task deployment apparatus 100.

As described above, according to the task deployment apparatus 100, it is possible to acquire the number of processes in the task execution node 110, a process execution rate in the task execution node 110, and a communication delay between another task deployment apparatus 100 and the task execution node 110. According to the task deployment apparatus 100, it is possible to generate information for an execution completion point for a new process in a case where the new process is executed by the task execution node 110 based on acquired various pieces of information. According to the task deployment apparatus 100, it is possible to transmit information for specifying an execution completion point generated for the task execution node 110 to another task deployment apparatus 100. Consequently, the task deployment apparatus 100 can specify an execution completion point for the new process 160 in another task deployment apparatus 100 with high accuracy, and can determine a deployment location such that execution of the new process 160 can be completed by a predetermined time limit.

In a case where the number of processes is acquired, the task deployment apparatus 100 can cause the task execution node 110 to add a predetermined number of dummy processes to a queue based on a processing time corresponding to a communication delay. In a case where an execution request for a new process is received from another task deployment apparatus 100, the task deployment apparatus 100 can cause the task execution node 110 to replace a dummy process added to a queue with the new process. Consequently, in a case where a new process is generated in the future, the task deployment apparatus 100 may add a dummy process which can be replaced with the new process, to the queue. Thus, even in a case where some processes are added to the queue in the future, the task deployment apparatus 100 replaces a new task from another task deployment apparatus 100 with a dummy process, and can thus complete execution of the new task by a task execution completion point.

In a case where the number of processes is acquired, the task deployment apparatus 100 can cause the task execution node 110 to add a first dummy process to the queue until processing time corresponding to the queue becomes processing time corresponding to a communication delay. According to the task deployment apparatus 100, it is possible to add a second dummy process which can be replaced with a new process to the queue. The task deployment apparatus 100 can cause the task execution node 110 to replace a process generated in the task deployment apparatus 100 in response to reception of predetermined data, with the first dummy process added to the queue. Consequently, the task deployment apparatus 100 can cause the task execution node 110 to execute a process generated in the task deployment apparatus 100 until execution of a new task from another task deployment apparatus 100 is started, and can thus efficiently use the task execution node 110.

The task deployment apparatus 100 can receive information for specifying an execution completion point for a new process generated in the task deployment apparatus 100 from another task deployment apparatus 100. The task deployment apparatus 100 can generate a new process based on predetermined data in response to reception of the predetermined data. In a case where a new process is generated, the task deployment apparatus 100 can determine whether or not the task execution node 110 managed by another task deployment apparatus 100 can execute the generated process based on received information. Consequently, the task deployment apparatus 100 can reduce a load in the edge Eg including the task deployment apparatus 100 by using the task execution node 110 managed by another task deployment apparatus 100.

The task deployment apparatus 100 can generate information for specifying an execution completion point in a case where a new process generated by the task deployment apparatus 100 is executed by the task execution node 110 based on information regarding a communication delay between the task deployment apparatus 100 and the task execution node 110. In a case where a new process is generated based on predetermined data in response to reception of the predetermined data, the task deployment apparatus 100 can determine whether or not the task execution node 110 can execute the generated process based on generated information. Consequently, the task deployment apparatus 100 can specify an execution completion point with high accuracy by taking into consideration a communication delay with the task execution node 110 managed by the task deployment apparatus 100, and can thus deploy a process to the task execution node 110 which appears to complete the process by a predetermined time limit.

The task deployment apparatus 100 can select another task deployment apparatus 100 having a relatively small communication delay with the task execution node 110 among one or more other task deployment apparatuses 100, and can transmit information for specifying an execution completion point generated for the task execution node 110 thereto. Consequently, the task deployment apparatus 100 can transmit the execution completion point to another task deployment apparatus 100 which has a relatively small communication delay, and thus has a relatively high probability of transmitting an execution request for a new process. Thus, the task deployment apparatus 100 enables an execution request for a new process to be easily received from another task deployment apparatus 100.

The task deployment apparatus 100 can select another task deployment apparatus 100 having a relatively large process load among one or more other task deployment apparatuses 100, and can transmit information for specifying an execution completion point generated for the task execution node 110 thereto. Consequently, the task deployment apparatus 100 can transmit the execution completion point to another task deployment apparatus 100 which has a relatively large process load, and thus has a relatively high probability of transmitting an execution request for a new process. Thus, the task deployment apparatus 100 enables an execution request for a new process to be easily received from another task deployment apparatus 100.

The task deployment apparatus 100 can acquire the number of processes in a queue storing a process executed by the task execution node 110 which is randomly selected from among one or more task execution nodes 110. Consequently, the task deployment apparatus 100 can distribute loads on one or more task execution nodes 110 by sharing some new processes generated in the task deployment apparatus 100 in the future to the one or more task execution nodes 110.

The task deployment apparatus 100 can generate information for specifying an execution completion point for a new process for the task execution node 110 which has a relatively small number of processes and is selected from among one or more task execution nodes 110. Consequently, the task deployment apparatus 100 can select the task execution node 110 in which time taken for execution of a new task generated in the task deployment apparatus 100 in the future to be completed appears to be relatively short. Thus, the task deployment apparatus 100 enables an execution request for a new process to be easily received from another task deployment apparatus 100.

The task deployment apparatus 100 can acquire a transmission time limit for an execution result of a process generated in the task deployment apparatus 100. The task deployment apparatus 100 can receive information for specifying an execution completion point in a case where the task execution node 110 managed by each of other task deployment apparatuses 100 executes a process generated in the task deployment apparatus 100. The task deployment apparatus 100 can determine the task execution node 110 in which an execution completion point specified by received information is earlier than an acquired transmission time limit as the task execution node 110 which is to execute a process generated in the task deployment apparatus 100. Consequently, the task deployment apparatus 100 can improve a probability of execution of a new process being completed by a deadline.

The task deployment apparatus 100 can receive information for specifying an execution completion point in a case where the task execution node 110 managed by each of other task deployment apparatuses 100 executes a process generated in the task deployment apparatus 100. The task deployment apparatus 100 can determine the task execution node 110 in which an execution completion point specified by received information is closest to the present time as the task execution node 110 which is to execute a process generated in the task deployment apparatus 100. Consequently, the task deployment apparatus 100 can minimize time taken for an execution result of a new task to be acquired, and can improve a probability of execution of a new process being completed by a deadline.

The task deployment method described in the present embodiment may be realized by executing a program prepared in advance in a computer such as a personal computer or a workstation. The task deployment program described in the present embodiment is recorded on a computer readable recording medium such as a hard disk, a flexible disk, a CD-ROM, an MO, or a DVD, and is executed as a result of being read from the recording medium by a computer. The task deployment program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   acquiring, when a new process occurred in a management node, a number of processes in a queue included in a node coupled to the management node;
   acquiring a process execution rate of the node;
   calculating an execution time for the processes by dividing the acquired number of processes by the acquired process execution rate;
   calculating an execution completion point for the new process in a case where execution of the new process is started by the node based on the calculated execution time and a communication delay between the management node and the node; and
   transmitting the calculated execution completion point to the management node,
   the management node is configured to determine whether to cause the node to execute the new process based on the calculated execution completion point.

2. The storage medium according to claim 1, wherein the process further comprising
   adding a predetermined number of dummy processes to the queue in the node based on process time corresponding to the communication delay when the number of processes in the queue storing the process executed by the node is acquired; and
   replacing any of the dummy processes added to the queue with the new task in the node when an execution request for the new process is received from the management node.

3. The storage medium according to claim 2, wherein the adding includes:
   when the number of processes in the queue storing the process executed by the node is acquired, causing the node to add a first dummy process to the queue until process time corresponding to the queue becomes process time corresponding to the communication delay, and
   causing the node to add a second dummy process which is able to be replaced with the new process, and
   the process further comprising
   when a new second process is generated based on predetermined data in response to reception of the predetermined data, causing the node to replace the first dummy process added to the queue with the generated second process.

4. The storage medium according to claim 1, wherein the process further comprising:
   receiving, from a second management node managing one or more nodes, second information for specifying the execution completion point for a new second process in a case where a node among the one or more nodes is to execute the second process which is generated based on information regarding a communication delay between the computer and any node and is generated by the computer; and
   when the new second process is generated based on predetermined data in response to reception of the predetermined data, determining whether the generated second process is to be executed by the node based on the received second information.

5. The storage medium according to claim 1, wherein the process further comprising:
   generating information for specifying the execution completion point for a second process in a case where the node is to execute the second process based on the acquired number of processes in the node, information regarding a process execution rate in the node, and information regarding a communication delay between the computer and the node; and
   when the new second process is generated based on predetermined data in response to reception of the predetermined data, determining whether the generated second process is to be executed by the node based on the generated information for specifying the execution completion point for the generated second process.

6. The storage medium according to claim 1, wherein the process further comprising
selecting a management node having a smallest communication delay with the node from among one or more management nodes,
wherein the generating includes generating information for specifying the execution completion point for the new process in a case where the node is to execute the new process is generated based on the acquired number of processes in the node, information regarding a process execution rate in the node, and information regarding a communication delay between the selected management node and the node, and
wherein the transmitting includes transmitting the generated information for specifying the execution completion point to the selected management node.

7. The storage medium according to claim 1, wherein the process further comprising:
selecting a management node having a largest process load among one or more management nodes,
wherein the generating includes generating information for specifying the execution completion point for the new process when the node is to execute the new process is generated based on the acquired number of processes in the node, information regarding a process execution rate in the node, and information regarding a communication delay between the selected management node and the node, and
wherein the transmitting includes transmitting the generated information for specifying the execution completion point to the selected management node.

8. The storage medium according to claim 1, wherein the acquiring includes acquiring the number of processes in a queue storing a process executed by a node which is randomly selected from among one or more nodes is acquired.

9. The storage medium according to claim 1, wherein
the acquiring includes acquiring the number of processes in a queue storing a process executed by each of one or more nodes is acquired, and
the generating includes generating information for specifying the execution completion point for the new process in a case where a node which is selected from among the one or more nodes and has a smallest number of processes is to execute the new process is generated based on the number of processes in the node, information regarding a process execution rate in the node, and information regarding a communication delay between the management node and the node.

10. A non-transitory computer-readable storage medium storing a program that causes a computer coupled to a task deployment apparatus to execute a process, the process comprising:
receiving an execution completion point for a new process from the task deployment apparatus, the execution completion point being calculated by a processor included in the task deployment apparatus by using a method that includes acquiring a number of processes in a queue included in a node of the one or more nodes when the new process occurred in the management node, acquiring a process execution rate of the node, calculating an execution time for the processes by dividing the acquired number of processes by the acquired process execution rate, calculating an execution completion point for the new process in a case where execution of the new process is started by the node based on the calculated execution time and a communication delay between the management node and the node; and
determining whether to cause the node to execute the new process based on the calculated execution completion point.

11. The storage medium according to claim 10, wherein the process further comprising
acquiring a transmission time limit for an execution result of the new process,
wherein the acquiring includes acquiring an execution completion point for the new process in a case where a node managed by the management node is to execute the new process is received from each of a plurality of management nodes, and
wherein the determining includes determining a node in which the execution completion point is earlier than the acquired transmission time limit as a node which is to execute the new process.

12. The storage medium according to claim 10,
wherein the acquiring includes acquiring the execution completion point for the new process in a case where a node managed by the management node is to execute the new process is received from each of a plurality of management nodes, and
wherein the determining includes determining a node in which the execution completion point is closest to the present time is determined as a node which is to execute the new process.

13. A task deployment method comprising:
acquiring, by a computer, a number of processes in a queue included in a node coupled to a management node when a new process occurred in the management node;
acquiring a process execution rate of the node;
calculating an execution time for the processes by dividing the acquired number of processes by the acquired process execution rate;
calculating an execution completion point for the new process in a case where execution of the new process is started by the node based on the calculated execution time and a communication delay between the management node and the node;
transmitting the calculated execution completion point to the management node;
receiving, by the management node, the calculated execution completion point for the new process from the computer, and
determining whether to cause the node to execute new process based on the calculated execution completion point.

14. A task deployment apparatus comprising:
a memory; and
a processor coupled to the memory and configured to:
acquire a number of processes in a queue included in a node coupled to a management node when a new process occurred in the management node;
acquire a process execution rate of the node;
calculate an execution time for the processes by dividing the acquired number of processes by the acquired process execution rate;
calculate an execution completion point for the new process in a case where execution of the new process is started by the node based on the calculated execution time and a communication delay between the management node and the node; and transmitting the calculated execution completion point to the management node, the management node is configured to determine whether to cause the node to execute the new process based on the calculated execution completion point.

15. A task deployment apparatus comprising:

a memory; and a processor coupled to the memory and configured to:
receive an execution completion point for a new process from the computer, the execution completion point being calculated by using a process that includes acquiring a number of processes in a queue included in a node of the one or more nodes when the new process occurred in the management node, acquiring a process execution rate of the node, calculating an execution time for the processes by dividing the acquired number of processes by the acquired process execution rate, calculating an execution completion point for the new process in a case where execution of the new process is started by the node based on the calculated execution time and a communication delay between the management node and the node; and determine whether to cause the node to execute the new process based on the calculated execution completion point.

* * * * *